(12) United States Patent
Lee et al.

(10) Patent No.: US 10,147,284 B2
(45) Date of Patent: Dec. 4, 2018

(54) BANKING SYSTEMS CONTROLLED BY DATA BEARING RECORDS

(71) Applicant: Bank of America Corporation, Charlotte, NC (US)

(72) Inventors: Jisoo Lee, Chesterfield, NJ (US); Richard E. Barron, Glen Rock, NJ (US); Yair Frankel, Westfield, NJ (US); Rafman Azeez, Watchung, NJ (US); Saul Florez, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/630,021

(22) Filed: Jun. 22, 2017

(65) Prior Publication Data
US 2018/0233000 A1 Aug. 16, 2018

Related U.S. Application Data

(60) Provisional application No. 62/458,233, filed on Feb. 13, 2017.

(51) Int. Cl.
*G07F 19/00* (2006.01)
*G06Q 20/10* (2012.01)
(Continued)

(52) U.S. Cl.
CPC ....... *G07F 19/206* (2013.01); *G06Q 20/1085* (2013.01); *G06Q 20/3223* (2013.01); *G07F 19/211* (2013.01); *G06Q 20/40* (2013.01)

(58) Field of Classification Search
CPC ........... G06Q 20/1085; G06Q 20/3223; G06Q 40/02; G07F 19/201; G07F 19/20; G07F 19/206; G07F 19/211
(Continued)

(56) References Cited

U.S. PATENT DOCUMENTS 7,025,255 B1 * 4/2006 Drummond ............. G07F 19/20
  235/379
7,195,151 B2   3/2007 Licciardello et al.
(Continued)

OTHER PUBLICATIONS

"Blockchain," from Wikipedia, the free encyclopedia retrieved Jun. 3, 2017, from https://en.wikipedia.org/wiki/Blockchain, 17 pages.
(Continued)

*Primary Examiner* — Paultep Savusdiphol
(74) *Attorney, Agent, or Firm* — Banner & Witcoff, Ltd.; Michael A. Springs

(57) ABSTRACT

Aspects of the disclosure relate to deploying, configuring, and utilizing cash handling devices to provide dynamic and adaptable operating functions. A cash handling device having at least one processor, a memory, and a communication interface may store a device registration module, a containerized operating module, a non-engagement services module, and a secure communications module. The device registration module may include instructions that cause the cash handling device to register with a support server and a plurality of financial institution servers. The containerized operating module may include instructions that cause the cash handling device to selectively execute a first operating application or a second operating application. The non-engagement services module may include instructions that cause the cash handling device to generate and present one or more non-engagement user interfaces. The secure communications module may include instructions that cause the cash handling device to track and securely communicate transaction details information.

17 Claims, 36 Drawing Sheets

(51) Int. Cl.
*G06Q 20/32* (2012.01)
*G06Q 20/40* (2012.01)

(58) Field of Classification Search
USPC .................................................. 235/379, 380
See application file for complete search history.

(56) References Cited

U.S. PATENT DOCUMENTS

| | | | |
|---|---|---|---|
| 7,416,112 B2 | 8/2008 | Smith et al. | |
| 7,628,325 B2 | 12/2009 | McIntosh | |
| 8,205,795 B2 | 6/2012 | Kurasaki et al. | |
| 8,301,564 B2 | 10/2012 | Mon et al. | |
| 8,996,417 B1 | 3/2015 | Channakeshava | |
| 9,003,196 B2 | 4/2015 | Hoyos et al. | |
| 9,135,787 B1* | 9/2015 | Russell | G07F 19/201 |
| 9,613,349 B2 | 4/2017 | Fujita et al. | |
| 9,679,278 B2* | 6/2017 | Drummond | G06Q 20/1085 |
| 9,830,650 B2 | 11/2017 | Fujita et al. | |
| 2003/0120597 A1* | 6/2003 | Drummond | G06F 3/023 705/43 |
| 2003/0126084 A1* | 7/2003 | Drummond | G06F 3/023 705/43 |
| 2008/0126245 A1* | 5/2008 | Rosenberg | G06Q 20/10 705/39 |
| 2009/0164372 A1* | 6/2009 | Dell | G06Q 20/042 705/43 |
| 2009/0212104 A1* | 8/2009 | Smith | G06Q 20/042 235/379 |
| 2009/0212105 A1* | 8/2009 | Couper | G06Q 20/105 235/379 |
| 2011/0251956 A1* | 10/2011 | Cantley | G06Q 20/042 705/43 |
| 2012/0286034 A1* | 11/2012 | Smith | G06Q 20/042 235/379 |
| 2015/0249667 A1* | 9/2015 | Han | H04L 63/10 726/4 |
| 2015/0363773 A1* | 12/2015 | Ronca | G06Q 20/3829 705/71 |
| 2016/0164858 A1 | 6/2016 | Grigg et al. | |
| 2016/0165447 A1 | 6/2016 | Grigg et al. | |
| 2016/0171827 A1 | 6/2016 | Washington et al. | |
| 2016/0171835 A1 | 6/2016 | Washington et al. | |
| 2016/0173497 A1 | 6/2016 | Grigg et al. | |
| 2016/0196559 A1 | 7/2016 | Einhorn et al. | |
| 2016/0203675 A1 | 7/2016 | Lutnick et al. | |
| 2016/0210652 A9 | 7/2016 | Boyle et al. | |
| 2016/0217258 A1 | 7/2016 | Pitroda et al. | |
| 2016/0239904 A1 | 8/2016 | Washington et al. | |
| 2016/0240050 A1 | 8/2016 | Block et al. | |
| 2016/0247229 A1 | 8/2016 | Connolly et al. | |
| 2016/0247230 A1 | 8/2016 | Connolly et al. | |
| 2016/0247231 A1 | 8/2016 | Connolly et al. | |
| 2016/0248781 A1 | 8/2016 | Grigg et al. | |
| 2016/0253651 A1 | 9/2016 | Park et al. | |
| 2016/0253652 A1 | 9/2016 | Je et al. | |
| 2016/0275760 A1 | 9/2016 | Block et al. | |
| 2016/0283737 A1 | 9/2016 | Soman et al. | |
| 2016/0292963 A1 | 10/2016 | Chun et al. | |
| 2016/0300235 A1 | 10/2016 | Boyle et al. | |
| 2016/0342241 A1 | 11/2016 | Chung et al. | |
| 2016/0344569 A1 | 11/2016 | Chun et al. | |
| 2016/0344815 A1 | 11/2016 | Hyun et al. | |
| 2016/0364729 A1 | 12/2016 | Ruparelia et al. | |
| 2016/0366541 A1 | 12/2016 | Jang et al. | |
| 2016/0371522 A1 | 12/2016 | Snyder et al. | |
| 2017/0004506 A1 | 1/2017 | Steinman et al. | |
| 2017/0006010 A1 | 1/2017 | Miu | |
| 2017/0024442 A1 | 1/2017 | Park et al. | |
| 2017/0026180 A1 | 1/2017 | Sallis | |
| 2017/0053302 A1 | 2/2017 | Mason et al. | |
| 2017/0053479 A1 | 2/2017 | Manning et al. | |
| 2017/0054678 A1 | 2/2017 | Kang et al. | |
| 2017/0061140 A1 | 3/2017 | Kurian | |
| 2017/0061438 A1 | 3/2017 | Patel | |
| 2017/0068952 A1 | 3/2017 | Brockmann et al. | |
| 2017/0068956 A1 | 3/2017 | Jones | |
| 2017/0076548 A1 | 3/2017 | Washington et al. | |
| 2017/0076553 A1 | 3/2017 | Washington et al. | |
| 2017/0078091 A1 | 3/2017 | Fiske | |
| 2017/0078400 A1 | 3/2017 | Binder et al. | |
| 2017/0083909 A1 | 3/2017 | Mork et al. | |
| 2017/0091764 A1 | 3/2017 | Lloyd et al. | |
| 2017/0091765 A1 | 3/2017 | Lloyd et al. | |
| 2017/0098205 A1 | 4/2017 | Block et al. | |
| 2017/0103382 A1 | 4/2017 | Kim et al. | |
| 2017/0116403 A1 | 4/2017 | Bouse et al. | |
| 2017/0124812 A1 | 5/2017 | Washington et al. | |
| 2017/0162004 A1 | 6/2017 | Hughes | |
| 2017/0178128 A1* | 6/2017 | Fourez | G06Q 20/38 |
| 2017/0178237 A1* | 6/2017 | Wong | G06Q 20/065 |

OTHER PUBLICATIONS

Apr. 30, 2018 U.S. Non-Final Office Action—U.S. Appl. No. 15/630,152.
Jan. 9, 2018 U.S. Non-Final Office Action—U.S. Appl. No. 15/630,216.

* cited by examiner

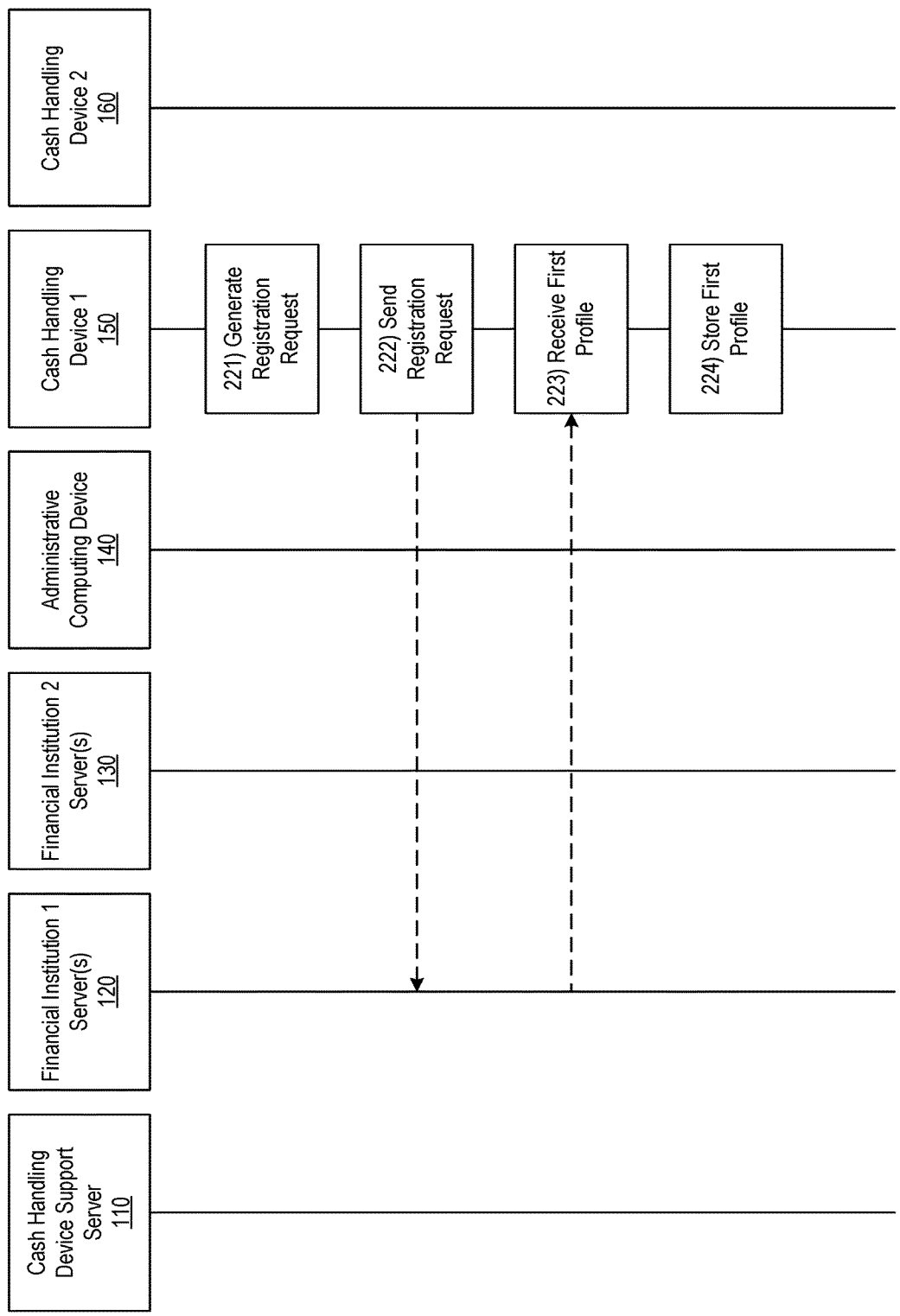

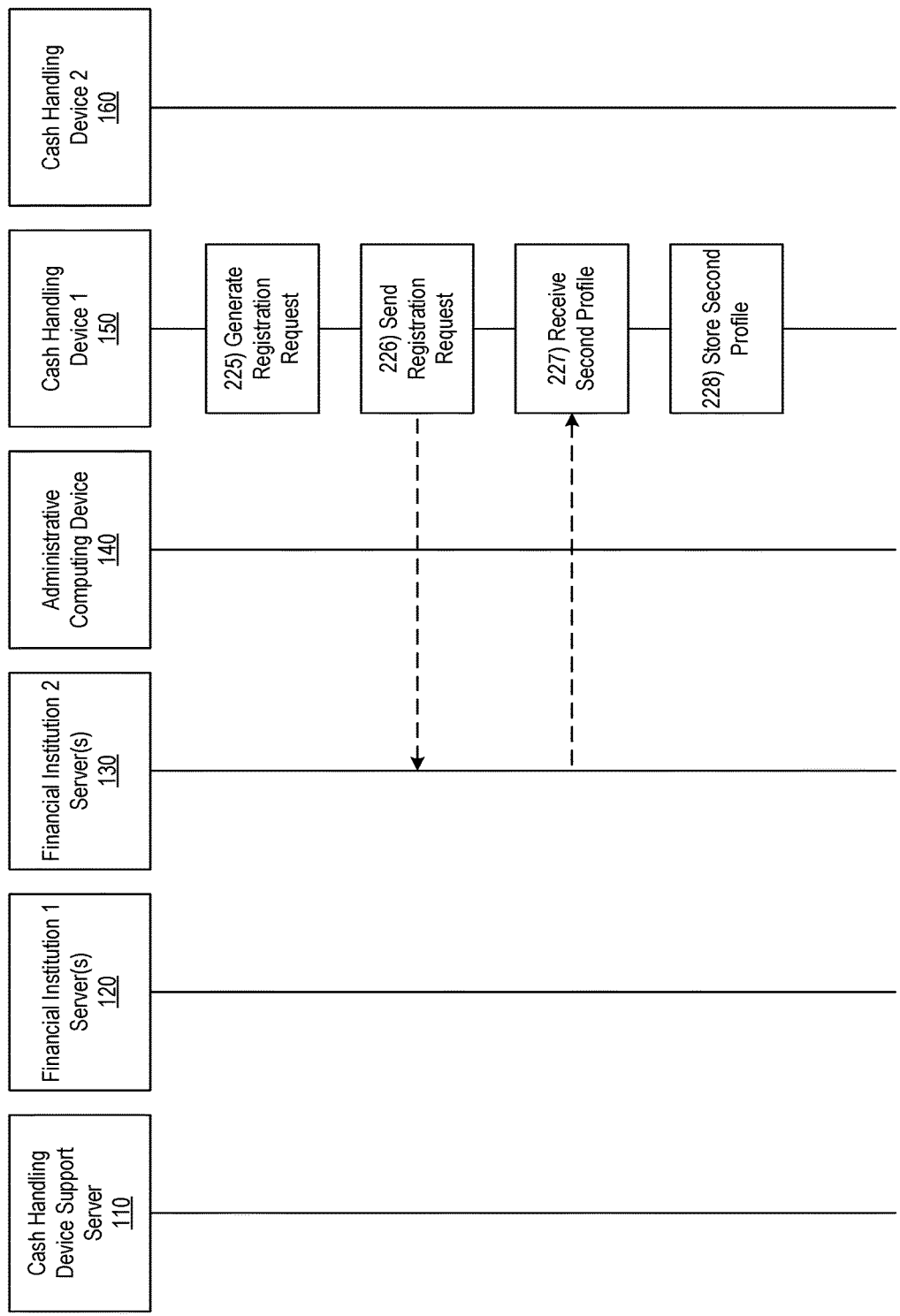

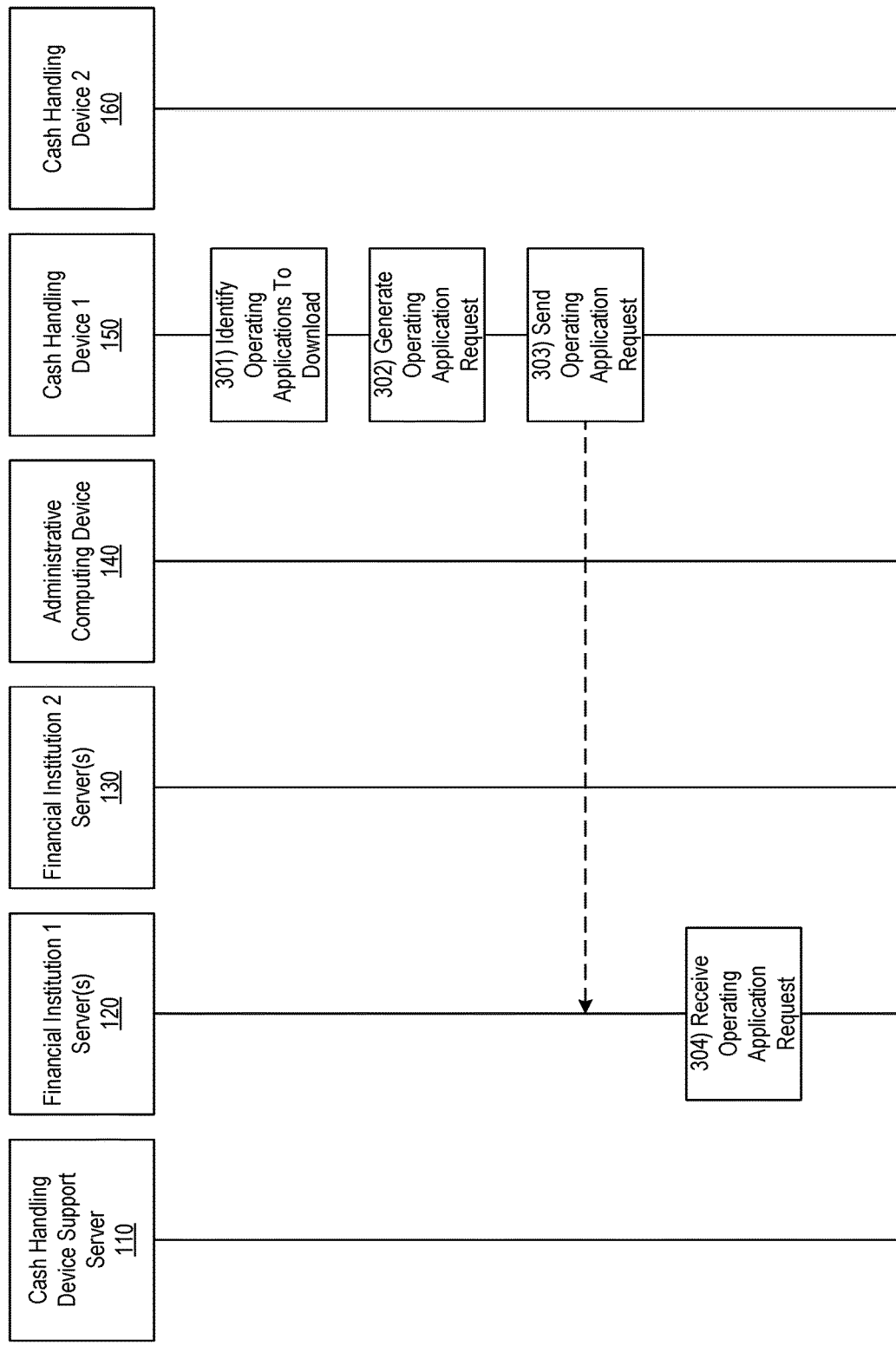

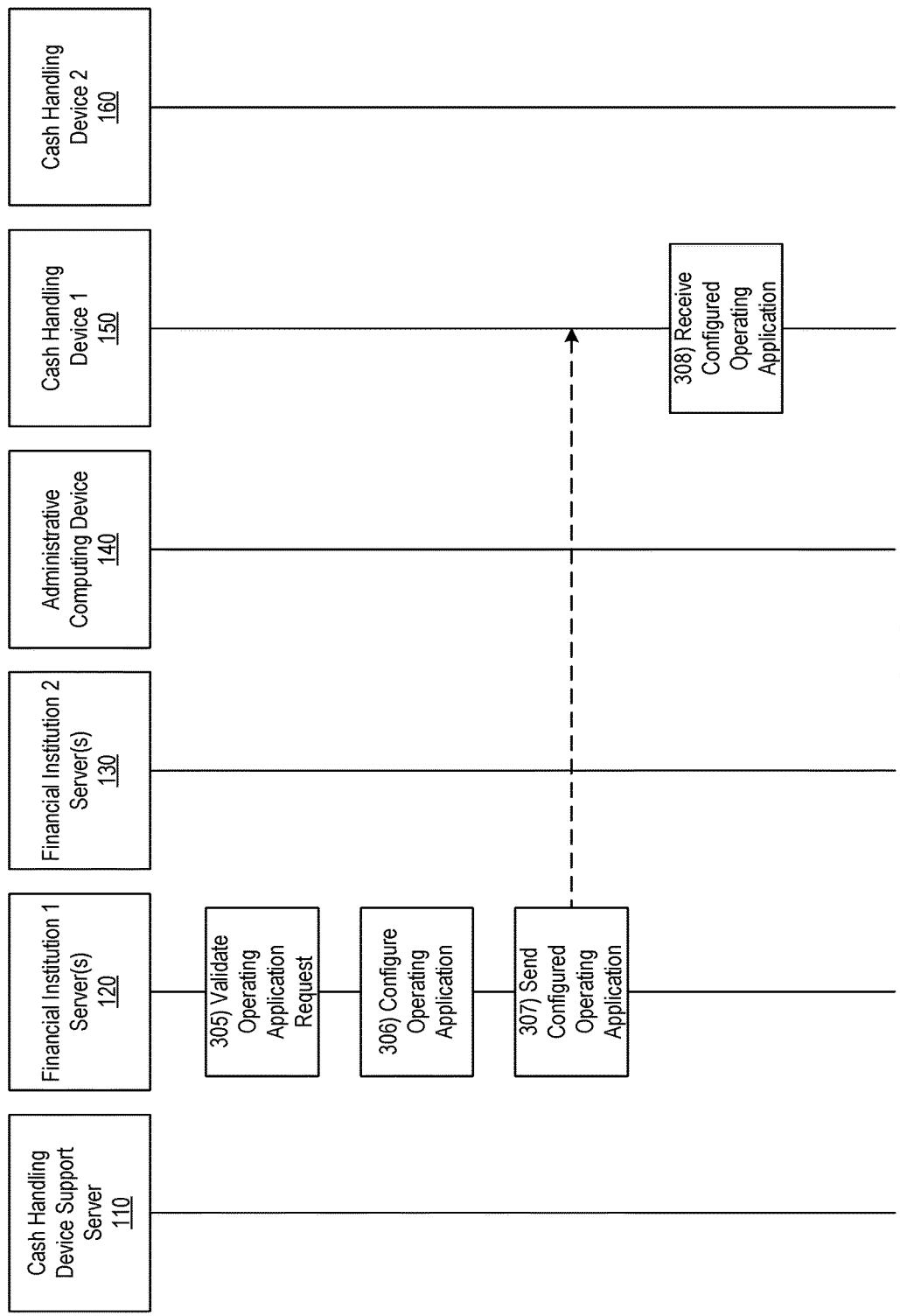

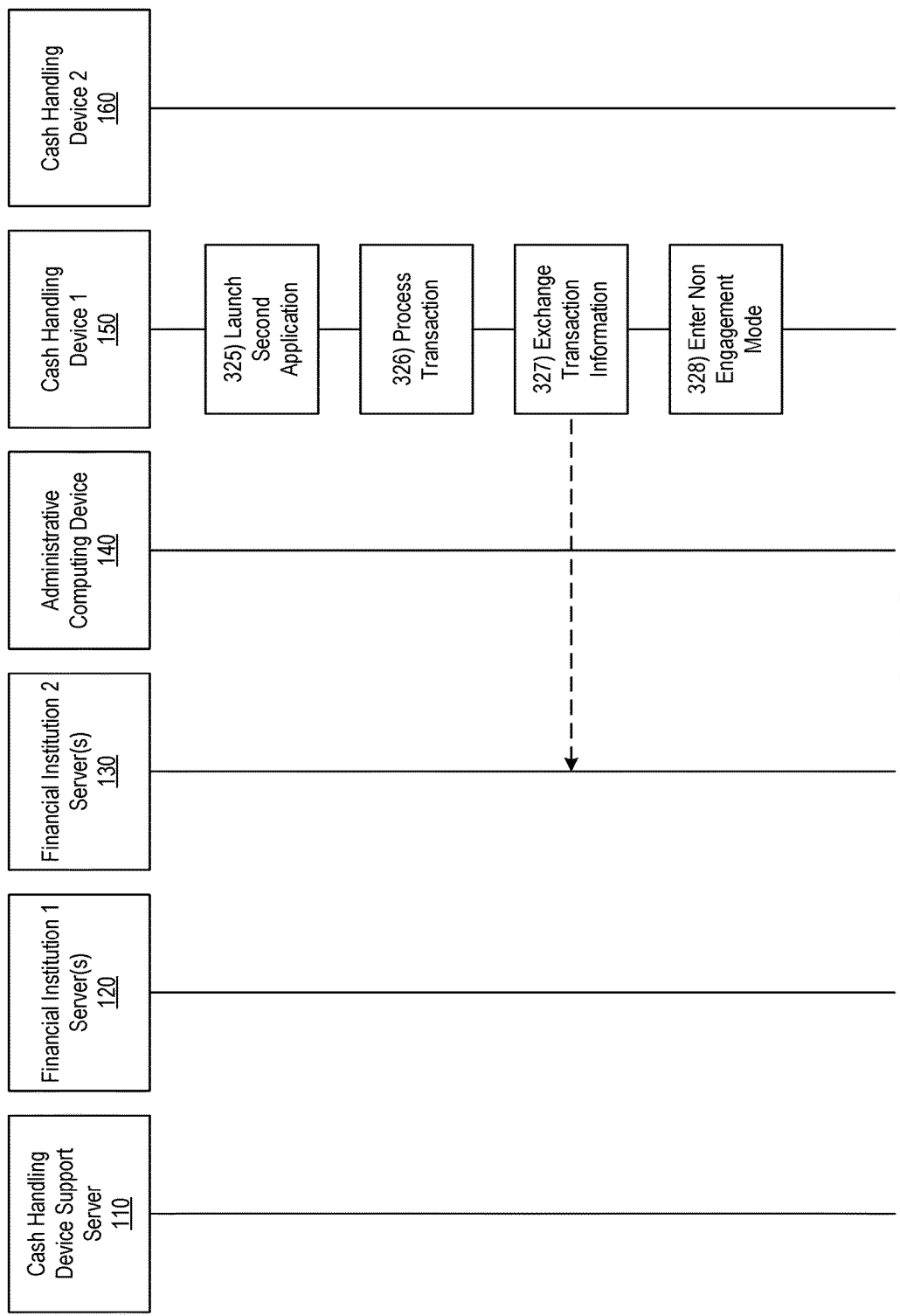

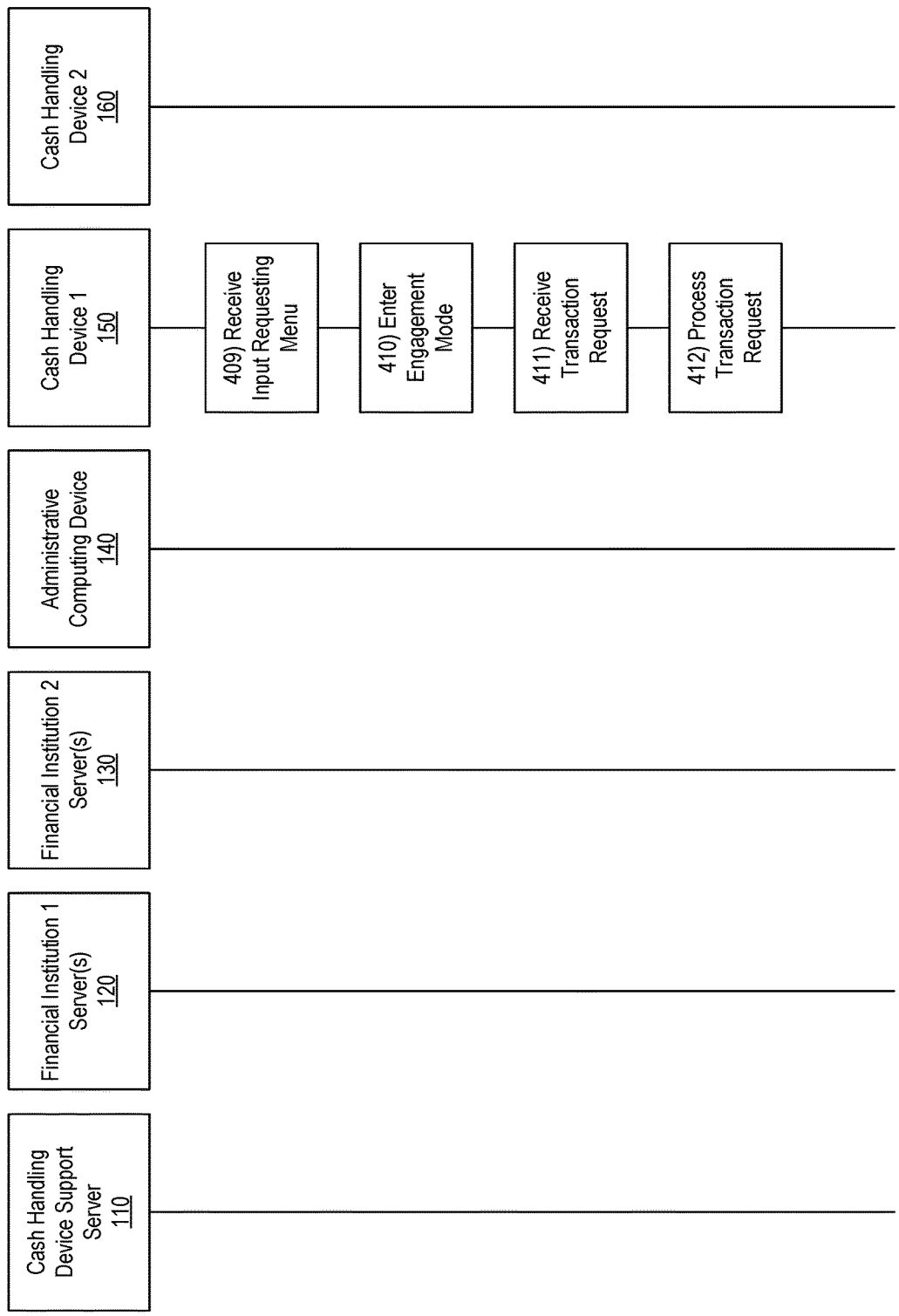

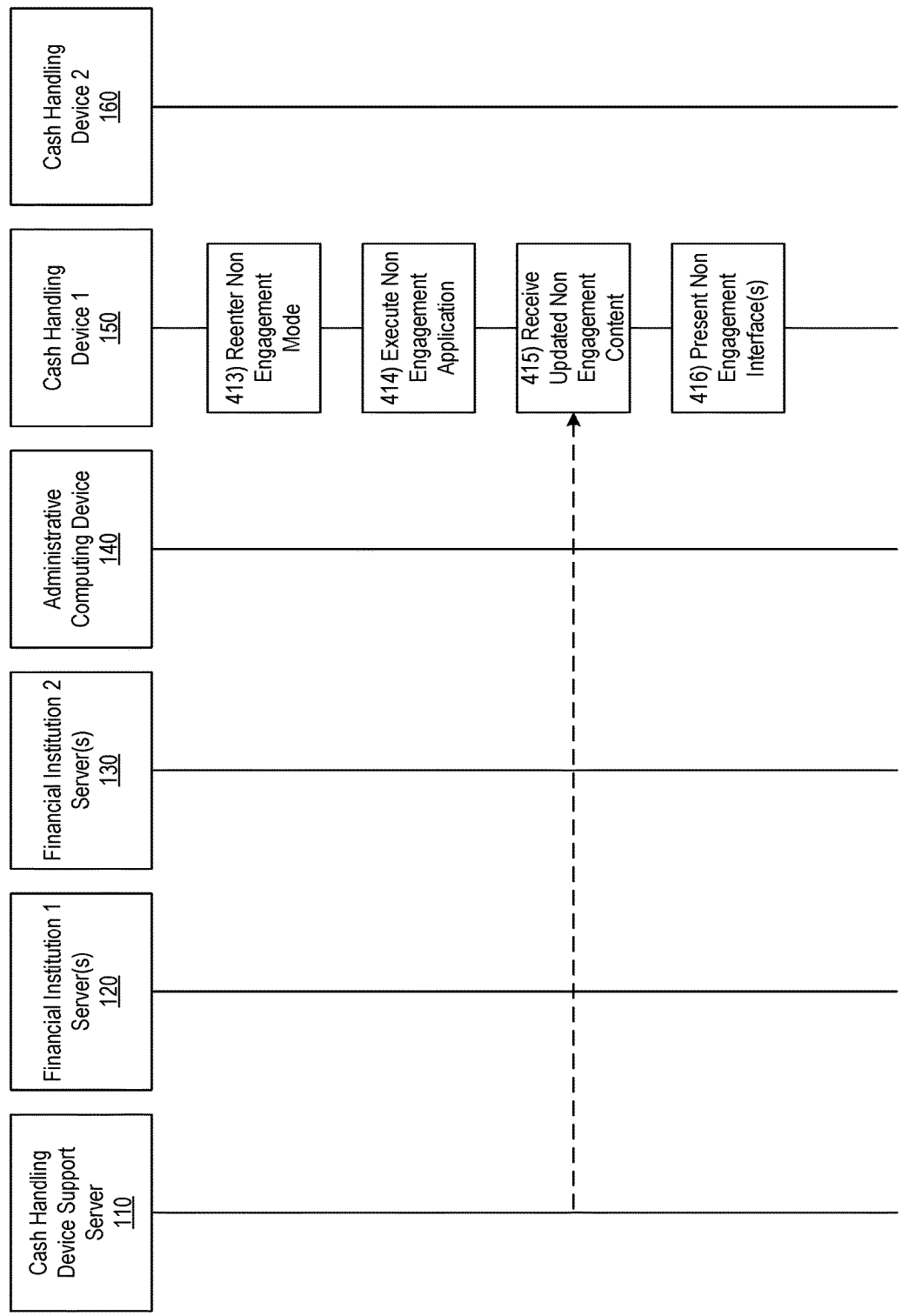

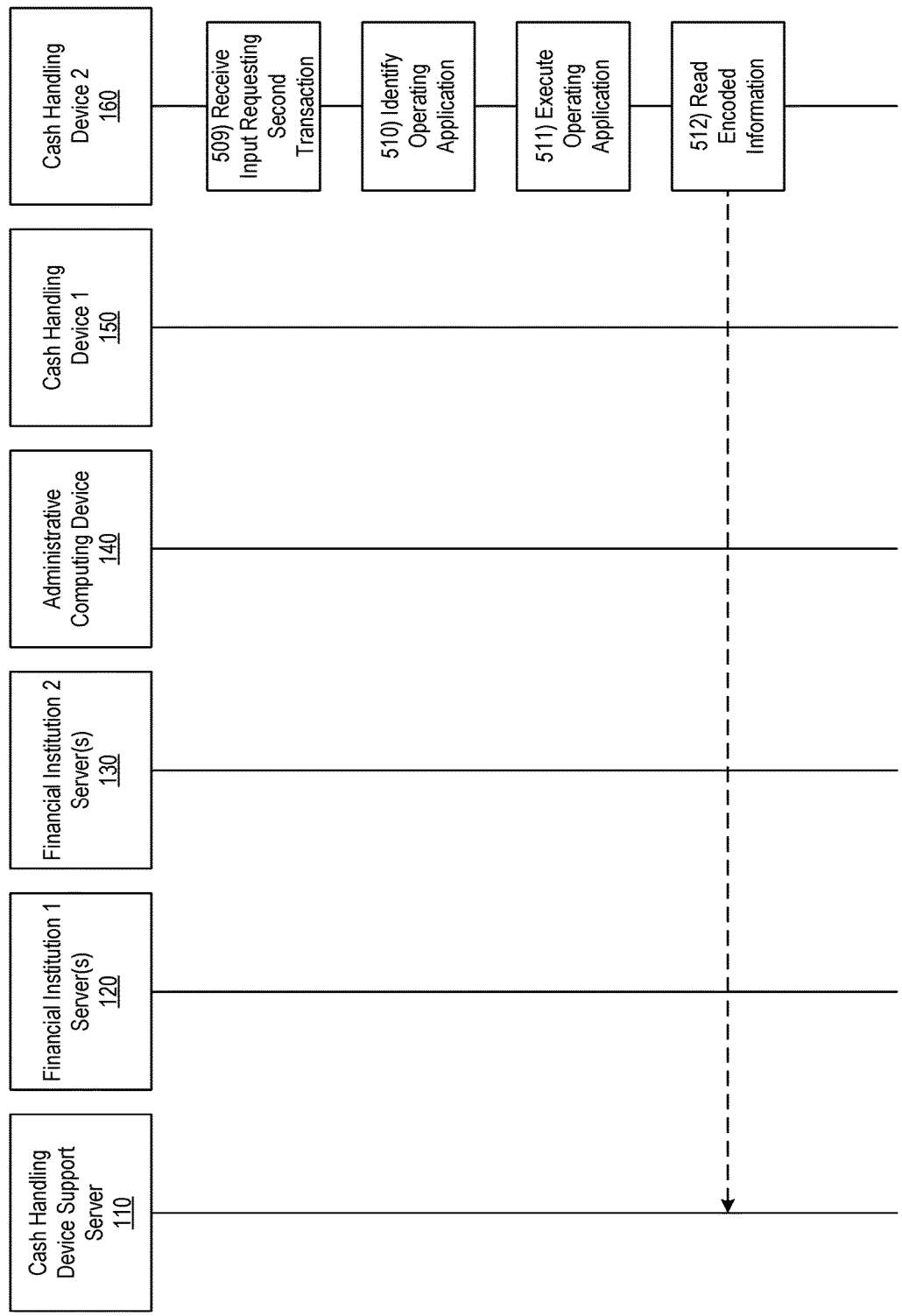

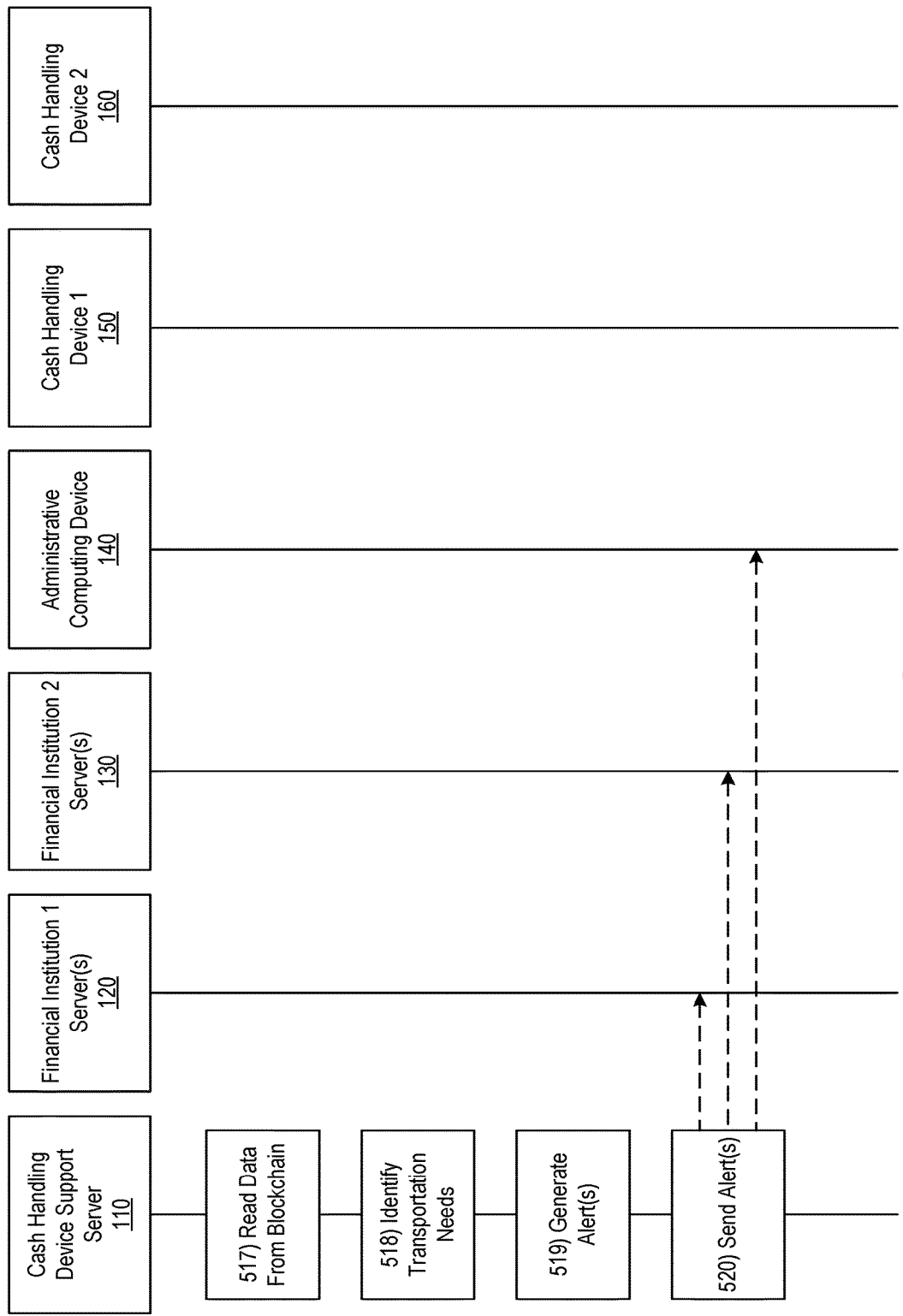

ABANKING SYSTEMS CONTROLLED BY
DATA BEARING RECORDS

CROSS-REFERENCE TO RELATED
APPLICATION(S)

This application claims the benefit of priority to U.S. Patent Application Ser. No. 62/458,233, filed Feb. 13, 2017, and entitled "BANKING SYSTEMS CONTROLLED BY DATA BEARING RECORDS," which is hereby incorporated by reference in its entirety for all purposes.

BACKGROUND

Aspects of the disclosure relate to banking systems controlled by data bearing records. In particular, one or more aspects of the disclosure relate to deploying, configuring, and utilizing cash handling devices to provide dynamic and adaptable operating functions.

Cash handling devices may be used in operating centers and other locations to provide various functions, such as facilitating cash withdrawals and deposits. In many instances, however, it may be difficult to integrate such cash handling devices with technical infrastructure that supports banking operations and other operations while also optimizing the efficient and effective technical operations of the cash handling devices and various related computer systems.

SUMMARY

Aspects of the disclosure provide effective, efficient, scalable, and convenient technical solutions that address and overcome the technical problems associated with optimizing the technical operations of the cash handling devices and various related computer systems. In particular, one or more aspects of the disclosure provide techniques for deploying, configuring, and utilizing cash handling devices to provide dynamic and adaptable operating functions.

In accordance with one or more embodiments, a cash handling device having at least one processor, a memory, and a communication interface may store a device registration module, a containerized operating module, a non-engagement services module, and a secure communications module. The device registration module may include computer-readable instructions that, when executed by the at least one processor, cause the cash handling device to register with a cash handling device support server, a first financial institution server associated with a first financial institution, and a second financial institution server associated with a second financial institution different from the first financial institution. The containerized operating module may include computer-readable instructions that, when executed by the at least one processor, cause the cash handling device to selectively execute a first operating application associated with the first financial institution or a second operating application associated with the second financial institution based on user input received by the cash handling device. The non-engagement services module may include computer-readable instructions that, when executed by the at least one processor, cause the cash handling device to generate and present one or more non-engagement user interfaces when the cash handling device is operating in a non-engagement mode. The secure communications module may include computer-readable instructions that, when executed by the at least one processor, cause the cash handling device to track and securely communicate transaction details information to one or more servers based on transactions attempted or completed at the cash handling device.

In accordance with one or more additional embodiments, a cash handling device having at least one processor, a communication interface, a touch-sensitive display screen, an item accepting device, an item dispensing device, and a memory may generate a first registration request for a first banking server associated with a first financial institution. Subsequently, the cash handling device may send, via the communication interface, to the first banking server associated with the first financial institution, the first registration request generated for the first banking server associated with the first financial institution. After sending the first registration request to the first banking server associated with the first financial institution, the cash handling device may receive, via the communication interface, from the first banking server associated with the first financial institution, a first device provisioning profile generated by the first banking server associated with the first financial institution for the cash handling device. Then, the cash handling device may store the first device provisioning profile received from the first banking server associated with the first financial institution, and the first device provisioning profile received from the first banking server associated with the first financial institution may enable the cash handling device to execute a first operating application associated with the first financial institution.

Thereafter, the cash handling device may generate a second registration request for a second banking server associated with a second financial institution. Subsequently, the cash handling device may send, via the communication interface, to the second banking server associated with the second financial institution, the second registration request generated for the second banking server associated with the second financial institution. After sending the second registration request to the second banking server associated with the second financial institution, the cash handling device may receive, via the communication interface, from the second banking server associated with the second financial institution, a second device provisioning profile generated by the second banking server associated with the second financial institution for the cash handling device. Then, the cash handling device may store the second device provisioning profile received from the second banking server associated with the second financial institution, and the second device provisioning profile received from the second banking server associated with the second financial institution may enable the cash handling device to execute a second operating application associated with the second financial institution.

In some embodiments, prior to generating the first registration request for the first banking server associated with the first financial institution, the cash handling device may retrieve a private encryption key from a secure hardware element built into control circuitry of the cash handling device. Subsequently, the cash handling device may generate an authentication request based on the private encryption key retrieved from the secure hardware element built into the control circuitry of the cash handling device. Then, the cash handling device may send, via the communication interface, to a cash handling device support server, the authentication request generated based on the private encryption key retrieved from the secure hardware element built into the control circuitry of the cash handling device.

In some embodiments, after sending, to the cash handling device support server, the authentication request generated based on the private encryption key retrieved from the secure hardware element built into the control circuitry of the cash handling device, the cash handling device may receive, via the communication interface, from the cash handling device support server, one or more verification commands generated by the cash handling device support server.

In some embodiments, the cash handling device may prompt a user of the cash handling device to respond to one or more biometric authentication prompts based on the one or more verification commands received from the cash handling device support server.

Subsequently, the cash handling device may capture biometric input from the user of the cash handling device. Then, the cash handling device may validate the biometric input captured from the user of the cash handling device.

In some embodiments, the cash handling device may capture location data identifying a location of the cash handling device based on the one or more verification commands received from the cash handling device support server. In some embodiments, capturing the location data identifying the location of the cash handling device based on the one or more verification commands received from the cash handling device support server may include capturing satellite positioning data associated with the location of the cash handling device from a satellite positioning receiver built into the cash handling device.

In some embodiments, the cash handling device may generate one or more cloud registration messages to enroll the cash handling device in a device management scheme managed by the cash handling device support server, based on validating the biometric input captured from the user of the cash handling device and based on capturing the location data identifying the location of the cash handling device. Subsequently, the cash handling device may send, via the communication interface, to the cash handling device support server, the one or more cloud registration messages.

In some embodiments, after sending the one or more cloud registration messages to the cash handling device support server, the cash handling device may receive, via the communication interface, from the cash handling device support server, a device profile generated for the cash handling device by the cash handling device support server.

Subsequently, the cash handling device may store the device profile received from the cash handling device support server. In some embodiments, the device profile received from the cash handling device support server may include information identifying the first banking server associated with the first financial institution and information identifying the second banking server associated with the second financial institution. In some embodiments, receiving the device profile from the cash handling device support server may cause the cash handling device to register with the first banking server associated with the first financial institution and the second banking server associated with the second financial institution.

In some embodiments, the cash handling device may receive a first transaction request associated with the first financial institution from a first user of the cash handling device. Subsequently, the cash handling device may process the first transaction request associated with the first financial institution by executing the first operating application associated with the first financial institution. In some embodiments, the cash handling device may receive a second transaction request associated with the second financial institution from a second user of the cash handling device. Subsequently, the cash handling device may process the second transaction request associated with the second financial institution by executing the second operating application associated with the second financial institution.

In some embodiments, after processing the first transaction request associated with the first financial institution and processing the second transaction request associated with the second financial institution, the cash handling device may exchange, via the communication interface, first transaction log information with the first banking server based on processing the first transaction request associated with the first financial institution. In addition, the cash handling device may exchange, via the communication interface, second transaction log information with the second banking server based on processing the second transaction request associated with the second financial institution. Further, the cash handling device may exchange, via the communication interface, third transaction log information with a cash handling device support server based on processing the first transaction request associated with the first financial institution and based on processing the second transaction request associated with the second financial institution.

In some embodiments, after processing the first transaction request associated with the first financial institution and processing the second transaction request associated with the second financial institution, the cash handling device may present one or more non-engagement user interfaces.

In accordance with one or more additional embodiments, a cash handling device having at least one processor, a communication interface, a touch-sensitive display screen, an item accepting device, an item dispensing device, and a memory may receive input requesting a first transaction from a first user of the cash handling device. In response to receiving the input requesting the first transaction from the first user of the cash handling device, the cash handling device may identify a first operating application associated with a first financial institution for processing the first transaction. Based on identifying the first operating application associated with the first financial institution for processing the first transaction, the cash handling device may launch the first operating application associated with the first financial institution. Subsequently, the cash handling device may process the first transaction by executing the first operating application associated with the first financial institution. Thereafter, the cash handling device may receive input requesting a second transaction from a second user of the cash handling device. In response to receiving the input requesting the second transaction from the second user of the cash handling device, the cash handling device may identify a second operating application associated with a second financial institution for processing the second transaction. Based on identifying the second operating application associated with the second financial institution for processing the second transaction, the cash handling device may launch the second operating application associated with the second financial institution. Subsequently, the cash handling device may process the second transaction by executing the second operating application associated with the second financial institution.

In some embodiments, based on processing the first transaction, the cash handling device may communicate, via the communication interface, to a first banking server associated with the first financial institution, transaction details information associated with the first transaction using a first device provisioning profile generated by the first banking server associated with the first financial institution for the cash handling device. In some embodiments, based on processing the second transaction, the cash handling device may communicate, via the communication interface, to a second banking server associated with the second financial institution, transaction details information associated with the second transaction using a second device provisioning profile generated by the second banking server associated with the second financial institution for the cash handling device.

In some embodiments, receiving the input requesting the first transaction from the first user of the cash handling device may include receiving, via the touch-sensitive display screen, input selecting the first financial institution from a listing of financial institutions linked to the cash handling device included in a user interface presented by the cash handling device. In some embodiments, receiving the input requesting the first transaction from the first user of the cash handling device may include receiving a physical token associated with the first financial institution.

In some embodiments, processing the first transaction may include authenticating the first user of the cash handling device to at least one financial account maintained by the first financial institution, receiving one or more deposit items associated with the first transaction via the item accepting device, and dispensing one or more withdrawal items associated with the first transaction via the item dispensing device. In some embodiments, processing the second transaction may include authenticating the second user of the cash handling device to at least one financial account maintained by the second financial institution, receiving one or more deposit items associated with the second transaction via the item accepting device, and dispensing one or more withdrawal items associated with the second transaction via the item dispensing device. In some embodiments, the first operating application associated with the first financial institution and the second operating application associated with the second financial institution may be containerized applications executed in sandboxes provided by an operating system of the cash handling device.

In some embodiments, prior to receiving the input requesting the first transaction from the first user of the cash handling device, the cash handling device may identify one or more operating applications to download based on a device profile generated for the cash handling device by a cash handling device support server. Based on identifying the one or more operating applications to download, the cash handling device may generate a first operating application request for the first operating application associated with the first financial institution. Subsequently, the cash handling device may send, via the communication interface, to a first banking server associated with the first financial institution, the first operating application request. Thereafter, the cash handling device may receive, via the communication interface, from the first banking server associated with the first financial institution, the first operating application associated with the first financial institution.

In some embodiments, based on identifying the one or more operating applications to download, the cash handling device may generate a second operating application request for the second operating application associated with the second financial institution. Subsequently, the cash handling device may send, via the communication interface, to a second banking server associated with the second financial institution, the second operating application request. Thereafter, the cash handling device may receive, via the communication interface, from the second banking server associated with the second financial institution, the second operating application associated with the second financial institution.

In some embodiments, after processing the first transaction by executing the first operating application associated with the first financial institution, the cash handling device may receive, via the communication interface, from the first banking server associated with the first financial institution, a first application update for the first operating application associated with the first financial institution. In response to receiving the first application update for the first operating application associated with the first financial institution, the cash handling device may update the first operating application associated with the first financial institution by installing the first application update on the cash handling device.

In some embodiments, after processing the second transaction by executing the second operating application associated with the second financial institution, the cash handling device may receive, via the communication interface, from the second banking server associated with the second financial institution, a second application update for the second operating application associated with the second financial institution. In response to receiving the second application update for the second operating application associated with the second financial institution, the cash handling device may update the second operating application associated with the second financial institution by installing the second application update on the cash handling device.

In some embodiments, the cash handling device may switch from a first engagement mode to a non-engagement mode after processing the first transaction by executing the first operating application associated with the first financial institution. In some embodiments, the cash handling device may switch from a second engagement mode to the non-engagement mode after processing the second transaction by executing the second operating application associated with the second financial institution.

In accordance with one or more additional embodiments, a cash handling device having at least one processor, a communication interface, a touch-sensitive display screen, an item accepting device, an item dispensing device, and a memory may enter a non-engagement mode. Based on entering the non-engagement mode, the cash handling device may launch a non-engagement application. Subsequently, the cash handling device may receive, via the communication interface, from a cash handling device support server, first non-engagement content. Then, the cash handling device may present, using the non-engagement application, one or more non-engagement user interfaces associated with the first non-engagement content received from the cash handling device support server. Thereafter, the cash handling device may detect a presence of a user of the cash handling device. In response to detecting the presence of the user of the cash handling device, the cash handling device may identify the user of the cash handling device. After identifying the user of the cash handling device, the cash handling device may receive, via the communication interface, from the cash handling device support server, second non-engagement content specific to the user of the cash handling device. Subsequently, the cash handling device may present, using the non-engagement application, one or more non-engagement user interfaces associated with the second non-engagement content specific to the user of the cash handling device.

In some embodiments, entering the non-engagement mode may include entering the non-engagement mode in response to completing processing of a transaction at the cash handling device. In some embodiments, the non-engagement application may be a separate software component from one or more containerized applications executed by the cash handling device to process transactions associated with different financial institutions. In some embodiments, the first non-engagement content received from the cash handling device support server might not be specific to the user of the cash handling device.

In some embodiments, detecting the presence of the user of the cash handling device may include detecting the presence of the user of the cash handling device based on data received from a motion sensor built into the cash handling device. In some embodiments, detecting the presence of the user of the cash handling device may include detecting the presence of the user of the cash handling device based on data received from an image sensor built into the cash handling device. In some embodiments, detecting the presence of the user of the cash handling device may include detecting the presence of the user of the cash handling device based on receiving data associated with a beacon signal transmitted by a radiofrequency beacon built into the cash handling device.

In some embodiments, identifying the user of the cash handling device may include identifying the user of the cash handling device based on beacon signal attributes information associated with a beacon signal transmitted by a radiofrequency beacon built into the cash handling device and received by a mobile computing device associated with the user of the cash handling device.

In some embodiments, receiving the first non-engagement content from the cash handling device support server may include receiving the first non-engagement content from the cash handling device support server responsive to sending a notification to the cash handling device support server indicating that the cash handling device has entered the non-engagement mode. In some embodiments, receiving the second non-engagement content specific to the user of the cash handling device from the cash handling device support server may include receiving the second non-engagement content specific to the user of the cash handling device from the cash handling device support server responsive to sending a notification to the cash handling device support server indicating that the presence of the user of the cash handling device has been detected.

In some embodiments, the cash handling device may receive, via the touch-sensitive display screen, from the user of the cash handling device, input requesting access to one or more functions of the cash handling device provided by one or more operating applications installed on the cash handling device. In response to receiving the input requesting access to the one or more functions of the cash handling device provided by the one or more operating applications installed on the cash handling device, the cash handling device may switch from the non-engagement mode to an engagement mode.

In some embodiments, switching from the non-engagement mode to the engagement mode may include launching a first operating application based on the input requesting access to the one or more functions of the cash handling device provided by the one or more operating applications installed on the cash handling device. In some embodiments, after switching from the non-engagement mode to the engagement mode, the cash handling device may receive, via the touch-sensitive display screen, from the user of the cash handling device, input requesting a first transaction. Subsequently, the cash handling device may process the first transaction using the first operating application and a first device provisioning profile generated by a server associated with the first operating application.

In some embodiments, after processing the first transaction using the first operating application and the first device provisioning profile generated by the server associated with the first operating application, the cash handling device may receive, via the communication interface, from the cash handling device support server, updated non-engagement content. Subsequently, the cash handling device may present, using the non-engagement application, one or more non-engagement user interfaces associated with the updated non-engagement content.

In accordance with one or more additional embodiments, a cash handling device having at least one processor, a communication interface, a touch-sensitive display screen, an item accepting device, an item dispensing device, and a memory may receive, via the touch-sensitive display screen, from a user of the cash handling device, input requesting a first transaction associated with a deposit of funds to a first account associated with a first financial institution. Based on the input requesting the first transaction associated with the deposit of funds to the first account associated with the first financial institution, the cash handling device may identify a first operating application associated with the first financial institution. Based on identifying the first operating application associated with the first financial institution, the cash handling device may launch the first operating application associated with the first financial institution. Subsequently, the cash handling device may process the first transaction by executing the first operating application associated with the first financial institution. Based on processing the first transaction by executing the first operating application associated with the first financial institution, the cash handling device may encode first transaction information for a blockchain distributed database. Then, the cash handling device may send, via the communication interface, to a cash handling device support server, the first transaction information encoded for the blockchain distributed database.

In some embodiments, sending the first transaction information encoded for the blockchain distributed database to the cash handling device support server may cause the cash handling device support server to write the first transaction information to the blockchain distributed database. In some embodiments, processing the first transaction by executing the first operating application associated with the first financial institution may include: receiving, via the item accepting device, one or more deposit items from the user of the cash handling device; scanning the one or more deposit items received via the item accepting device; and physically storing, in the cash handling device, the one or more deposit items received via the item accepting device. In some embodiments, processing the first transaction by executing the first operating application associated with the first financial institution may include executing the first operating application associated with the first financial institution based on a first device provisioning profile generated for the cash handling device by a first banking server associated with the first financial institution.

In some embodiments, the cash handling device may maintain a second operating application associated with a second financial institution different from the first financial institution. In addition, the cash handling device may maintain a second device provisioning profile generated for the cash handling device by a second banking server associated with the second financial institution. Additionally, the second operating application and the second device provisioning profile may enable the cash handling device to process one or more transactions associated with the second financial institution.

In some embodiments, encoding the first transaction information for the blockchain distributed database may include generating a data structure comprising information identifying one or more deposit items received from the user of the cash handling device, information identifying a date and time at which the first transaction was processed, information identifying a depositor associated with the first transaction, and information identifying a destination account associated with the first transaction.

In some embodiments, sending the first transaction information encoded for the blockchain distributed database to the cash handling device support server may enable a second cash handling device to process a withdrawal of the funds associated with the first transaction based on reading the first transaction information from the blockchain distributed database.

In some embodiments, sending the first transaction information encoded for the blockchain distributed database to the cash handling device support server may cause the cash handling device support server to identify one or more cash transportation needs of the cash handling device. In some embodiments, sending the first transaction information encoded for the blockchain distributed database to the cash handling device support server may cause the cash handling device support server to generate and send one or more alerts based on identifying the one or more cash transportation needs of the cash handling device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2H depict an illustrative event sequence for deploying, configuring, and utilizing cash handling devices to provide dynamic and adaptable operating functions in accordance with one or more example embodiments.

FIGS. 3A-3H depict another illustrative event sequence for deploying, configuring, and utilizing cash handling devices to provide dynamic and adaptable operating functions in accordance with one or more example embodiments.

FIGS. 4A-4D depict another illustrative event sequence for deploying, configuring, and utilizing cash handling devices to provide dynamic and adaptable operating functions in accordance with one or more example embodiments.

FIGS. 5A-5E depict another illustrative event sequence for deploying, configuring, and utilizing cash handling devices to provide dynamic and adaptable operating functions in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to deploying, configuring, and utilizing cash handling devices to provide dynamic and adaptable operating functions. Some current automated teller machine (ATM) platforms may be mainly dedicated to a particular financial institution and restricted in terms of their capabilities to ensure security and performance. There may be ATM managed service providers to offload ATM management and liabilities at the cost of negative customer experience and capabilities. The total cost of maintaining ATMs has been increasing year over year and the adoption of emerging technologies and concepts may have been mostly out-of-reach due to current architectures. Aspects of the disclosure leverage some of the latest technologies to provide an ATM as a service platform that may enable operators to provide more valuable, capable, versatile and cost-effective solutions. The new technologies being incorporated to this ATM-as-a-service architecture may include block-chain, public cloud, docker/container, microservices, big data and analytics, and/or other technologies. These technologies may enable a physical ATM to be used by multiple financial institutions without losing the ATM's unique customer experience and while reducing the collective cost of operations. In some instances, ATMs may also provide marketing, product offers and/or purchases, payments, location-specific analytics, and/or the like, to provide additional services and values. The simplified and secure methods of deploying an ATM physically and/or logically and its reusability may also help reduce one-time expenses associated with ATM management.

Figure 1A:
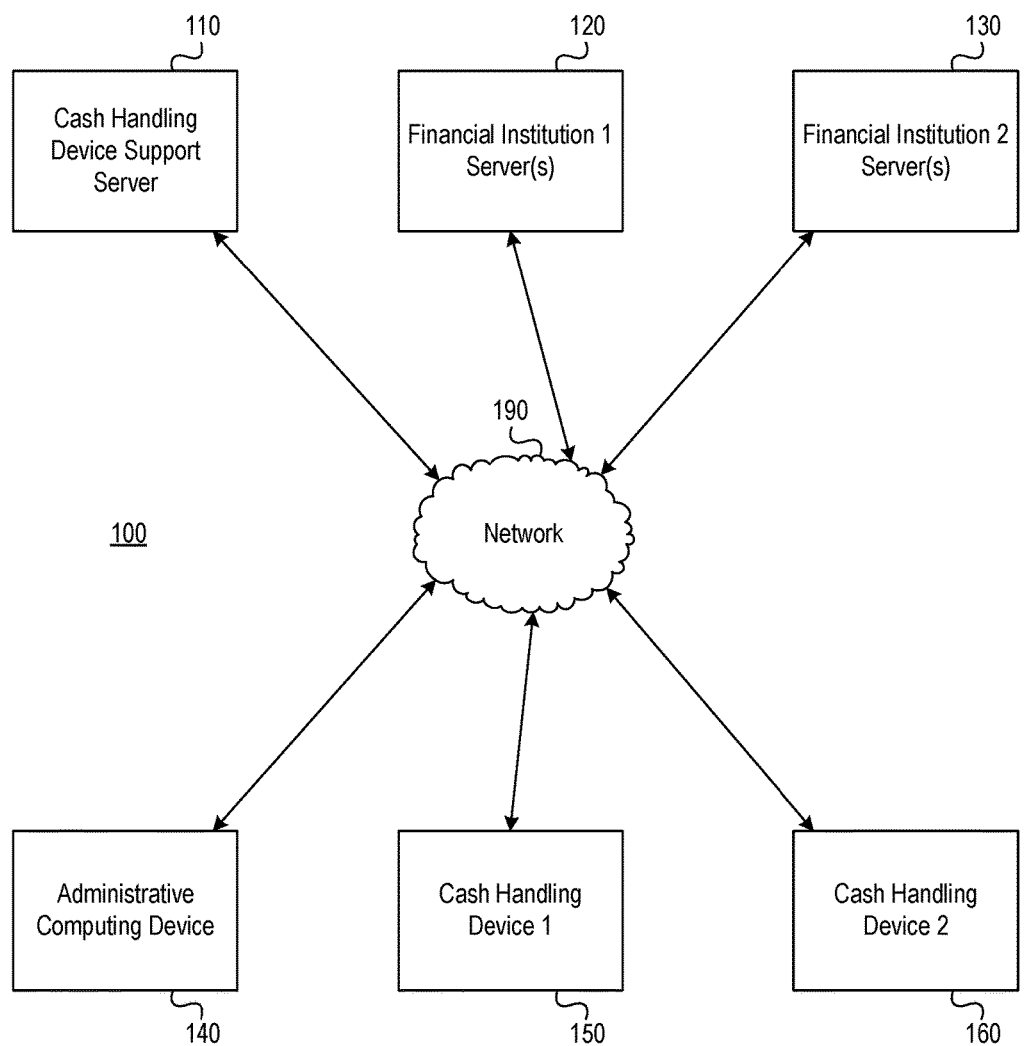
FIGS. 1A and 1B depict an illustrative computing environment for deploying, configuring, and utilizing cash handling devices to provide dynamic and adaptable operating functions in accordance with one or more example embodiments.
Figure 1B:
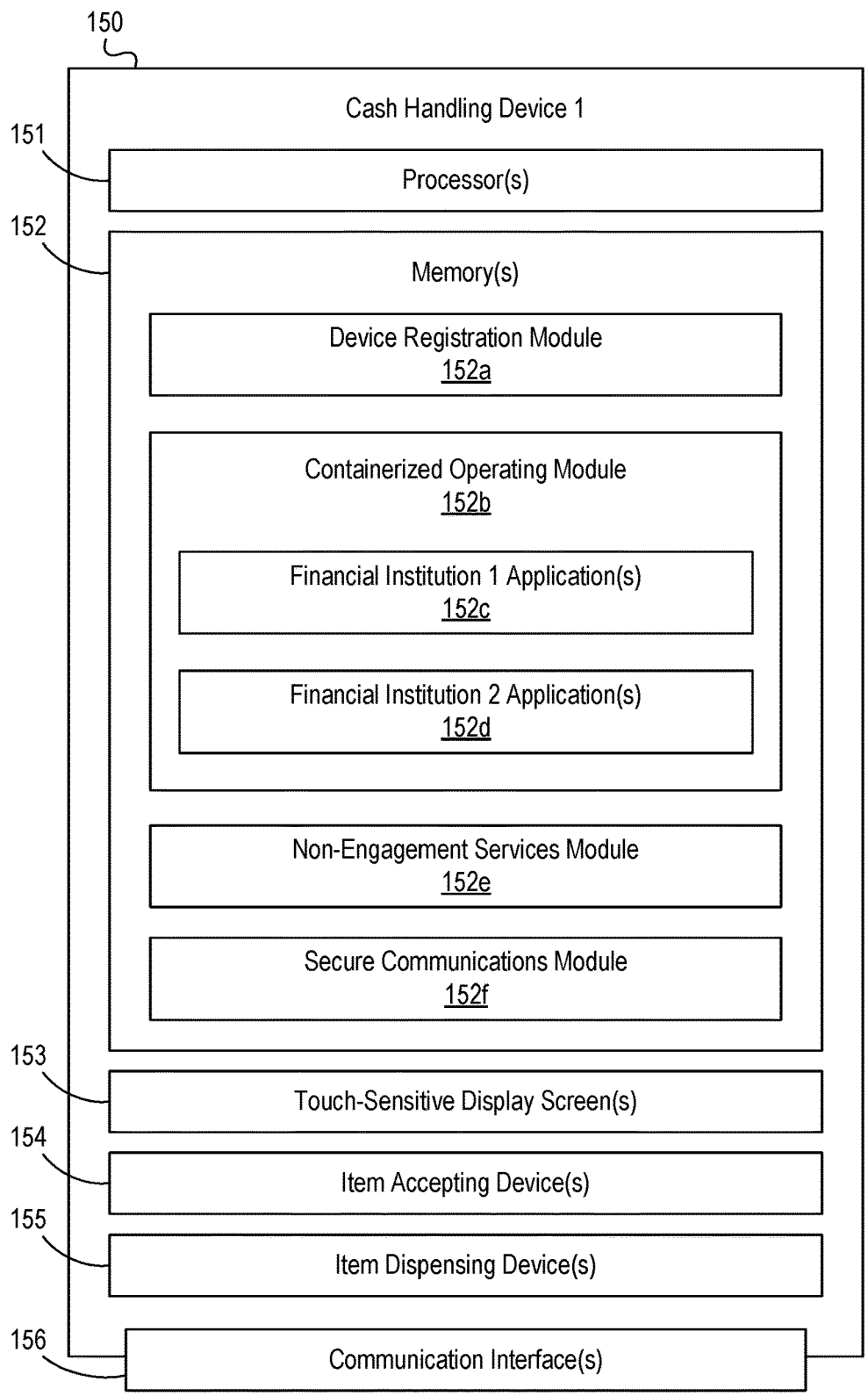

FIGS. 1A and 1B depict an illustrative computing environment for deploying, configuring, and utilizing cash handling devices to provide dynamic and adaptable operating functions in accordance with one or more example embodiments. Referring to FIG. 1A, computing environment 100 may include one or more computing devices and/or other computer systems. For example, computing environment 100 may include a cash handling device support server 110, a first financial institution server 120, a second financial institution server 130, an administrative computing device 140, a first cash handling device 150, and a second cash handling device 160.

Cash handling device support server 110 may be configured to support operations of one or more cash handling devices, such as cash handling device 150 and cash handling device 160. Financial institution server 120 may be associated with a first financial institution, and financial institution server 120 may be configured to provide account management, transaction history, and/or other functions associated with one or more financial accounts maintained by the first financial institution. Financial institution server 130 may be associated with a second financial institution different from the first financial institution, and financial institution server 130 may be configured to provide account management, transaction history, and/or other functions associated with one or more financial accounts maintained by the second financial institution. Administrative computing device 140 may be configured to be used by an administrative user to configure, control, and/or otherwise interact with cash handling device support server 110, cash handling device 150, cash handling device 160, and/or one or more other devices and/or systems included in computing environment 100.

Cash handling device 150 may be a cash handling device, such as an automated teller machine (ATM) or an automated teller assistant (ATA), and cash handling device 150 may be configured to provide one or more automated teller functions and/or other functions, as illustrated in greater detail below. Cash handling device 160 also may be a cash handling device, such as an automated teller machine (ATM) or an automated teller assistant (ATA), and cash handling device 160 may be configured to provide one or more automated teller functions and/or other functions, similar to cash handling device 150.

In one or more arrangements, cash handling device support server 110, financial institution server 120, financial institution server 130, and administrative computing device 140 may be any type of computing device capable of receiving a user interface, receiving input via the user interface, and communicating the received input to one or more other computing devices. For example, cash handling device support server 110, financial institution server 120, financial institution server 130, and administrative computing device 140 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of cash handling device support server 110, financial institution server 120, financial institution server 130, and administrative computing device 140 may, in some instances, be special-purpose computing devices configured to perform specific functions.

Computing environment 100 also may include one or more networks, which may interconnect one or more of cash handling device support server 110, financial institution server 120, financial institution server 130, administrative computing device 140, cash handling device 150, and cash handling device 160. For example, computing environment 100 may include network 190, which may include one or more public networks, private networks, and/or sub-networks (e.g., local area networks (LANs), wide area networks (WANs), or the like).

Referring to FIG. 1B, cash handling device 150 may include one or more processors 151, memory(s) 152, and communication interface(s) 156. Cash handling device 150 also may include one or more touch-sensitive display screen(s) 153, one or more item accepting device(s) 154, and one or more item dispensing device(s) 155. A data bus may interconnect processor(s) 151, memory(s) 152, display screen(s) 153, item accepting device(s) 154, item dispensing device(s) 155, and communication interface(s) 156.

Touch-sensitive display screen(s) 153 may be and/or include one or more display devices having touch-sensitive components that enable a user of cash handling device 150 to provide touch-based input to cash handling device 150 (e.g., by touching the touch-sensitive display screen(s) 153 to make one or more selections). Item accepting device(s) 154 may be and/or include one or more electro-mechanical systems configured to receive currency, checks, cards, and/or other items (e.g., from a user of cash handling device 150) and physically organize and/or store the received items in one or more canisters, cartridges, and/or other storage components of cash handling device 150. Item dispensing device(s) 155 may be and/or include one or more electro-mechanical systems configured to physically retrieve one or more items from one or more canisters, cartridges, and/or other storage components of cash handling device 150 and dispense and/or otherwise output the retrieved items (e.g., to a user of cash handling device 150). Additionally or alternatively, item dispensing device(s) 155 may include one or more printers and/or other components configured to print and/or otherwise generate one or more receipts and/or other items (which may, e.g., be output to a user of cash handling device 150).

Communication interface 156 may be and/or include one or more network interfaces configured to support communication between cash handling device 150 and one or more networks (e.g., network 190). Memory 152 may be and/or include one or more memory units that include one or more program modules having instructions that when executed by processor(s) 151 cause cash handling device 150 to perform one or more functions described herein and/or one or more databases that may store and/or otherwise maintain information which may be used by such program modules and/or processor(s) 151. In some instances, the one or more program modules and/or databases may be stored by and/or maintained in different memory units of cash handling device 150 and/or by different computing devices that may form and/or otherwise make up cash handling device 150.

For example, memory 152 may have, store, and/or include a device registration module 152a, a containerized operating module 152b, a non-engagement services module 152e, and a secure communications module 152f Device registration module 152a may store instructions and/or data that cause and/or enable cash handling device 150 to register with a cash handling device support server (e.g., cash handling device support server 110), a first financial institution server associated with a first financial institution (e.g., financial institution server 120), and a second financial institution server associated with a second financial institution different from the first financial institution (e.g., financial institution server 130). Containerized operating module 152b may store instructions and/or data that cause and/or enable cash handling device 150 to selectively execute a first operating application associated with the first financial institution (e.g., financial institution applications 152c) or a second operating application associated with the second financial institution (e.g., financial institution applications 152d) based on user input received by the cash handling device. Non-engagement services module 152e may store instructions and/or data that cause and/or enable cash handling device 150 to generate and present one or more non-engagement user interfaces when the cash handling device (e.g., cash handling device 150) is operating in a non-engagement mode. In addition, secure communications module 152f may store instructions and/or data that cause and/or enable cash handling device 150 to track and securely communicate transaction details information to one or more servers (e.g., cash handling device support server 110, financial institution server 120, financial institution server 130) based on transactions attempted or completed at the cash handling device (e.g., cash handling device 150).

In one or more arrangements, during installation and/or registration, an automated teller machine (e.g., cash handling device 150, cash handling device 160) may utilize a federated authentication model, public cloud registration methods, and/or secure communications to register with a plurality of different servers and/or systems associated with a plurality of different entities (e.g., cash handling device support server 110, financial institution server 120, financial institution server 130) rather than registering only with a single server or system associated with a single financial institution. The automated teller machine (e.g., cash handling device 150, cash handling device 160) may use location services, satellite positioning services, and/or biometrics for security during installation and/or registration. Additionally or alternatively, the automated teller machine (e.g., cash handling device 150, cash handling device 160) may use techniques similar to those used in managed bring-your-own-device enrollment schemes. Using one or more of these techniques, the automated teller machine (e.g., cash handling device 150, cash handling device 160) may operate as a multi-tenant device capable of providing a multi-tenant user experience.

In some instances, an automated teller machine (e.g., cash handling device 150, cash handling device 160) may utilize a containerized operating system to provide segmented services and/or micro-services. Such services may, for instance, be tailored for different financial institutions, retailers, and/or other entities that may provide user experiences and/or other functionality via the automated teller machine (e.g., cash handling device 150, cash handling device 160). For example, the automated teller machine (e.g., cash handling device 150, cash handling device 160) may be configured to provide automated re-branding functionality using dynamic signage that may be incorporated into and/or connected to automated teller machine (e.g., cash handling device 150, cash handling device 160). Additionally or alternatively, the automated teller machine (e.g., cash handling device 150, cash handling device 160) may be configured to selectively launch different services depending on the transaction(s) requested by a particular user during a particular session.

In some instances, an automated teller machine (e.g., cash handling device 150, cash handling device 160) may operate in, switch between, and/or otherwise provide an engagement mode and a non-engagement mode. When operating in the engagement mode (e.g., when in use by a specific user in a particular session), the automated teller machine (e.g., cash handling device 150, cash handling device 160) may present a tailored user interface and/or user experience (which may, e.g., provide ATM and/or banking functionality, gift registry functions, and/or the like). When operating in the non-engagement mode (e.g., when not in use by a specific user in a particular session), the automated teller machine (e.g., cash handling device 150, cash handling device 160) may present a marketing user interface and/or user experience. For instance, when operating in the non-engagement mode, the automated teller machine (e.g., cash handling device 150, cash handling device 160) may display and/or otherwise present different service offerings at different times, similar to how a digital billboard may function. In addition, when a user approaches the automated teller machine (e.g., cash handling device 150, cash handling device 160) to initiate a session, the automated teller machine (e.g., cash handling device 150, cash handling device 160) may detect the user's presence using one or more cameras and/or other sensors and display and/or otherwise present one or more targeted advertisements to the user.

In some instances, an automated teller machine (e.g., cash handling device 150, cash handling device 160) may utilize blockchain technology and/or other secure communications technology to facilitate operations. For example, an ATM operator may be responsible for restocking the automated teller machine (e.g., cash handling device 150, cash handling device 160), rather than a particular financial institution. Blockchain technology may be used by automated teller machine (e.g., cash handling device 150, cash handling device 160) to accelerate transaction speed and/or facilitate other types of transactions in addition to ATM transactions like cash withdrawals and deposits, such as gift registry transactions. Additionally or alternatively, automated teller machine (e.g., cash handling device 150, cash handling device 160) may use blockchain technology to track transactions, which may in turn enable automated teller machine (e.g., cash handling device 150, cash handling device 160) to handle a relatively larger amount of transaction volume while reducing its physical cash transportation needs.

In some instances, an automated teller machine (e.g., cash handling device 150, cash handling device 160) may be configured to provide an internet-of-things (IoT) capability. Such a capability may allow the automated teller machine (e.g., cash handling device 150, cash handling device 160) to provide enhanced offerings to nearby devices and/or users, such as providing free wireless internet access. In some instances, the automated teller machine (e.g., cash handling device 150, cash handling device 160) may collect and/or analyze data associated with such enhanced offerings. Additionally or alternatively, automated teller machine (e.g., cash handling device 150, cash handling device 160) may collect, capture, and/or analyze beacon data, Bluetooth data, wireless traffic, and/or other information to support such enhanced offerings.

Most current ATMs are mainly dedicated to specific financial institutions, and their software stacks are mostly customized. In order to enable one or more aspects of the disclosure, an automated teller machine (e.g., cash handling device 150, cash handling device 160) and its underlying operating system may be segmented and/or otherwise containerized. The operating system may support multi-tenant financial institution codes within its dedicated logical containers to ensure that full financial transactions, operations, and security are contained. Containerizing various aspects of the ATM capability and micro-services may further enable non-financial institutions to offer marketing contents, product offers and/or purchases, ATM-to-ATM transfers, location-specific data collection and/or analytics, and/or other functions using the automated teller machine (e.g., cash handling device 150, cash handling device 160). These micro-services may be deployed based on transactions, location, and/or market demands for a given ATM and time-shared across different durations and hours of a day. While the automated teller machine (e.g., cash handling device 150, cash handling device 160) is not used by an ATM customer and/or an interested individual, the automated teller machine (e.g., cash handling device 150, cash handling device 160) may provide brand and marketing opportunities. When the automated teller machine (e.g., cash handling device 150, cash handling device 160) is engaged by a customer, it may trigger a relevant micro-service container for financial-institution-specific ATM transactions and/or other non-financial institution services (e.g. free wireless interact access, gift registry functions, or local offers and/or purchasing functions).

In a case of financial institution transaction (e.g., cash/check deposit or cash withdrawal), the automated teller machine (e.g., cash handling device 150, cash handling device 160) may leverage private blockchain communications to support real-time request, validation, and completion of the transaction, as well as real-time reconciliation, to ensure that all participating financial institutions are leveraging the same general ledger. In addition, any replenishment of cash into the automated teller machine (e.g., cash handling device 150, cash handling device 160) or end-ofday fund transfers across various financial institutions and the ATM operator may be done via blockchain balances. This type of ATM as a Service implementation may also enable a customer without any existing relationship with a participating financial institution to transfer money across the same ATM network or have a point-to-point video communication using the automated teller machine (e.g., cash handling device 150, cash handling device 160).

In order to implement the ATM as a Service architecture discussed above, the automated teller machine (e.g., cash handling device 150, cash handling device 160) may implement a data transport layer that is open and robust while ensuring full encryption and security. The data transport supporting ATM management, signaling, and non-financial institution and financial institution transactions may be strictly communicated to a cloud platform (e.g., cash handling device support server 110) and subsequent hosting of web and application services may allow secure and scalable operations. This approach may also allow the automated teller machine (e.g., cash handling device 150, cash handling device 160) to benefit from high speed internet connectivity while minimizing threat and/or attack surface. The initial ATM physical deployment and subsequent logical code deployment may be done using a mobile device management (MDM) approach in which the automated teller machine (e.g., cash handling device 150, cash handling device 160) is allowed to be partially operational while specific containers may become out-of-service for code deployment. The containers may be certificate signed at the device level, container level, and blockchain level to be securely deployed through the cloud platform. Based on the vast amount of data that may be collected through blockchain and the benefit of cloud-based data analytics, the automated teller machine (e.g., cash handling device 150, cash handling device 160) may also be equipped with various sensors (e.g., beacon, wireless, camera, and/or the like) and IoT capabilities to enrich the data collections and relevance to potential service providers, financial institutions, and other participants interested in leveraging and marketing at the location where the automated teller machine (e.g., cash handling device 150, cash handling device 160) is deployed. In addition, the proactive fault and/or performance management, cash replenishment and demand management, ATM service restoral may be performed based on robust data analytics appropriate for each automated teller machine (e.g., cash handling device 150, cash handling device 160) and its market.

As illustrated above, one or more aspects of the disclosure may enable an automated teller machine (e.g., cash handling device 150, cash handling device 160) to be multi-purposed and multi-tenant. In addition, aspects of the disclosure may enable an automated teller machine (e.g., cash handling device 150, cash handling device 160) to securely contain and segment micro-services that allow financial institutions and non-financial institutions to benefit from the automated teller machine (e.g., cash handling device 150, cash handling device 160). Further, the automated teller machine (e.g., cash handling device 150, cash handling device 160) may use blockchain technology to improve customer transactions, ATM and/or cash liabilities, micro-service and/or container immutability, and inter-financial institution cash balance calculations. Additionally, the automated teller machine (e.g., cash handling device 150, cash handling device 160) may register and/or communicate securely with a cloud platform. Further, the automated teller machine (e.g., cash handling device 150, cash handling device 160) may leverage IoT capabilities to collect additional metrics and data points to improve marketability of the automated teller machine (e.g., cash handling device 150, cash handling device 160) and its micro-service platform. Additionally, the automated teller machine (e.g., cash handling device 150, cash handling device 160) may leverage big data analytics to improve ATM performance, cash availability and successful sales offers.

FIGS. 2A-2H depict an illustrative event sequence for deploying, configuring, and utilizing cash handling devices to provide dynamic and adaptable operating functions in accordance with one or more example embodiments. For example, the example event sequence depicted in FIGS. 2A-2H illustrates how a multi-tenant cash handling device, such as cash handling device 150, may be initially registered and provisioned to enable the device to subsequently process transactions and other requests from various users.

Figure 2A:
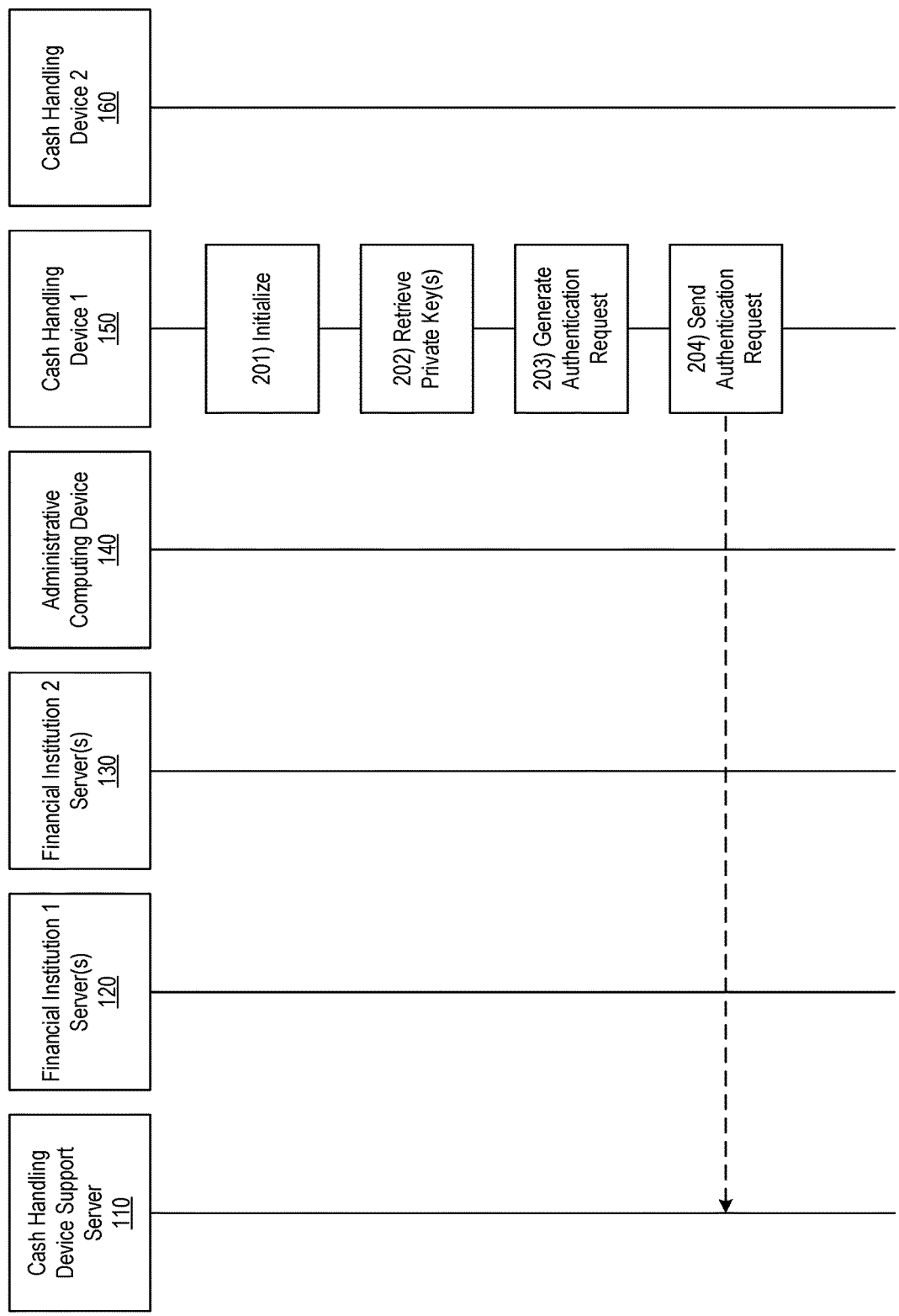
Figure 6:
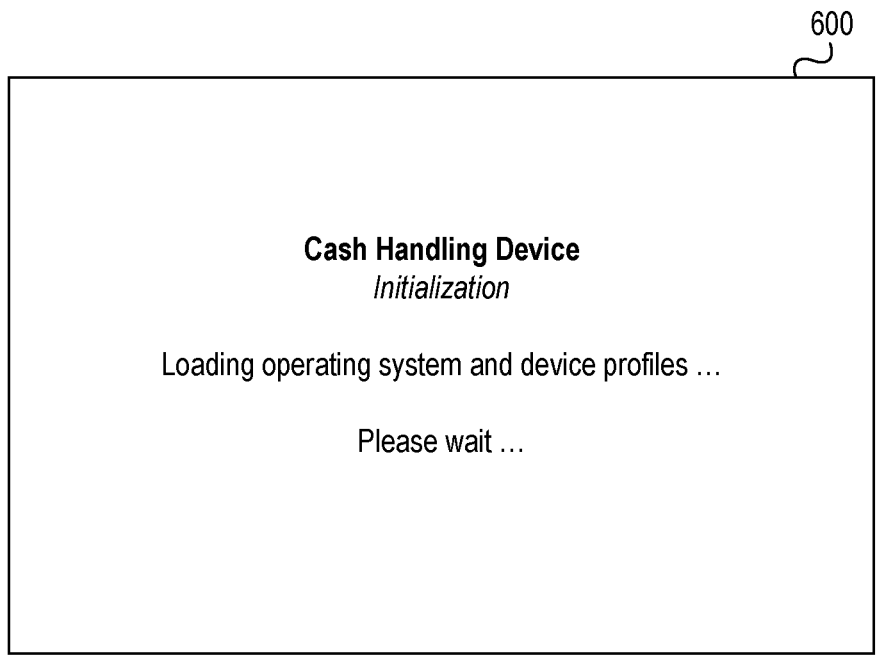
FIGS. 6-15 depict illustrative graphical user interfaces associated with deploying, configuring, and utilizing cash handling devices to provide dynamic and adaptable operating functions in accordance with one or more example embodiments.

Referring to FIG. 2A, at step 201, cash handling device 150 may initialize. For example, cash handling device 150 may power on after being connected to a power source, may load an operating system into memory, and may begin executing computer-readable instructions (which may, e.g., be associated with the operating system of cash handling device 150). In some instances, when initializing, cash handling device 150 may display and/or otherwise present one or more graphical user interfaces (e.g., on touch-sensitive display screen(s) 153). For example, cash handling device 150 may display and/or otherwise present a graphical user interface similar to graphical user interface 600, which is illustrated in FIG. 6. As seen in FIG. 6, graphical user interface 600 may include information indicating that cash handling device 150 is loading its operating system, device profiles, and/or other initial settings and/or data and/or otherwise performing one or more initialization tasks.

At step 202, cash handling device 150 may retrieve one or more private keys from one or more hardware elements included in cash handling device 150. For example, at step 202, cash handling device 150 may retrieve a private encryption key from a secure hardware element built into control circuitry of the cash handling device (e.g., cash handling device 150). Such a private encryption key may, for instance, be stored on a physical electronic chip or circuit board embedded in and/or otherwise included inside of cash handling device 150. Additionally or alternatively, the private encryption key may be linked to a unique hardware identifier assigned to and/or otherwise associated with cash handling device 150.

At step 203, cash handling device 150 may generate an authentication request (e.g., based on the private encryption key and/or a unique hardware identifier). For example, at step 203, cash handling device 150 may generate an authentication request based on the private encryption key retrieved from the secure hardware element built into the control circuitry of the cash handling device (e.g., cash handling device 150).

At step 204, cash handling device 150 may send the authentication request to cash handling device support server 110 (e.g., by establishing a connection with cash handling device support server 110 and sending the authentication request to cash handling device support server 110 while the connection is established). For example, at step 204, cash handling device 150 may send, via the communication interface (e.g., communication interface 156), to a cash handling device support server (e.g., cash handling device support server 110), the authentication request generated based on the private encryption key retrieved from the secure hardware element built into the control circuitry of the cash handling device (e.g., cash handling device 150). In some instances, cash handling device support server 110 may be maintained and/or operated independently of one or more financial institutions, such as the financial institutions associated with financial institution server 120 and financial institution server 130, and cash handling device 150 may register with cash handling device support server 110 so as to support multi-tenant functions that provide services associated with such financial institutions.

Figure 2B:
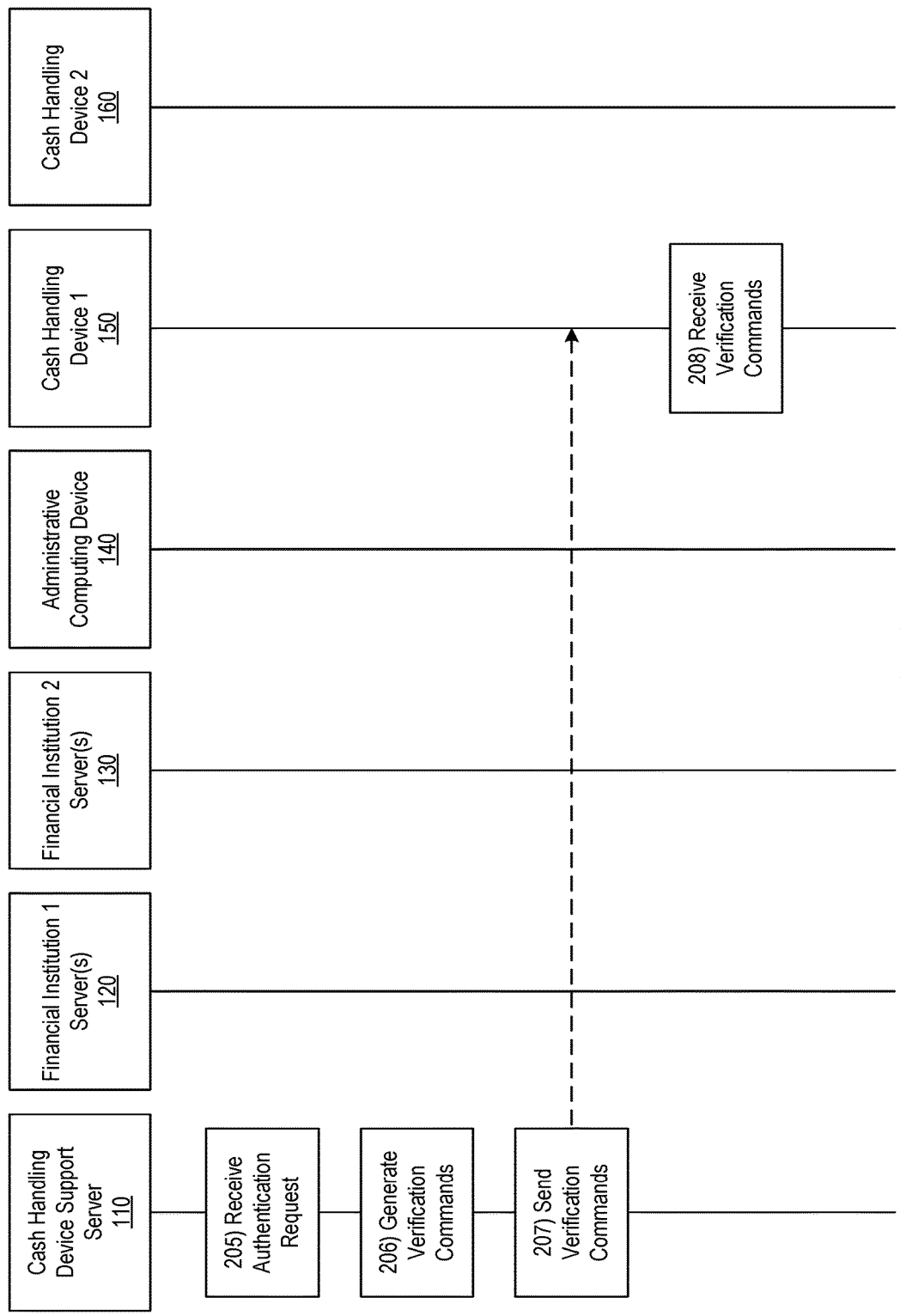

Referring to FIG. 2B, at step 205, cash handling device support server 110 may receive the authentication request from cash handling device 150. At step 206, cash handling device support server 110 may generate one or more verification commands (which may, e.g., direct cash handling device 150 to perform specific actions to complete the registration and/or provisioning process). At step 207, cash handling device support server 110 may send the one or more verification commands to cash handling device 150.

At step 208, cash handling device 150 may receive the one or more verification commands from cash handling device support server 110. For example, at step 208, after sending, to the cash handling device support server (e.g., cash handling device support server 110), the authentication request generated based on the private encryption key retrieved from the secure hardware element built into the control circuitry of the cash handling device (e.g., cash handling device 150), cash handling device 150 may receive, via the communication interface (e.g., communication interface 156), from the cash handling device support server (e.g., cash handling device support server 110), one or more verification commands generated by the cash handling device support server (e.g., cash handling device support server 110). Cash handling device 150 subsequently may execute the one or more verification commands generated by the cash handling device support server (e.g., cash handling device support server 110), which may cause cash handling device 150 to perform one or more of the following steps.

Figure 2C:
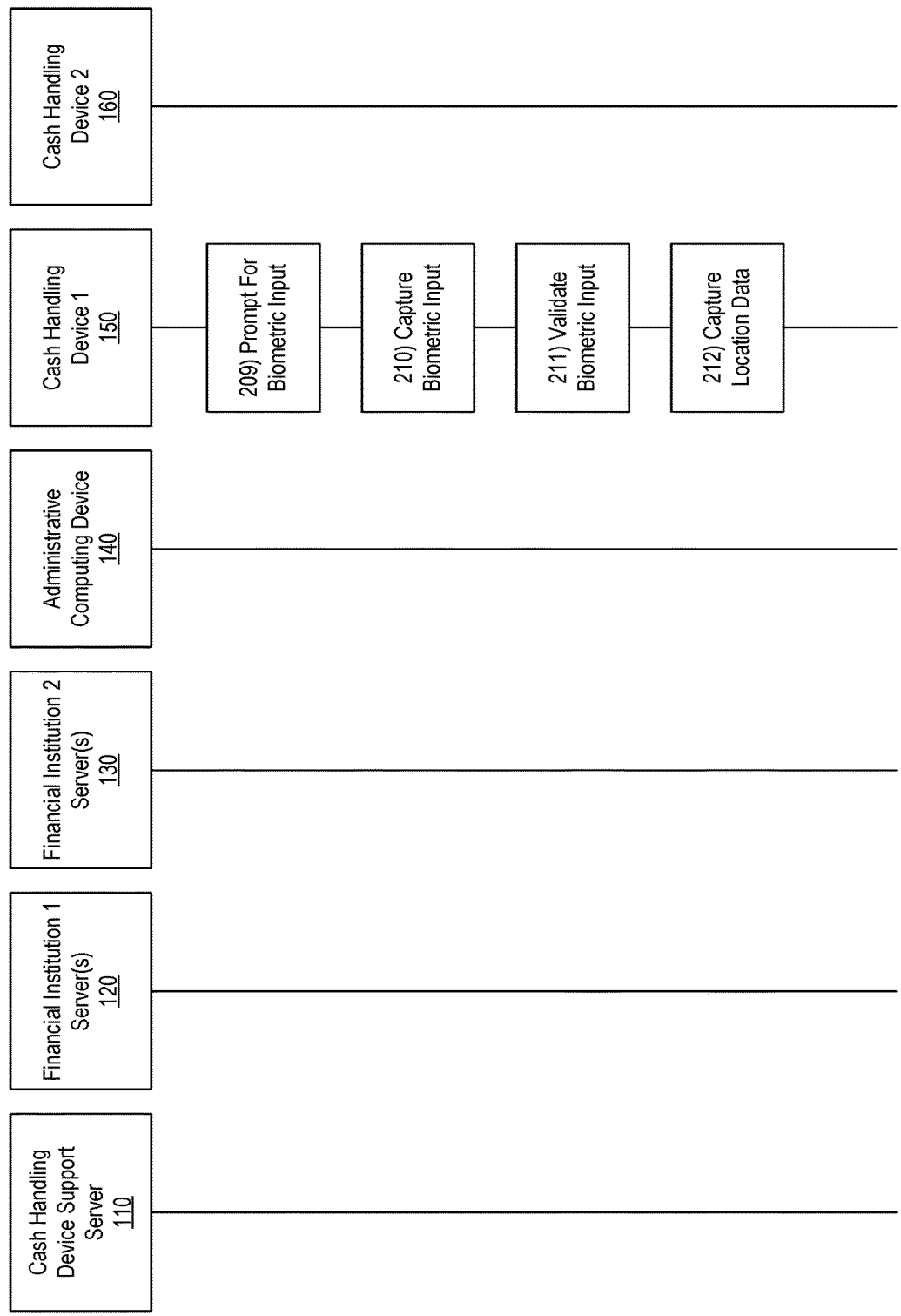
Figure 7:
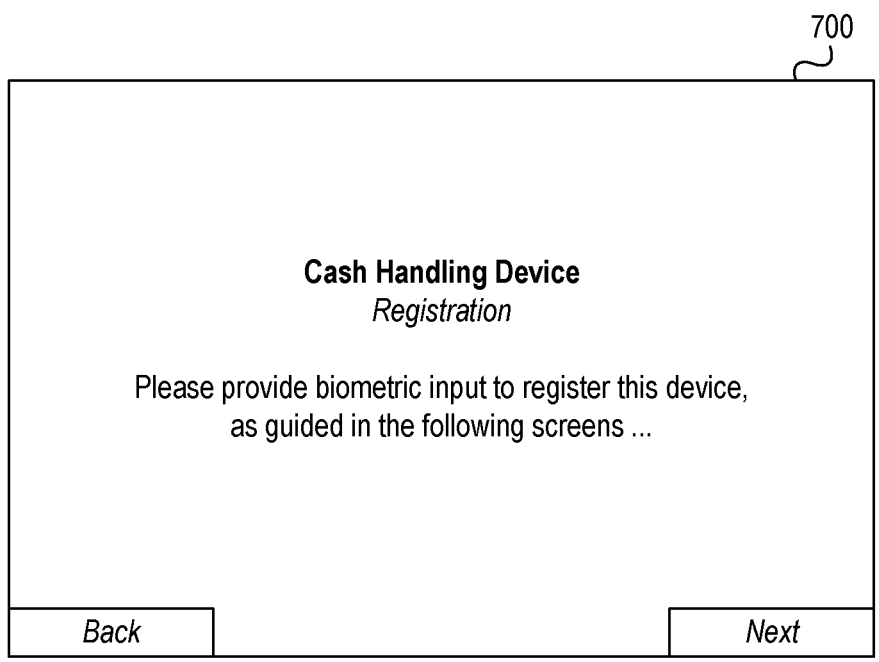

Referring to FIG. 2C, at step 209, cash handling device 150 may prompt a user of cash handling device 150 (who may, e.g., be a technician installing and/or registering cash handling device 150) to provide biometric input. For example, at step 209, cash handling device 150 may prompt a user of the cash handling device (e.g., cash handling device 150) to respond to one or more biometric authentication prompts based on the one or more verification commands received from the cash handling device support server (e.g., cash handling device support server 110). In some instances, when prompting a user to provide biometric input, cash handling device 150 may display and/or otherwise present one or more graphical user interfaces (e.g., on touch-sensitive display screen(s) 153). For example, cash handling device 150 may display and/or otherwise present a graphical user interface similar to graphical user interface 700, which is illustrated in FIG. 7. As seen in FIG. 7, graphical user interface 700 may include information prompting the user of cash handling device 150 to provide biometric input to register cash handling device 150 by guiding the user of cash handling device 150 through a series of screens.

At step 210, cash handling device 150 may capture biometric input. For example, at step 210, cash handling device 150 may capture biometric input from the user of the cash handling device (e.g., cash handling device 150). In capturing biometric input from the user of the cash handling device (e.g., cash handling device 150), cash handling device 150 may capture voice biometric input from the user of cash handling device 150, fingerprint biometric input from the user of cash handling device 150, facial image scan biometric input from the user of cash handling device 150, retinal image scan biometric input from the user of cash handling device 150, and/or other biometric input from the user of cash handling device 150.

At step 211, cash handling device 150 may validate the captured biometric input. For example, at step 211, cash handling device 150 may validate the biometric input captured from the user of the cash handling device (e.g., cash handling device 150). In validating the captured biometric input, cash handling device 150 may, for example, determine whether the captured biometric input matches one or more biometric profiles associated with one or more authorized users of cash handling device 150 and/or whether the captured biometric input is otherwise valid. If cash handling device 150 determines that the captured biometric input is valid, then the example event sequence may proceed as illustrated; alternatively, if cash handling device 150 determines that the captured biometric input is not valid, then cash handling device 150 may generate, present, and/or send one or more error messages and the example event sequence may end.

At step 212, cash handling device 150 may capture location data associated with its deployment location (e.g., using a built-in global positioning system (GPS) receiver and/or other positioning technology). For example, at step 212, cash handling device 150 may capture location data identifying a location of the cash handling device (e.g., cash handling device 150) based on the one or more verification commands received from the cash handling device support server (e.g., cash handling device support server 110).

In some embodiments, capturing the location data identifying the location of the cash handling device based on the one or more verification commands received from the cash handling device support server may include capturing satellite positioning data associated with the location of the cash handling device from a satellite positioning receiver built into the cash handling device. For example, in capturing the location data identifying the location of the cash handling device (e.g., cash handling device 150) based on the one or more verification commands received from the cash handling device support server (e.g., cash handling device support server 110), cash handling device 150 may capture satellite positioning data associated with the location of the cash handling device (e.g., cash handling device 150) from a satellite positioning receiver built into the cash handling device (e.g., cash handling device 150).

Figure 2D:
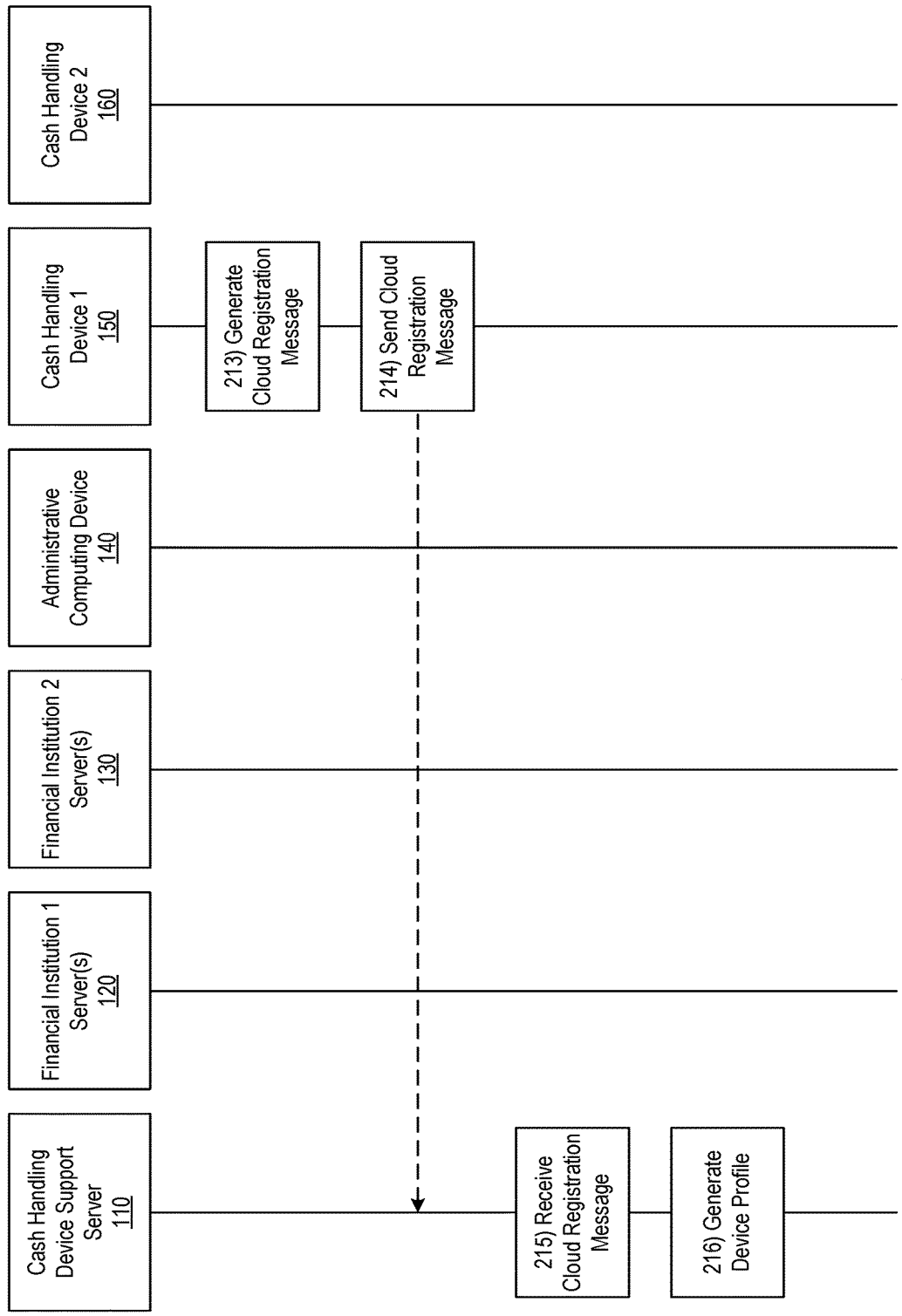

Referring to FIG. 2D, at step 213, cash handling device 150 may generate a cloud registration message (which may, e.g., include the captured biometric input, the captured location data, information indicating that the captured biometric input was validated and/or otherwise determined to be valid, and/or information indicating that the captured location data was validated and/or otherwise determined to be valid). For example, at step 213, cash handling device 150 may generate one or more cloud registration messages to enroll the cash handling device (e.g., cash handling device 150) in a device management scheme managed by the cash handling device support server (e.g., cash handling device support server 110), based on validating the biometric input captured from the user of the cash handling device (e.g., cash handling device 150) and based on capturing the location data identifying the location of the cash handling device (e.g., cash handling device 150).

At step 214, cash handling device 150 may send the cloud registration message to cash handling device support server 110. For example, at step 214, cash handling device 150 may send, via the communication interface (e.g., communication interface 156), to the cash handling device support server (e.g., cash handling device support server 110), the one or more cloud registration messages.

At step 215, cash handling device support server 110 may receive the cloud registration message from cash handling device 150. At step 216, cash handling device support server 110 may generate a device profile for cash handling device 150 (e.g., based on the cloud registration message received from cash handling device 150). For example, the device profile generated for cash handling device 150 by cash handling device support server 110 may include a device identifier assigned to cash handling device 150 by cash handling device support server 110, authorization information, information identifying one or more financial institutions that cash handling device 150 is usable and/or compatible with, and/or other information.

Figure 2E:
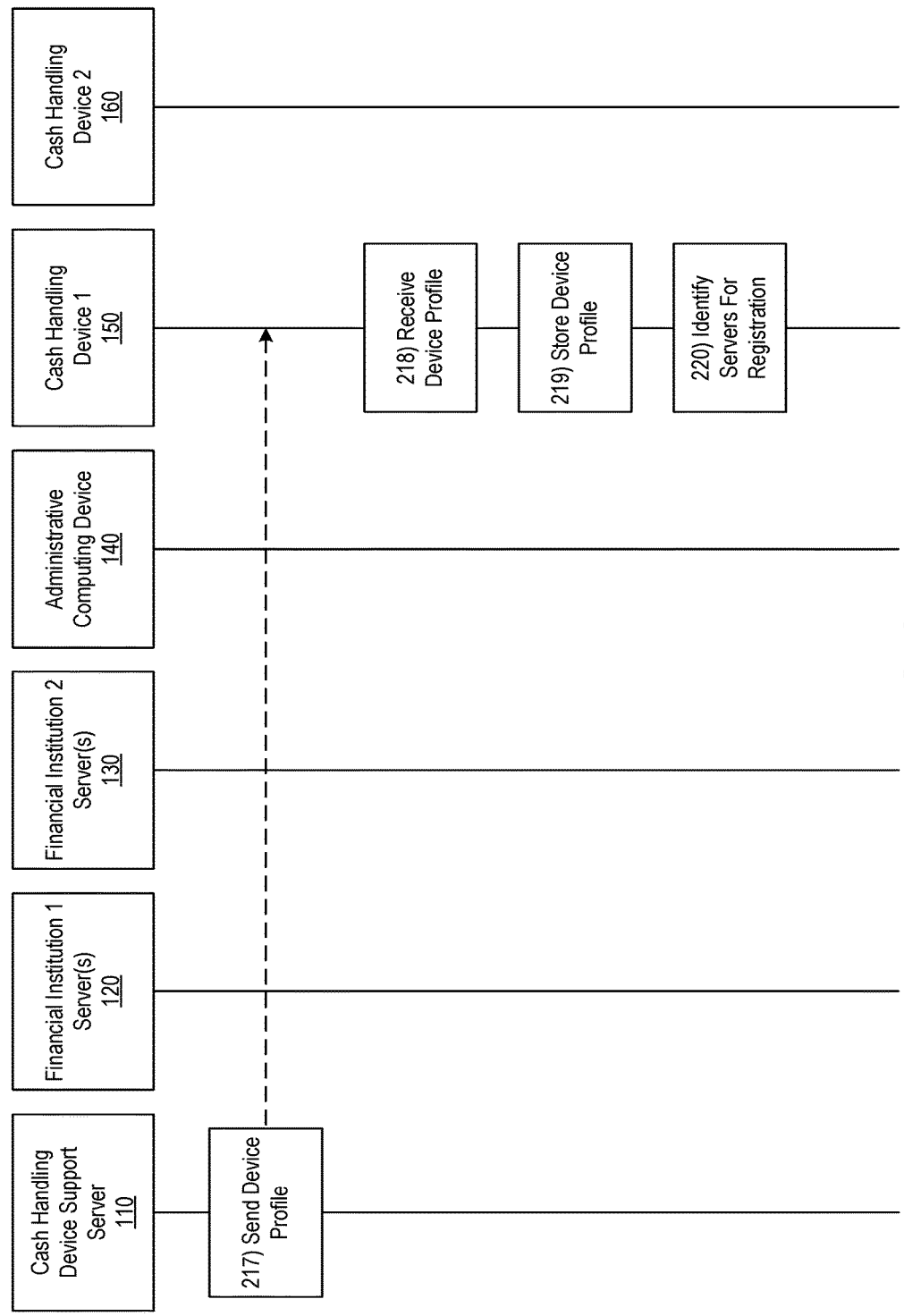

Referring to FIG. 2E, at step 217, cash handling device support server 110 may send the device profile generated for cash handling device 150 to cash handling device 150. At step 218, cash handling device 150 may receive the device profile from cash handling device support server 110. For example, at step 218, after sending the one or more cloud registration messages to the cash handling device support server (e.g., cash handling device support server 110), cash handling device 150 may receive, via the communication interface (e.g., communication interface 156), from the cash handling device support server (e.g., cash handling device support server 110), a device profile generated for the cash handling device (e.g., cash handling device 150) by the cash handling device support server (e.g., cash handling device support server 110).

At step 219, cash handling device 150 may store the device profile (e.g., in a device keychain and/or in another secure profile store). For example, at step 219, cash handling device 150 may store the device profile received from the cash handling device support server (e.g., cash handling device support server 110). In some embodiments, the device profile received from the cash handling device support server may include information identifying the first banking server associated with the first financial institution and information identifying the second banking server associated with the second financial institution. For example, the device profile received (e.g., by cash handling device 150) from the cash handling device support server (e.g., cash handling device support server 110) may include information identifying the first banking server (e.g., financial institution server 120) associated with the first financial institution and information identifying the second banking server (e.g., financial institution server 130) associated with the second financial institution.

In some embodiments, receiving the device profile from the cash handling device support server may cause the cash handling device to register with the first banking server associated with the first financial institution and the second banking server associated with the second financial institution. For example, receiving the device profile from the cash handling device support server (e.g., cash handling device support server 110) may cause the cash handling device (e.g., cash handling device 150) to register with the first banking server (e.g., financial institution server 120) associated with the first financial institution and the second banking server (e.g., financial institution server 130) associated with the second financial institution At step 220, cash handling device 150 may identify one or more servers to register with (e.g., based on the device profile received from cash handling device support server 110).

Referring to FIG. 2F, at step 221, cash handling device 150 may generate a registration request for financial institution server 120 (e.g., based on the device profile received from cash handling device support server 110 including commands and/or other information directing and/or otherwise causing cash handling device 150 to register with financial institution server 120). For example, at step 221, cash handling device 150 may generate a first registration request for a first banking server (e.g., financial institution server 120) associated with a first financial institution.

At step 222, cash handling device 150 may send the registration request to financial institution server 120. For example, at step 222, cash handling device 150 may send, via the communication interface (e.g., communication interface 156), to the first banking server (e.g., financial institution server 120) associated with the first financial institution, the first registration request generated for the first banking server (e.g., financial institution server 120) associated with the first financial institution.

At step 223, cash handling device 150 may receive a provisioning profile from financial institution server 120 (which may, e.g., be generated by financial institution server 120 for cash handling device 150 to provision cash handling device 150 with the profile, enable cash handling device 150 to process one or more transactions on behalf of the first financial institution, and/or perform other functions associated with financial institution server 120). For example, at step 223, after sending the first registration request to the first banking server (e.g., financial institution server 120) associated with the first financial institution, cash handling device 150 may receive, via the communication interface (e.g., communication interface 156), from the first banking server (e.g., financial institution server 120) associated with the first financial institution, a first device provisioning profile generated by the first banking server (e.g., financial institution server 120) associated with the first financial institution for the cash handling device (e.g., cash handling device 150).

At step 224, cash handling device 150 may store the provisioning profile received from financial institution server 120 (e.g., in a device keychain and/or in another secure profile store, which may enable cash handling device 150 to execute an operating application associated with financial institution server 120, as illustrated below). For example, at step 224, cash handling device 150 may store the first device provisioning profile received from the first banking server (e.g., financial institution server 120) associated with the first financial institution, and the first device provisioning profile received from the first banking server (e.g., financial institution server 120) associated with the first financial institution may enable the cash handling device (e.g., cash handling device 150) to execute a first operating application associated with the first financial institution (e.g., financial institution server 120).

Referring to FIG. 2G, at step 225, cash handling device 150 may generate a registration request for financial institution server 130 (e.g., based on the device profile received from cash handling device support server 110 including commands and/or other information directing and/or otherwise causing cash handling device 150 to register with financial institution server 130). For example, at step 225, cash handling device 150 may generate a second registration request for a second banking server (e.g., financial institution server 130) associated with a second financial institution. The second financial institution may be different from the first financial institution associated with financial institution server 120.

At step 226, cash handling device 150 may send the registration request to financial institution server 130. For example, at step 226, cash handling device 150 may send, via the communication interface (e.g., communication interface 156), to the second banking server (e.g., financial institution server 130) associated with the second financial institution, the second registration request generated for the second banking server (e.g., financial institution server 130) associated with the second financial institution.

At step 227, cash handling device 150 may receive a provisioning profile from financial institution server 130 (which may, e.g., be generated by financial institution server 130 for cash handling device 150 to provision cash handling device 150 with the profile, enable cash handling device 150 to process one or more transactions on behalf of the second financial institution, and/or perform other functions associated with financial institution server 130). For example, at step 227, after sending the second registration request to the second banking server (e.g., financial institution server 130) associated with the second financial institution, cash handling device 150 may receive, via the communication interface (e.g., communication interface 156), from the second banking server (e.g., financial institution server 130) associated with the second financial institution, a second device provisioning profile generated by the second banking server (e.g., financial institution server 130) associated with the second financial institution for the cash handling device (e.g., cash handling device 150).

At step 228, cash handling device 150 may store the provisioning profile received from financial institution server 130 (e.g., in a device keychain and/or in another secure profile store, which may enable cash handling device 150 to execute an operating application associated with financial institution server 130, as illustrated below). For example, at step 228, cash handling device 150 may store the second device provisioning profile received from the second banking server (e.g., financial institution server 130) associated with the second financial institution, and the second device provisioning profile received from the second banking server (e.g., financial institution server 130) associated with the second financial institution may enable the cash handling device (e.g., cash handling device 150) to execute a second operating application associated with the second financial institution. The second operating application may be different from the first operating application, for instance, because the second operating application may provide one or more functions specific to the second financial institution, whereas the first operating application may provide one or more functions specific to the first financial institution.

Figure 2H:
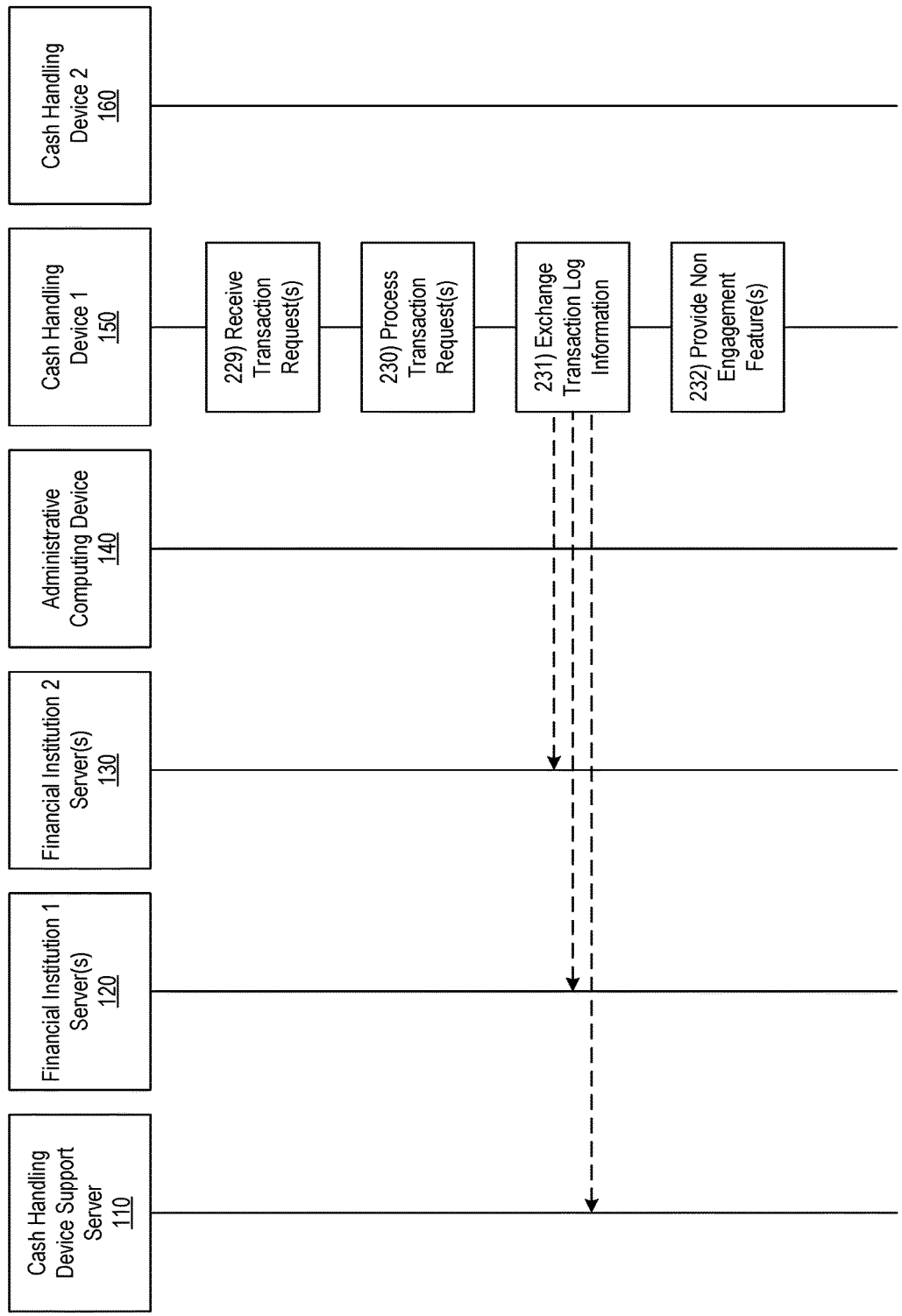

Referring to FIG. 2H, at step 229, cash handling device 150 may receive one or more transaction requests (e.g., from one or more users of cash handling device 150). At step 230, cash handling device 150 may process the one or more transaction requests (e.g., by executing various operating applications based on various device provisioning profiles, as discussed below). For example, cash handling device 150 may receive a first transaction request associated with the first financial institution from a first user of the cash handling device (e.g., cash handling device 150). Subsequently, cash handling device 150 may process the first transaction request associated with the first financial institution by executing the first operating application associated with the first financial institution. Additionally or alternatively, cash handling device 150 may receive a second transaction request associated with the second financial institution from a second user of the cash handling device (e.g., cash handling device 150). Subsequently, cash handling device 150 may process the second transaction request associated with the second financial institution by executing the second operating application associated with the second financial institution.

At step 231, cash handling device 150 may exchange transaction log information with various servers and/or other devices (e.g., cash handling device support server 110, financial institution server 120, financial institution server 130) based on processing one or more transactions. For example, after processing the first transaction request associated with the first financial institution and processing the second transaction request associated with the second financial institution, cash handling device 150 may exchange, via the communication interface (e.g., communication interface 156), first transaction log information with the first banking server (e.g., financial institution server 120) based on processing the first transaction request associated with the first financial institution. In addition, cash handling device 150 may exchange, via the communication interface (e.g., communication interface 156), second transaction log information with the second banking server (e.g., financial institution server 130) based on processing the second transaction request associated with the second financial institution. Further, cash handling device 150 may exchange, via the communication interface (e.g., communication interface 156), third transaction log information with a cash handling device support server (e.g., cash handling device support server 110) based on processing the first transaction request associated with the first financial institution and based on processing the second transaction request associated with the second financial institution.

At step 232, cash handling device 150 may provide one or more non-engagement features (e.g., by executing one or more native and/or built-in non-engagement applications, as discussed below). For example, at step 232, after processing the first transaction request associated with the first financial institution and processing the second transaction request associated with the second financial institution, cash handling device 150 may present one or more non-engagement user interfaces.

FIGS. 3A-3H depict another illustrative event sequence for deploying, configuring, and utilizing cash handling devices to provide dynamic and adaptable operating functions in accordance with one or more example embodiments. For example, the example event sequence depicted in FIGS. 3A-3H illustrates how a multi-tenant cash handling device, such as cash handling device 150, may utilize a container-based operating system to execute containerized operating applications so as to provide segmented operating functionality and process transactions and other requests from various users on behalf of different financial institutions and/or other organizations. In some instances, one or more steps discussed below may follow one or more of the steps discussed above in connection with the previous example event sequence.

Referring to FIG. 3A, at step 301, cash handling device 150 may identify one or more operating applications to download (e.g., based on receiving the device profile and/or the provisioning profiles discussed above, which may include information identifying the one or more operating applications to download and/or other information associated with the one or more operating applications to download). For example, at step 301, prior to receiving input requesting a transaction from a user, cash handling device 150 may identify one or more operating applications to download based on a device profile generated for the cash handling device (e.g., cash handling device 150) by a cash handling device support server (e.g., cash handling device support server 110). For instance, the device profile may identify one or more engagement-mode operating applications that are each specific to a particular financial institution and/or one or more non-engagement mode applications (which may, e.g., be executed to provide one or more non-engagement features when cash handling device 150 is operating in a non-engagement mode, as discussed below).

At step 302, cash handling device 150 may generate an operating application request for financial institution server 120 (e.g., based on a provisioning profile received from and/or otherwise associated with financial institution server 120). For example, at step 302, based on identifying the one or more operating applications to download, cash handling device 150 may generate a first operating application request for the first operating application associated with the first financial institution. At step 303, cash handling device 150 may send the operating application request to financial institution server 120. For example, at step 303, cash handling device 150 may send, via the communication interface (e.g., communication interface 156), to a first banking server (e.g., financial institution server 120) associated with the first financial institution, the first operating application request. At step 304, financial institution server 120 may receive the operating application request from cash handling device 150.

Referring to FIG. 3B, at step 305, financial institution server 120 may validate the operating application request received from cash handling device 150 (e.g., by determining whether and/or confirming that the operating application request received from cash handling device 150 is valid based on the device profile associated with cash handling device 150, the provisioning profile associated with cash handling device 150, and/or other information included in the operating application request received from cash handling device 150).

At step 306, financial institution server 120 may configure an operating application for cash handling device 150. For example, the operating application may be executable by cash handling device 150 to provide one or more user interfaces and/or a user experience associated with the financial institution operating financial institution server 120, and financial institution server 120 may configure the operating application by defining one or more settings and/or modifying one or more default variables that may be specific to cash handling device 150 and/or the specific deployment of cash handling device 150, so as to enable cash handling device 150 to execute the configured operating application, as discussed below. Once configured by financial institution server 120, the operating application may, for instance, enable one or more users of cash handling device 150 to conduct transactions (e.g., withdrawal transactions, deposit transactions, and/or other transactions) at cash handling device 150 involving one or more accounts maintained by the financial institution operating financial institution server 120. At step 307, financial institution server 120 may send the configured operating application to cash handling device 150.

At step 308, cash handling device 150 may receive the configured operating application from financial institution server 120. For example, at step 308, cash handling device 150 may receive, via the communication interface (e.g., communication interface 156), from the first banking server (e.g., financial institution server 120) associated with the first financial institution, the first operating application associated with the first financial institution. In addition, cash handling device 150 may store the first operating application associated with the first financial institution received from the first banking server (e.g., financial institution server 120) associated with the first financial institution.

Figure 3C:
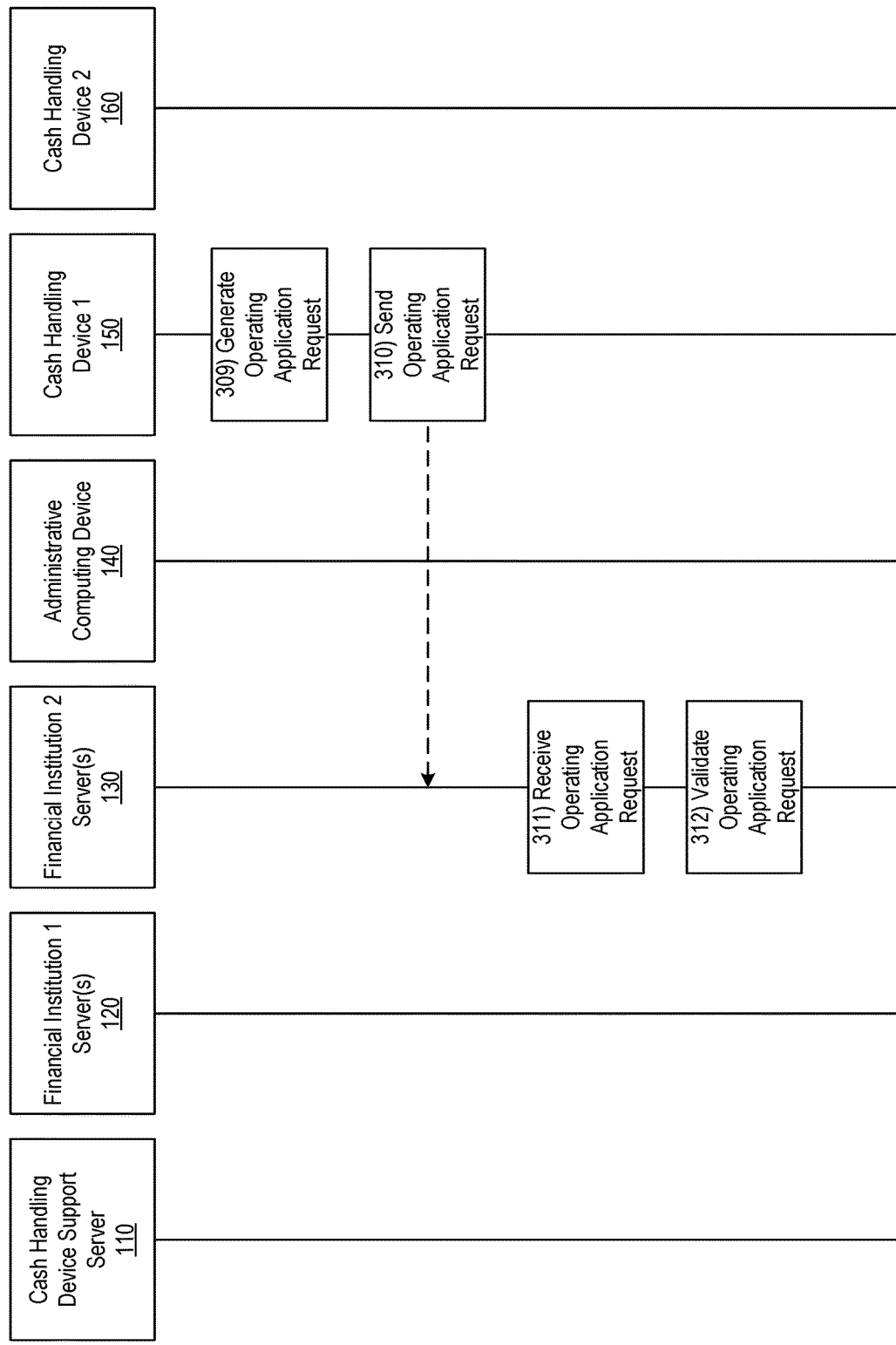

Referring to FIG. 3C, at step 309, cash handling device 150 may generate an operating application request for financial institution server 130 (e.g., based on a provisioning profile received from and/or otherwise associated with financial institution server 130). For example, at step 309, based on identifying the one or more operating applications to download, cash handling device 150 may generate a second operating application request for the second operating application associated with the second financial institution. At step 310, cash handling device 150 may send the operating application request to financial institution server 130. For example, at step 310, cash handling device 150 may send, via the communication interface (e.g., communication interface 156), to a second banking server (e.g., financial institution server 130) associated with the second financial institution, the second operating application request. At step 311, financial institution server 130 may receive the operating application request from cash handling device 150.

At step 312, financial institution server 130 may validate the operating application request received from cash handling device 150 (e.g., by determining whether and/or confirming that the operating application request received from cash handling device 150 is valid based on the device profile associated with cash handling device 150, the provisioning profile associated with cash handling device 150, and/or other information included in the operating application request received from cash handling device 150).

Figure 3D:
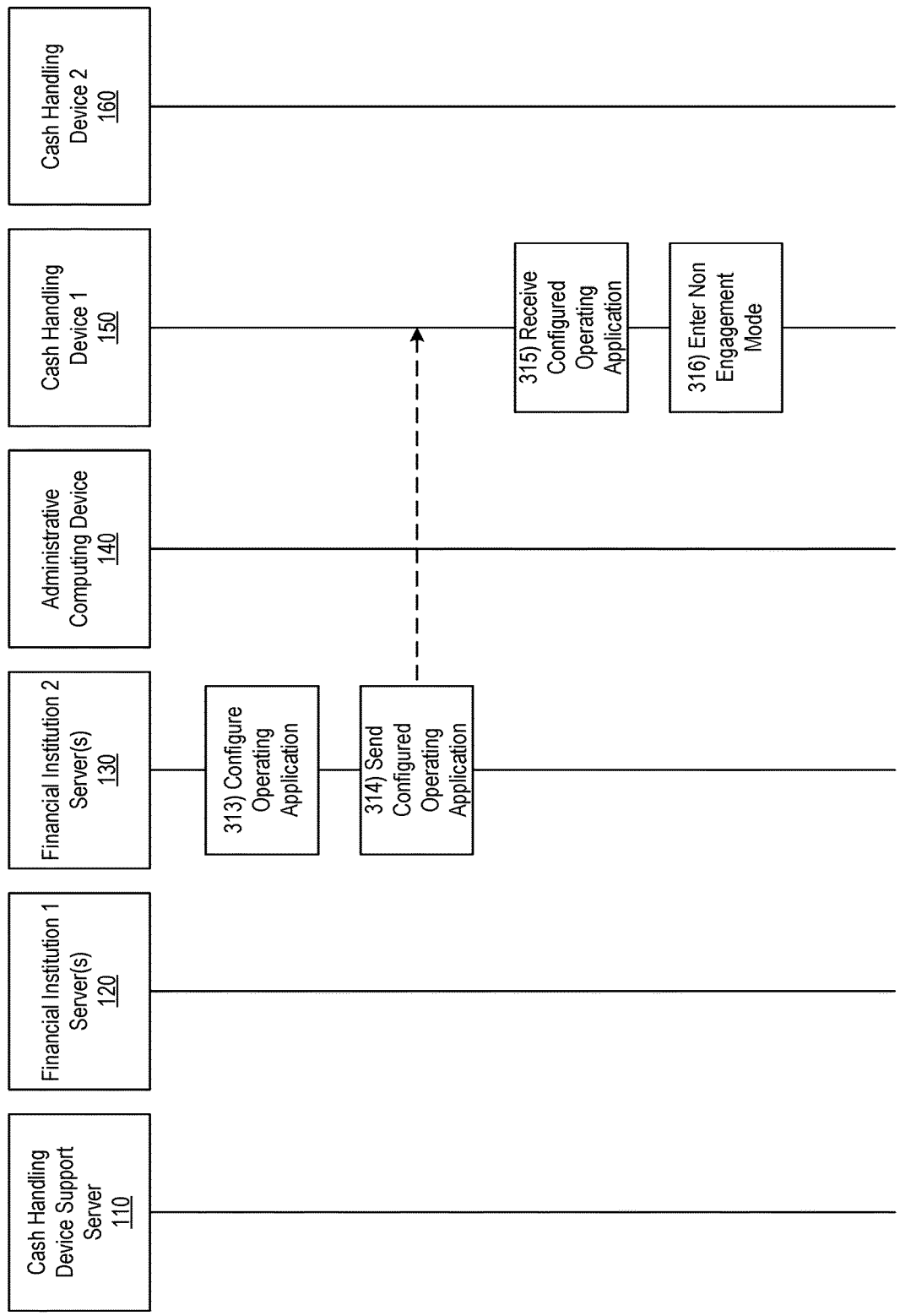

Referring to FIG. 3D, at step 313, financial institution server 130 may configure an operating application for cash handling device 150. For example, the operating application may be executable by cash handling device 150 to provide one or more user interfaces and/or a user experience associated with the financial institution operating financial institution server 130, and financial institution server 130 may configure the operating application by defining one or more settings and/or modifying one or more default variables that may be specific to cash handling device 150 and/or the specific deployment of cash handling device 150, so as to enable cash handling device 150 to execute the configured operating application, as discussed below. Once configured by financial institution server 130, the operating application may, for instance, enable one or more users of cash handling device 150 to conduct transactions (e.g., withdrawal transactions, deposit transactions, and/or other transactions) at cash handling device 150 involving one or more accounts maintained by the financial institution operating financial institution server 130. At step 314, financial institution server 130 may send the configured operating application to cash handling device 150.

At step 315, cash handling device 150 may receive the configured operating application from financial institution server 130. For example, at step 315, cash handling device 150 may receive, via the communication interface (e.g., communication interface 156), from the second banking server (e.g., financial institution server 130) associated with the second financial institution, the second operating application associated with the second financial institution. In addition, cash handling device 150 may store the second operating application associated with the second financial institution received from the second banking server (e.g., financial institution server 130) associated with the second financial institution.

At step 316, cash handling device 150 may enter a non-engagement mode. For example, at step 316, cash handling device 150 may enter a non-engagement mode by presenting one or more non-engagement user interfaces and/or a non-engagement user experience, as discussed in greater detail below. Cash handling device 150 may, for instance, present the one or more non-engagement user interfaces and/or the non-engagement user experience while waiting for a user to engage with and/or interact with cash handling device 150, and the one or more non-engagement user interfaces and/or the non-engagement user experience may include advertising content, marketing content, and/or other content that may be relevant to various potential users of cash handling device 150 who may visit the deployment location of cash handling device 150. In some instances, cash handling device 150 may present the one or more non-engagement user interfaces and/or the non-engagement user experience by executing a non-engagement application in a sandbox provided by the operating system of cash handling device 150 (which may, e.g., separate the non-engagement application and associated non-engagement content from the one or more operating applications associated with various financial institutions).

Figure 3E:
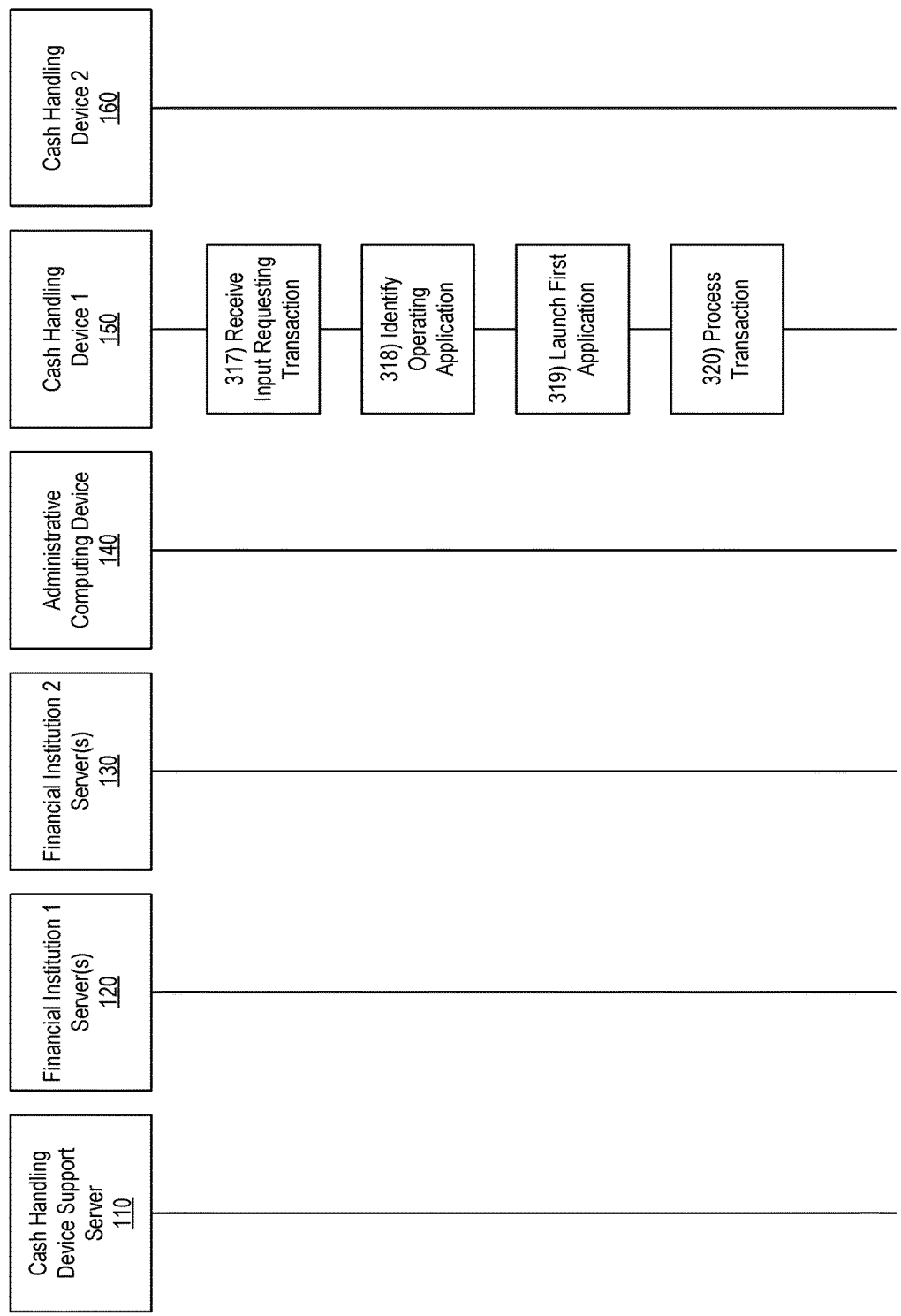

Referring to FIG. 3E, at step 317, cash handling device 150 may receive input requesting a transaction. For example, at step 317, cash handling device 150 may receive input requesting a first transaction from a first user of the cash handling device (e.g., cash handling device 150). Such input may, for instance, correspond to a user selection received via a user interface presented by cash handling device 150, and the user selection may correspond to a request to perform a transaction with the financial institution associated with financial institution server 120. In some instances, in receiving input requesting a transaction, cash handling device 150 may receive a debit card, credit card, or other physical account token linked to a specific financial institution, such as the financial institution associated with financial institution server 120. Additionally or alternatively, in receiving input requesting a transaction, cash handling device 150 may receive one or more commands transmitted to cash handling device 150 by a user computing device (e.g., a user's smart phone or other mobile device that may be within a predetermined distance of cash handling device 150).

Figure 8:
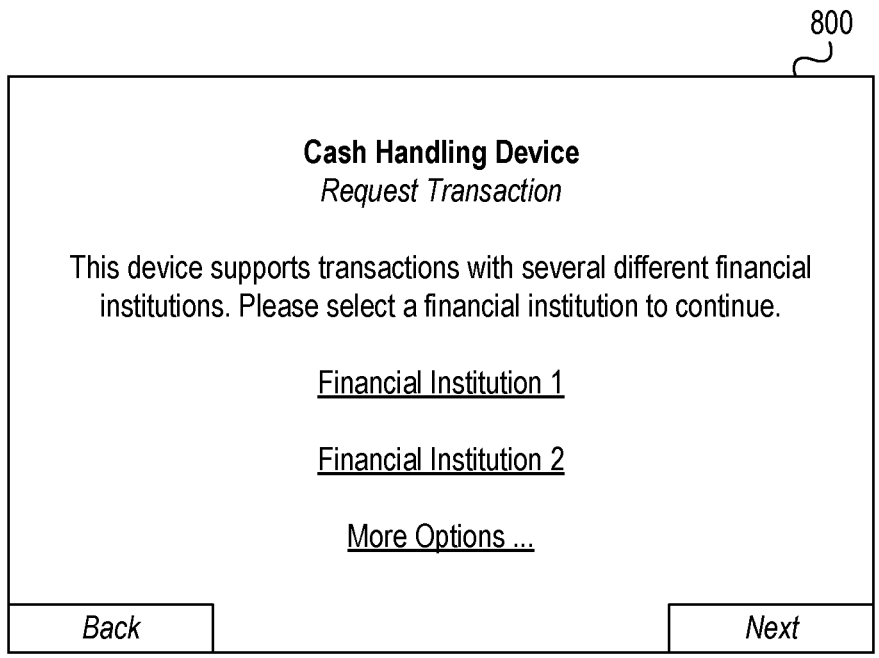

In some instances, in receiving input requesting a transaction, cash handling device 150 may display and/or otherwise present one or more graphical user interfaces (e.g., on touch-sensitive display screen(s) 153) via which the input requesting the transaction may be received. For example, cash handling device 150 may display and/or otherwise present a graphical user interface similar to graphical user interface 800, which is illustrated in FIG. 8. As seen in FIG. 8, graphical user interface 800 may include information prompting the user of cash handling device 150 to select a financial institution associated with the transaction being requested by the user of cash handling device 150.

In some embodiments, receiving the input requesting the first transaction from the first user of the cash handling device may include receiving, via the touch-sensitive display screen, input selecting the first financial institution from a listing of financial institutions linked to the cash handling device included in a user interface presented by the cash handling device. For example, in receiving the input requesting the first transaction from the first user of the cash handling device (e.g., cash handling device 150), cash handling device 150 may receive, via the touch-sensitive display screen (e.g., touch-sensitive display screen 153), input selecting the first financial institution from a listing of financial institutions linked to the cash handling device (e.g., cash handling device 150) included in a user interface presented by the cash handling device (e.g., cash handling device 150). Such a user interface may, for instance, be similar to graphical user interface 800, as discussed above.

In some embodiments, receiving the input requesting the first transaction from the first user of the cash handling device may include receiving a physical token associated with the first financial institution. For example, in receiving the input requesting the first transaction from the first user of the cash handling device (e.g., cash handling device 150), cash handling device 150 may receive a physical token associated with the first financial institution, such as a banking card or other physical token (which may, e.g., be received by cash handling device 150 via a card slot, chip reader, and/or the like).

At step 318, cash handling device 150 may identify an operating application (which may, e.g., be used by cash handling device 150 to process the requested transaction). For example, at step 318, in response to receiving the input requesting the first transaction from the first user of the cash handling device (e.g., cash handling device 150), cash handling device 150 may identify a first operating application associated with a first financial institution for processing the first transaction. As illustrated below, the first financial institution may be the financial institution operating financial institution server 120.

At step 319, cash handling device 150 may launch the identified operating application. For example, at step 319, based on identifying the first operating application associated with the first financial institution for processing the first transaction, cash handling device 150 may launch the first operating application associated with the first financial institution. For instance, cash handling device 150 may launch the first operating application associated with the first financial institution based on the transaction requested by the user of cash handling device 150 involving one or more accounts associated with the first financial institution. In addition, cash handling device 150 may launch the first operating application associated with the first financial institution in a sandbox or other container, so that the first operating application cannot interact with other applications and/or data that may be stored on and/or executed by cash handling device 150, such as applications and/or data associated with other financial institutions different from the first financial institution.

Figure 9:
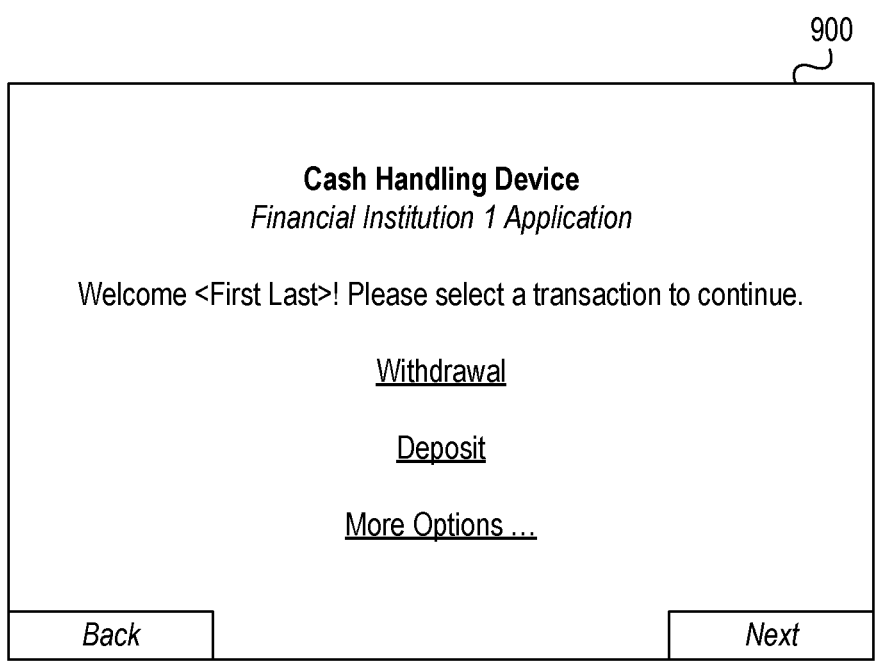

In some instances, in launching an operating application, cash handling device 150 may display and/or otherwise present one or more graphical user interfaces (e.g., on touch-sensitive display screen(s) 153). For example, cash handling device 150 may display and/or otherwise present a graphical user interface similar to graphical user interface 900, which is illustrated in FIG. 9. As seen in FIG. 9, graphical user interface 900 may include information prompting the user of cash handling device 150 to select a particular type of transaction to be performed on one or more accounts maintained by the first financial institution.

Figure 10:

At step 320, cash handling device 150 may process the requested transaction (e.g., by executing the operating application). For example, at step 320, cash handling device 150 may process the first transaction by executing the first operating application associated with the first financial institution. In processing the transaction and executing the operating application, cash handling device 150 may, for instance, authenticate the user of cash handling device 150 (e.g., by prompting the user of cash handling device 150 to provide a personal identification number and/or other authentication information, and subsequently receiving and validating a personal identification number and/or other authentication information from the user of cash handling device 150), receive one or more physical deposit items, dispense one or more physical withdrawal items (e.g., bills, coins, other currency items), print one or more receipts, display one or more user interfaces (e.g., notifications, alerts, error messages, and/or the like), and/or perform other functions. In some instances, in processing the transaction and executing the operating application, cash handling device 150 may display and/or otherwise present a graphical user interface similar to graphical user interface 1000, which is illustrated in FIG. 10. As seen in FIG. 10, graphical user interface 1000 may include information informing the user of cash handling device 150 that the requested transaction has been completed.

In some embodiments, processing the first transaction may include authenticating the first user of the cash handling device to at least one financial account maintained by the first financial institution, receiving one or more deposit items associated with the first transaction via the item accepting device, and dispensing one or more withdrawal items associated with the first transaction via the item dispensing device. For example, in processing the first transaction, cash handling device 150 may authenticate the first user of the cash handling device (e.g., cash handling device 150) to at least one financial account maintained by the first financial institution, receive one or more deposit items associated with the first transaction via the item accepting device (e.g., item accepting device 154), and dispense one or more withdrawal items associated with the first transaction via the item dispensing device (e.g., item dispensing device 155).

Figure 3F:
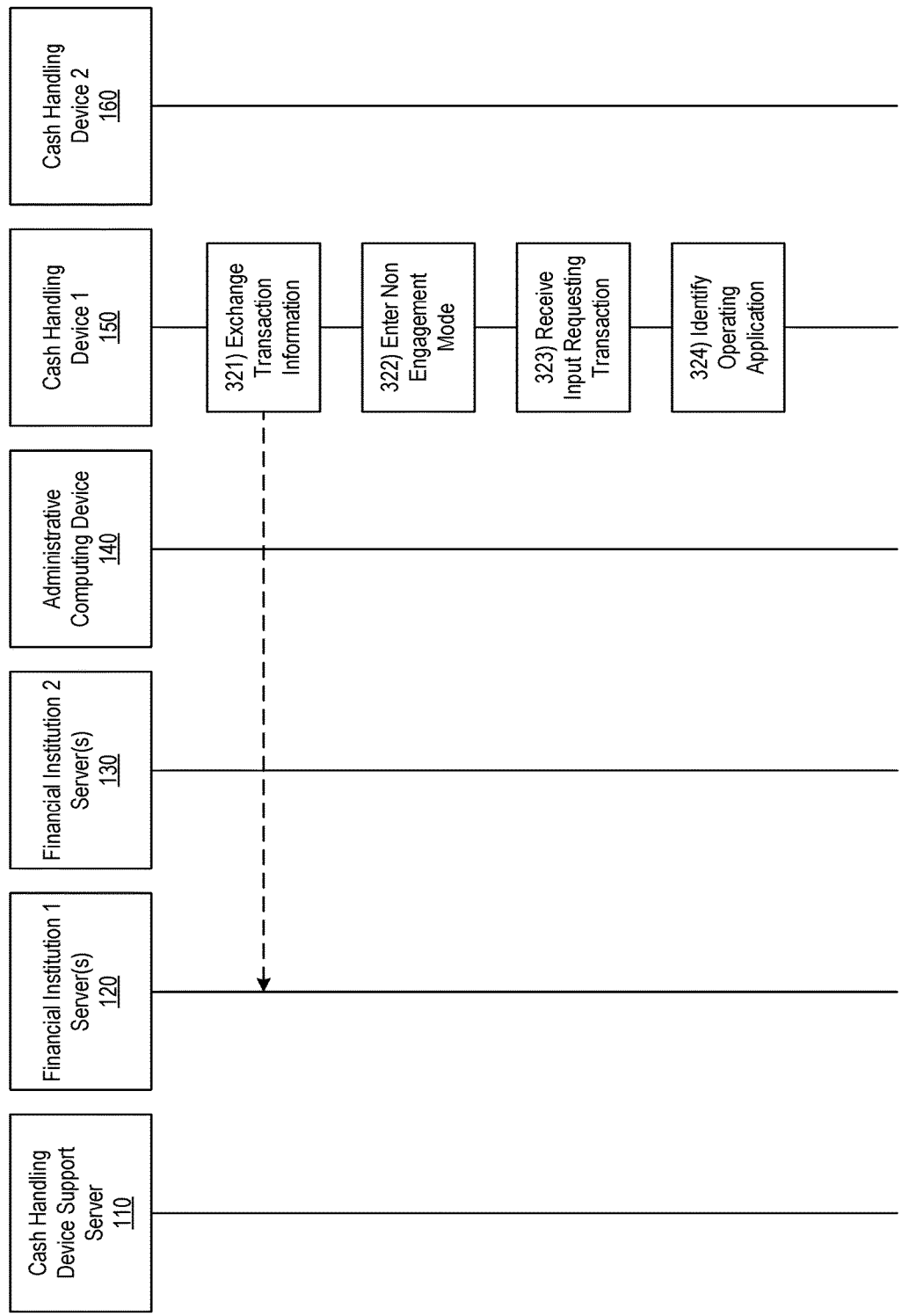

Referring to FIG. 3F, at step 321, cash handling device 150 may exchange transaction information with financial institution server 120 (e.g., based on completing processing of the first transaction, to securely communicate the details of the transaction to financial institution server 120, by executing the first operating application, using the provisioning profile associated with financial institution server 120). For example, at step 321, based on processing the first transaction, cash handling device 150 may communicate, via the communication interface (e.g., communication interface 156), to a first banking server (e.g., financial institution server 120) associated with the first financial institution, transaction details information associated with the first transaction using a first device provisioning profile generated by the first banking server (e.g., financial institution server 120) associated with the first financial institution for the cash handling device (e.g., cash handling device 150). For instance, cash handling device 150 may use the provisioning profile generated by financial institution server 120 for cash handling device 150 in the example event sequence discussed above to communicate the transaction information to financial institution server 120.

At step 322, cash handling device 150 may enter a non-engagement mode (e.g., based on completing the transaction requested by the user of cash handling device 150). For example, at step 322, cash handling device 150 may switch from a first engagement mode (which may, e.g., involve executing the first operating application) to a non-engagement mode after processing the first transaction by executing the first operating application associated with the first financial institution.

At step 323, cash handling device 150 may receive input requesting another transaction (e.g., from the same user who requested the previous transaction or from a different user). For example, at step 323, cash handling device 150 may receive input requesting a second transaction from a second user of the cash handling device (e.g., cash handling device 150). As in the steps discussed above, the input may, for instance, correspond to a user selection received via a user interface presented by cash handling device 150, but this time, the user selection may correspond to a request to perform a transaction with the financial institution associated with financial institution server 130. In some instances, in receiving input requesting a transaction, cash handling device 150 may receive a debit card, credit card, or other physical account token linked to a specific financial institution, such as the financial institution associated with financial institution server 130. Additionally or alternatively, in receiving input requesting a transaction, cash handling device 150 may receive one or more commands transmitted to cash handling device 150 by a user computing device (e.g., a user's smart phone or other mobile device that may be within a predetermined distance of cash handling device 150).

At step 324, cash handling device 150 may identify an operating application (which may, e.g., be used by cash handling device 150 to process the requested transaction). For example, at step 324, in response to receiving the input requesting the second transaction from the second user of the cash handling device (e.g., cash handling device 150), cash handling device 150 may identify a second operating application associated with a second financial institution for processing the second transaction. As illustrated below, the second financial institution may be the financial institution operating financial institution server 130.

Referring to FIG. 3G, at step 325, cash handling device 150 may launch the identified operating application. For example, at step 325, based on identifying the second operating application associated with the second financial institution for processing the second transaction, cash handling device 150 may launch the second operating application associated with the second financial institution. For instance, cash handling device 150 may launch the second operating application associated with the second financial institution based on the transaction requested by the user of cash handling device 150 involving one or more accounts associated with the second financial institution. In addition, cash handling device 150 may launch the second operating application associated with the second financial institution in a sandbox or other container, so that the second operating application cannot interact with other applications and/or data that may be stored on and/or executed by cash handling device 150, such as applications and/or data associated with other financial institutions different from the second financial institution.

Figure 11:
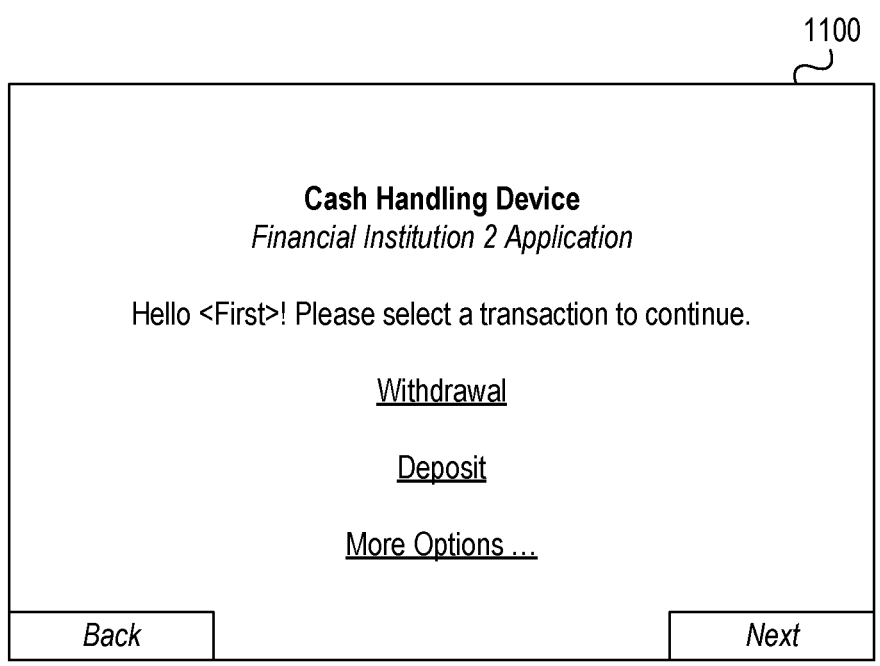

In some instances, in launching an operating application, cash handling device 150 may display and/or otherwise present one or more graphical user interfaces (e.g., on touch-sensitive display screen(s) 153). For example, cash handling device 150 may display and/or otherwise present a graphical user interface similar to graphical user interface 1100, which is illustrated in FIG. 11. As seen in FIG. 11, graphical user interface 1100 may include information prompting the user of cash handling device 150 to select a particular type of transaction to be performed on one or more accounts maintained by the second financial institution.

Figure 12:

At step 326, cash handling device 150 may process the requested transaction (e.g., by executing the operating application). For example, at step 326, cash handling device 150 may process the second transaction by executing the second operating application associated with the second financial institution (e.g., similar to how cash handling device 150 may process the first transaction by executing the first operating application associated with the first financial institution, as discussed above). In some instances, in processing the transaction and executing the operating application, cash handling device 150 may display and/or otherwise present a graphical user interface similar to graphical user interface 1200, which is illustrated in FIG. 12. As seen in FIG. 12, graphical user interface 1200 may include information informing the user of cash handling device 150 that the requested transaction has been completed.

In some embodiments, processing the second transaction may include authenticating the second user of the cash handling device to at least one financial account maintained by the second financial institution, receiving one or more deposit items associated with the second transaction via the item accepting device, and dispensing one or more withdrawal items associated with the second transaction via the item dispensing device. For example, in processing the second transaction, cash handling device 150 may authenticate the second user of the cash handling device (e.g., cash handling device 150) to at least one financial account maintained by the second financial institution, receive one or more deposit items associated with the second transaction via the item accepting device (e.g., item accepting device 154), and dispense one or more withdrawal items associated with the second transaction via the item dispensing device (e.g., item dispensing device 155).

In some embodiments, the first operating application associated with the first financial institution and the second operating application associated with the second financial institution may be containerized applications executed in sandboxes provided by an operating system of the cash handling device. For example, the first operating application (which may, e.g., be used by cash handling device 150 to process the first transaction) and the second operating application (which may, e.g., be used by cash handling device 150 to process the second transaction) may be containerized applications executed in sandboxes provided by an operating system of the cash handling device (e.g., cash handling device 150).

At step 327, cash handling device 150 may exchange transaction information with financial institution server 130 (e.g., based on completing processing of the second transaction, to securely communicate the details of the transaction to financial institution server 130, by executing the second operating application, using the provisioning profile associated with financial institution server 130). For example, at step 327, based on processing the second transaction, cash handling device 150 may communicate, via the communication interface (e.g., communication interface 156), to a second banking server (e.g., financial institution server 130) associated with the second financial institution, transaction details information associated with the second transaction using a second device provisioning profile generated by the second banking server (e.g., financial institution server 130) associated with the second financial institution for the cash handling device (e.g., cash handling device 150).

Figure 13:
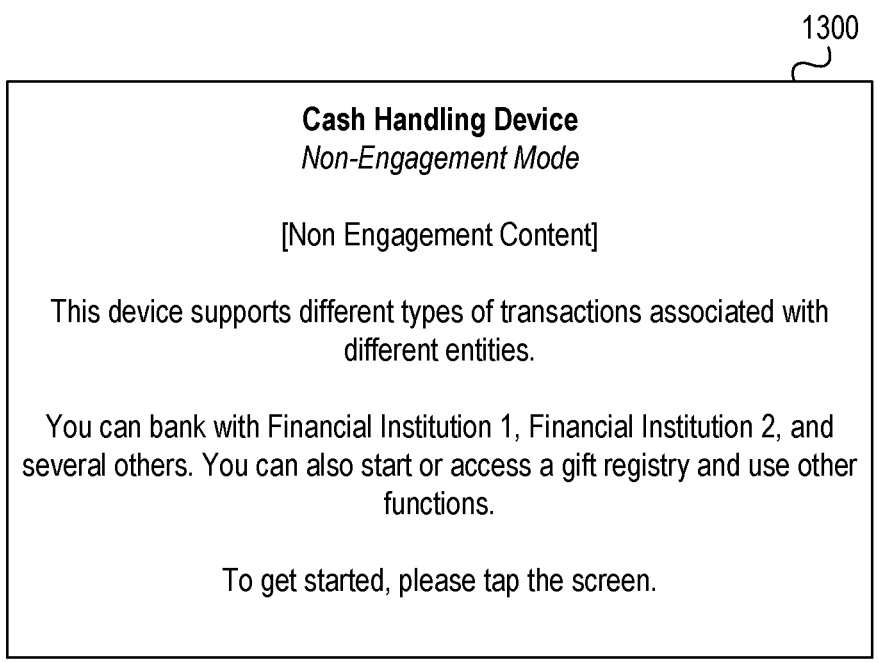

At step 328, cash handling device 150 may enter a non-engagement mode (e.g., based on completing the transaction requested by the user of cash handling device 150). For example, at step 328, cash handling device 150 may switch from a second engagement mode (which may, e.g., involve executing the second operating application) to the non-engagement mode after processing the second transaction by executing the second operating application associated with the second financial institution. In some instances, in switching to the non-engagement mode after processing a transaction or otherwise entering the non-engagement mode, cash handling device 150 may display and/or otherwise present one or more graphical user interfaces (e.g., on touch-sensitive display screen(s) 153) associated with non-engagement content, as discussed below. For example, cash handling device 150 may display and/or otherwise present a graphical user interface similar to graphical user interface 1300, which is illustrated in FIG. 13. As seen in FIG. 13, graphical user interface 1300 may include information informing potential users of the functions of cash handling device 150 and/or other non-engagement content.

Figure 3H:
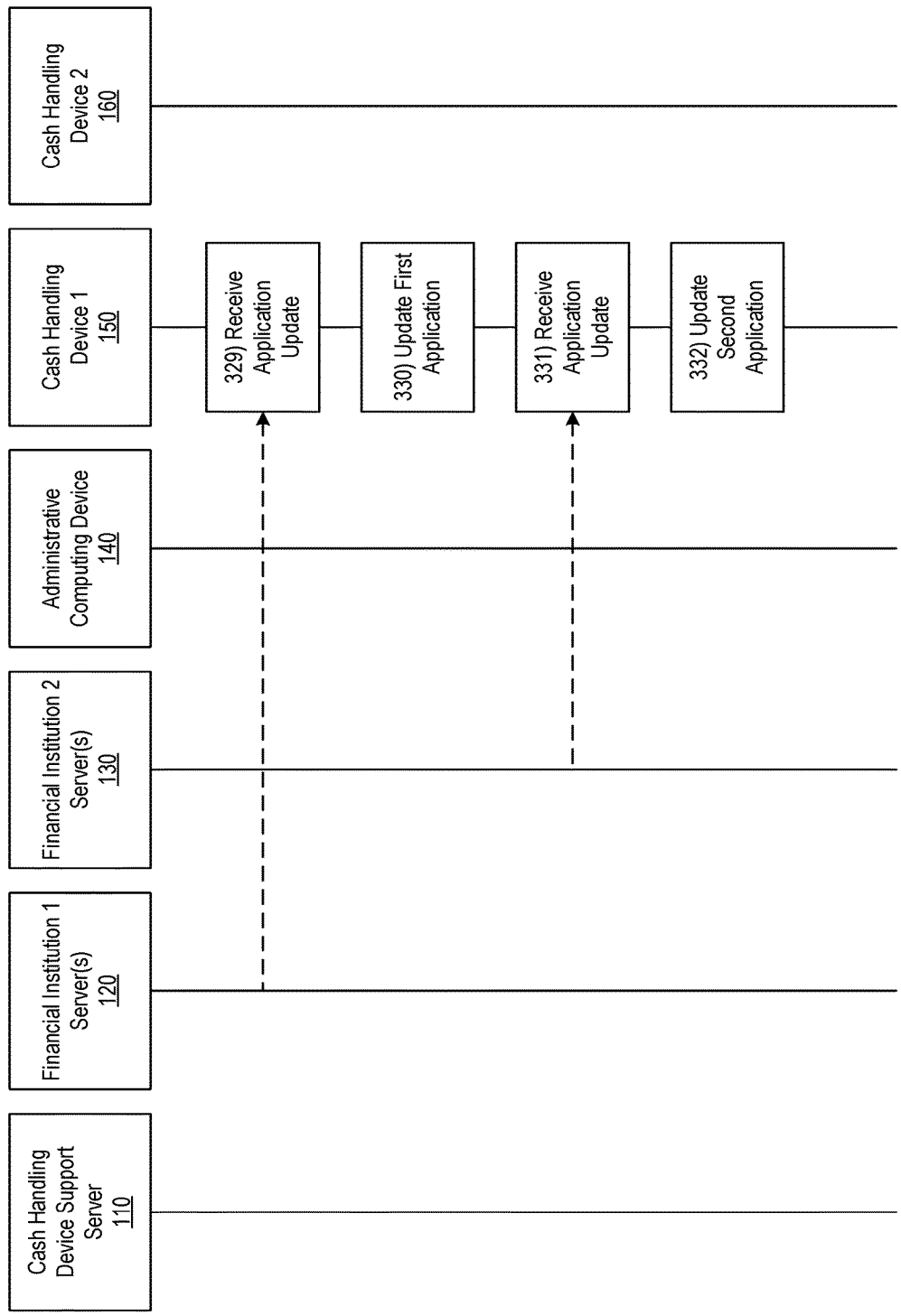

Referring to FIG. 3H, at step 329, cash handling device 150 may receive an application update from financial institution server 120 (e.g., one or more updated and/or new executable files, configuration setting files, and/or the like). For example, at step 329, after processing the first transaction by executing the first operating application associated with the first financial institution, cash handling device 150 may receive, via the communication interface (e.g., communication interface 156), from the first banking server (e.g., financial institution server 120) associated with the first financial institution, a first application update for the first operating application associated with the first financial institution.

At step 330, cash handling device 150 may update the first operating application based on the application update received from financial institution server 120. For example, at step 330, in response to receiving the first application update for the first operating application associated with the first financial institution, cash handling device 150 may update the first operating application associated with the first financial institution by installing the first application update on the cash handling device (e.g., cash handling device 150).

At step 331, cash handling device 150 may receive an application update from financial institution server 130 (e.g., one or more updated and/or new executable files, configuration setting files, and/or the like). For example, at step 331, after processing the second transaction by executing the second operating application associated with the second financial institution, cash handling device 150 may receive, via the communication interface (e.g., communication interface 156), from the second banking server (e.g., financial institution server 130) associated with the second financial institution, a second application update for the second operating application associated with the second financial institution.

At step 332, cash handling device 150 may update the second operating application based on the application update received from financial institution server 130. For example, at step 332, in response to receiving the second application update for the second operating application associated with the second financial institution, cash handling device 150 may update the second operating application associated with the second financial institution by installing the second application update on the cash handling device (e.g., cash handling device 150). Thereafter, cash handling device 150 may continue handling other transaction requests, continue monitoring for additional application updates and/or configuration updates, and/or continue performing other functions.

FIGS. 4A-4D depict another illustrative event sequence for deploying, configuring, and utilizing cash handling devices to provide dynamic and adaptable operating functions in accordance with one or more example embodiments. For example, the example event sequence depicted in FIGS. 4A-4D illustrates how a multi-tenant cash handling device, such as cash handling device 150, may provide different engagement modes and/or non-engagement modes of operation.

Figure 4A:
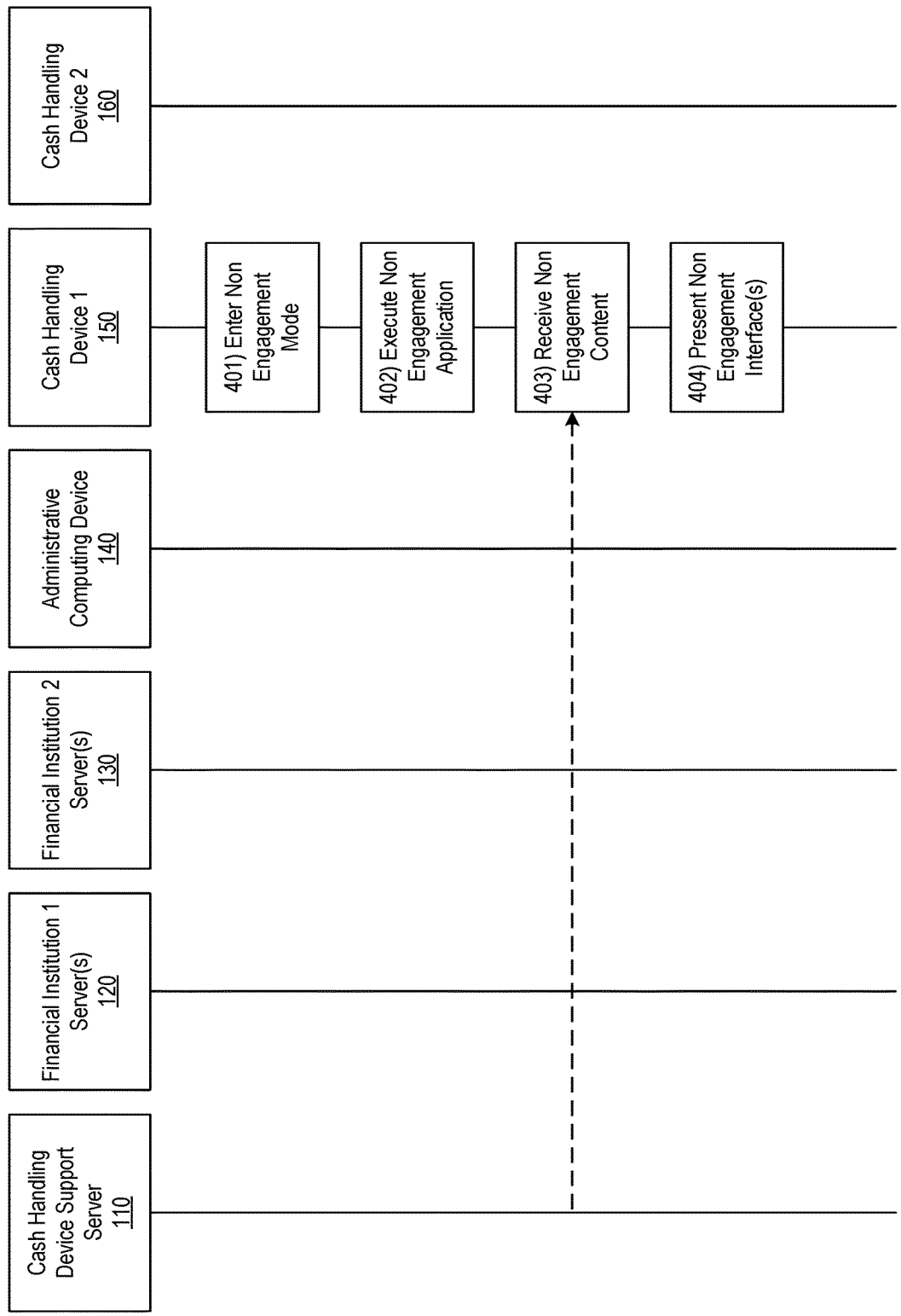

Referring to FIG. 4A, at step 401, cash handling device 150 may enter a non-engagement mode. For example, at step 401, cash handling device 150 may enter a non-engagement mode (e.g., after initializing, after concluding a user-requesting transaction, and/or based on one or more other factors). In some embodiments, entering the non-engagement mode may include entering the non-engagement mode in response to completing processing of a transaction at the cash handling device. For example, in entering the non-engagement mode, cash handling device 150 may enter the non-engagement mode in response to completing processing of a transaction at the cash handling device (e.g., cash handling device 150).

At step 402, cash handling device 150 may execute a non-engagement application. For example, at step 402, based on entering the non-engagement mode, cash handling device 150 may launch a non-engagement application. The non-engagement application may, for instance, be built into the operating system of cash handling device 150 or may be modular and/or otherwise segmented from the operating system of cash handling device 150. Additionally or alternatively, the non-engagement application may be executed by cash handling device 150 in a sandbox or other container to prevent the non-engagement application from accessing and/or modifying other applications and/or data stored by cash handling device 150, such as operating applications and/or transaction data associated with various financial institutions. In some instances, in launching the non-engagement application, cash handling device 150 may generate and send one or more requests to cash handling device support server 110 for non-engagement content to be presented by cash handling device 150.

In some embodiments, the non-engagement application may be a separate software component from one or more containerized applications executed by the cash handling device to process transactions associated with different financial institutions. For example, the non-engagement application may be a separate software component from one or more containerized applications executed by the cash handling device (e.g., cash handling device 150) to process transactions associated with different financial institutions, so as to maintain separation between the non-engagement application and various operating applications and their respective data.

At step 403, cash handling device 150 may receive non-engagement content from cash handling device support server 110. For example, at step 403, cash handling device 150 may receive, via the communication interface (e.g., communication interface 156), from a cash handling device support server (e.g., cash handling device support server 110), first non-engagement content. In some embodiments, receiving the first non-engagement content from the cash handling device support server may include receiving the first non-engagement content from the cash handling device support server responsive to sending a notification to the cash handling device support server indicating that the cash handling device has entered the non-engagement mode. For example, in receiving the first non-engagement content from the cash handling device support server (e.g., cash handling device support server 110), cash handling device 150 may receive the first non-engagement content from the cash handling device support server (e.g., cash handling device support server 110) responsive to sending a notification to the cash handling device support server (e.g., cash handling device support server 110) indicating that the cash handling device (e.g., cash handling device 150) has entered the non-engagement mode.

At step 404, cash handling device 150 may present one or more non-engagement user interfaces (e.g., based on executing the non-engagement application, using any and/or all of the non-engagement content received from cash handling device support server 110). For example, at step 404, cash handling device 150 may present, using the non-engagement application, one or more non-engagement user interfaces associated with the first non-engagement content received from the cash handling device support server (e.g., cash handling device support server 110). In some instances, the first non-engagement content received from the cash handling device support server (e.g., cash handling device support server 110) may include generic marketing content and/or advertising user interfaces that are not specific to a particular user of the cash handling device (e.g., cash handling device 150).

Figure 14:
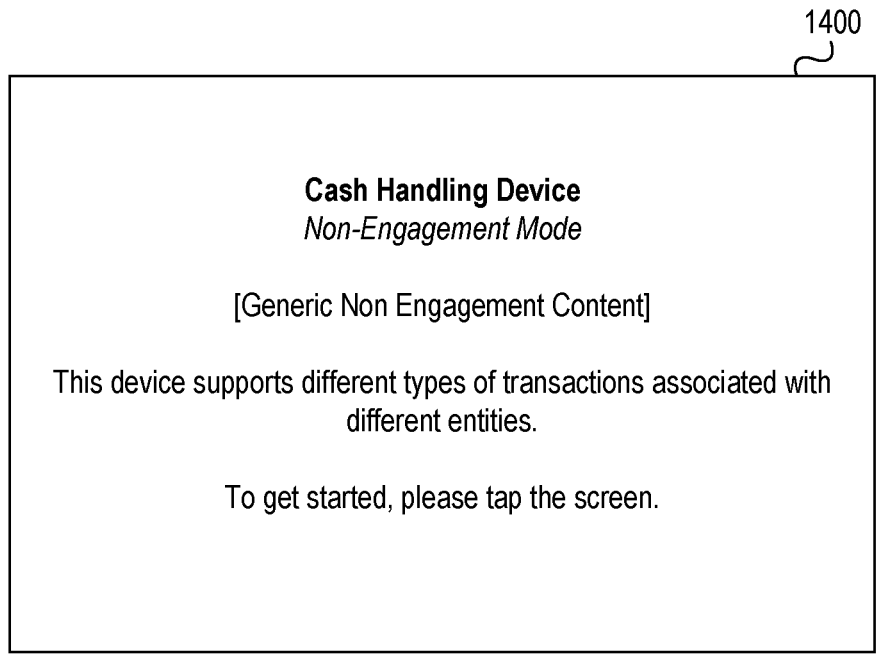

In some instances, in presenting one or more non-engagement user interfaces, cash handling device 150 may display and/or otherwise present one or more graphical user interfaces (e.g., on touch-sensitive display screen(s) 153) associated with non-engagement content received from cash handling device support server 110. For example, cash handling device 150 may display and/or otherwise present a graphical user interface similar to graphical user interface 1400, which is illustrated in FIG. 14. As seen in FIG. 14, graphical user interface 1400 may include generic non-engagement content (which, e.g., might not be specific to a particular user of cash handling device 150), information informing potential users of the functions of cash handling device 150, and/or other non-engagement content.

Figure 4B:
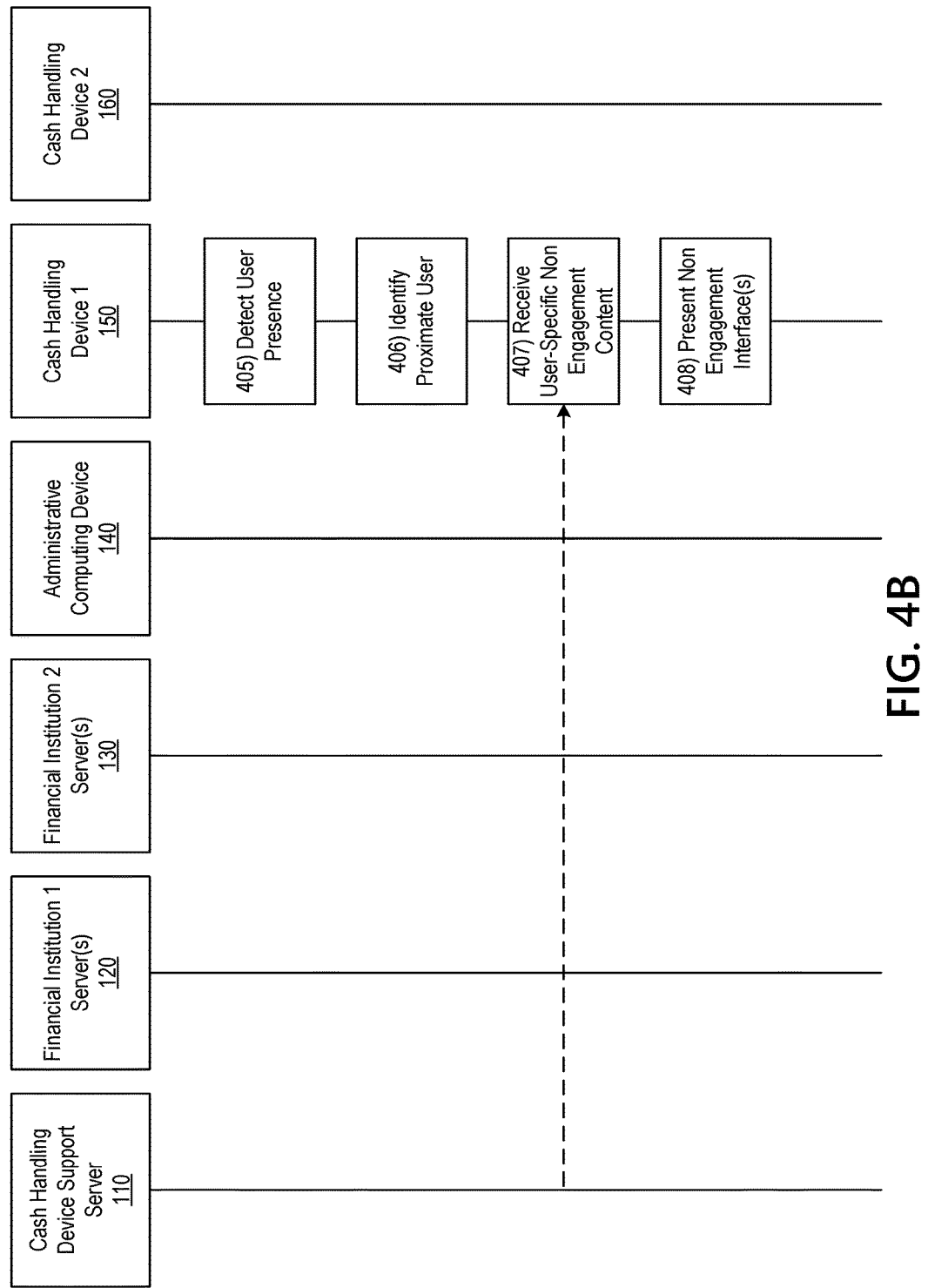

Referring to FIG. 4B, at step 405, cash handling device 150 may detect a presence of a user of the cash handling device (e.g., cash handling device 150). For example, cash handling device 150 may detect the presence of the user based on data received from a motion sensor included in cash handling device 150, a camera or other image sensor included in cash handling device 150, a beacon sensor included in cash handling device 150, and/or another sensor included in and/or associated with cash handling device 150.

In some embodiments, the first non-engagement content received from the cash handling device support server might not be specific to the user of the cash handling device. For example, the first non-engagement content received from the cash handling device support server (e.g., cash handling device support server 110) might not be specific to the user of the cash handling device (who may, e.g., be detected by cash handling device 150 at step 405).

In some embodiments, detecting the presence of the user of the cash handling device may include detecting the presence of the user of the cash handling device based on data received from a motion sensor built into the cash handling device. For example, in detecting the presence of the user of the cash handling device (e.g., cash handling device 150), cash handling device 150 may detect the presence of the user of the cash handling device (e.g., cash handling device 150) based on data received from a motion sensor built into the cash handling device (e.g., cash handling device 150).

In some embodiments, detecting the presence of the user of the cash handling device may include detecting the presence of the user of the cash handling device based on data received from an image sensor built into the cash handling device. For example, in detecting the presence of the user of the cash handling device (e.g., cash handling device 150), cash handling device 150 may detect the presence of the user of the cash handling device (e.g., cash handling device 150) based on data received from an image sensor built into the cash handling device (e.g., cash handling device 150).

In some embodiments, detecting the presence of the user of the cash handling device may include detecting the presence of the user of the cash handling device based on receiving data associated with a beacon signal transmitted by a radiofrequency beacon built into the cash handling device. For example, in detecting the presence of the user of the cash handling device (e.g., cash handling device 150), cash handling device 150 may detect the presence of the user of the cash handling device (e.g., cash handling device 150) based on receiving data associated with a beacon signal transmitted by a radiofrequency beacon built into the cash handling device (e.g., cash handling device 150).

At step 406, cash handling device 150 may identify the detected user. For example, at step 406, in response to detecting the presence of the user of the cash handling device (e.g., cash handling device 150), cash handling device 150 may identify the user of the cash handling device (e.g., cash handling device 150). In some instances, based on identifying the user of the cash handling device (e.g., cash handling device 150), cash handling device 150 also may generate and send, to cash handling device support server 110, one or more messages having information indicating the determined identity of the detected user.

In some embodiments, identifying the user of the cash handling device may include identifying the user of the cash handling device based on beacon signal attributes information associated with a beacon signal transmitted by a radiofrequency beacon built into the cash handling device and received by a mobile computing device associated with the user of the cash handling device. For example, in identifying the user of the cash handling device (e.g., cash handling device 150), cash handling device 150 may identify the user of the cash handling device (e.g., cash handling device 150) based on beacon signal attributes information associated with a beacon signal transmitted by a radiofrequency beacon built into the cash handling device (e.g., cash handling device 150) and received by a mobile computing device (e.g., a smart phone, tablet computer, smart watch, and/or other mobile device) associated with the user of the cash handling device (e.g., cash handling device 150). For instance, a radiofrequency beacon built into cash handling device 150 may transmit a signal which may be received by the user's mobile device. The user's mobile device may send attributes information associated with the signal to one or more servers, such as cash handling device support server 110. Cash handling device support server 110 then may send, to cash handling device 150, user identification information identifying the user of the mobile device and/or other information that may be specific to and/or otherwise associated with the user of the mobile device.

At step 407, cash handling device 150 may receive user-specific non-engagement content from cash handling device support server 110. For example, at step 407, after identifying the user of the cash handling device (e.g., cash handling device 150), cash handling device 150 may receive, via the communication interface (e.g., communication interface 156), from the cash handling device support server (e.g., cash handling device support server 110), second non-engagement content specific to the user of the cash handling device (e.g., cash handling device 150). The second non-engagement content specific to the user of the cash handling device (e.g., cash handling device 150) may, for instance, include targeted marketing information, user-specific offers, and/or other user specific information that may be pushed down to cash handling device 150 by cash handling device support server 110. Additionally or alternatively, the second non-engagement content specific to the user of the cash handling device (e.g., cash handling device 150) may, for instance, be received by cash handling device 150 responsive to a request that was generated and/or sent to cash handling device support server 110 by cash handling device 150 after detecting and/or identifying the user.

In some embodiments, receiving the second non-engagement content specific to the user of the cash handling device from the cash handling device support server may include receiving the second non-engagement content specific to the user of the cash handling device from the cash handling device support server responsive to sending a notification to the cash handling device support server indicating that the presence of the user of the cash handling device has been detected. For example, in receiving the second non-engagement content specific to the user of the cash handling device (e.g., cash handling device 150) from the cash handling device support server (e.g., cash handling device support server 110), cash handling device 150 may receive the second non-engagement content specific to the user of the cash handling device (e.g., cash handling device 150) from the cash handling device support server (e.g., cash handling device support server 110) responsive to sending a notification (e.g., from cash handling device 150) to the cash handling device support server (e.g., cash handling device support server 110) indicating that the presence of the user of the cash handling device (e.g., cash handling device 150) has been detected.

At step 408, cash handling device 150 may present one or more user-specific non-engagement user interfaces. For example, at step 408, cash handling device 150 may present, using the non-engagement application, one or more non-engagement user interfaces associated with the second non-engagement content specific to the user of the cash handling device (e.g., cash handling device 150). For instance, cash handling device 150 may present the one or more user-specific non-engagement user interfaces based on identifying the detected user and/or receiving non-engagement content that is specific to the detected user from cash handling device support server 110. The one or more user-specific non-engagement user interfaces presented by cash handling device 150 may, for instance, include one or more user-targeted user interfaces that include user-specific marketing information, user-specific offers, and/or other information that may be selected for and/or otherwise specific to the detected user. For instance, if cash handling device support server 110 maintains information indicating that the detected user is building a gift registry, cash handling device support server 110 may send information to cash handling device 150 that causes cash handling device 150 to present advertisements and/or offers associated with the detected user's gift registry. As another example, if cash handling device support server 110 maintains information indicating that the detected user is applying for a home loan, cash handling device 150 may present user-specific mortgage rate information and/or offers associated with the detect user's interest in home loans.

In some instances, in presenting one or more user-specific non-engagement user interfaces, cash handling device 150 may display and/or otherwise present one or more graphical user interfaces (e.g., on touch-sensitive display screen(s) 153) associated with the user-specific non-engagement content received from cash handling device support server 110.

Figure 15:
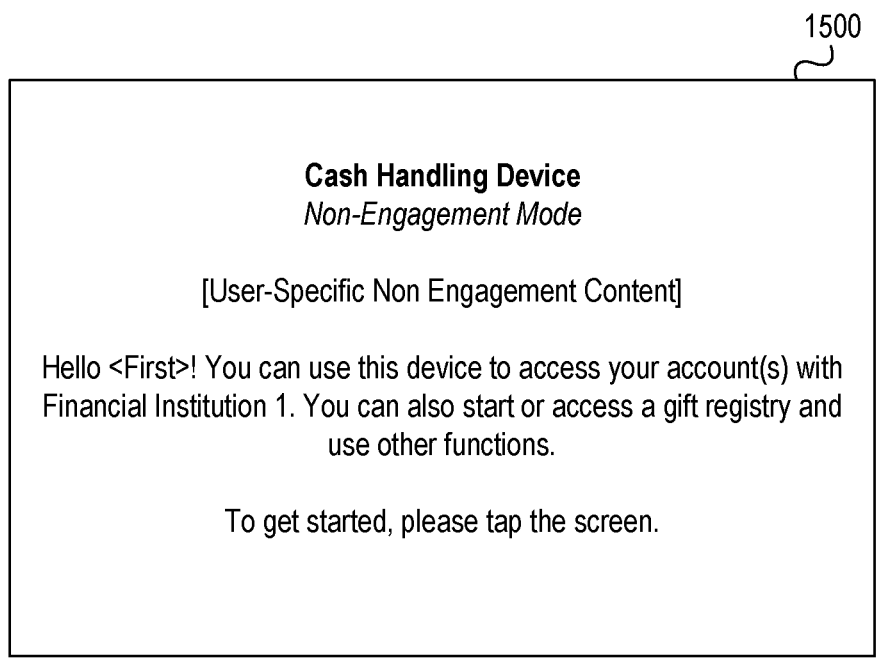

For example, cash handling device 150 may display and/or otherwise present a graphical user interface similar to graphical user interface 1500, which is illustrated in FIG. 15. As seen in FIG. 15, graphical user interface 1500 may include user-specific non-engagement content (which, e.g., may be specific to the detected user of cash handling device 150), as well as information informing the detected user of the functions of cash handling device 150 that may be specifically relevant to the detected user and/or other non-engagement content.

Referring to FIG. 4C, at step 409, cash handling device 150 may receive input requesting a menu (e.g., from the user of cash handling device 150). For example, at step 409, cash handling device 150 may receive, via the touch-sensitive display screen (e.g., touch-sensitive display screen(s) 153), from the user of the cash handling device (e.g., cash handling device 150), input requesting access to one or more functions of the cash handling device (e.g., cash handling device 150) provided by one or more operating applications (e.g., financial institution applications 152c, financial institution applications 152d, and/or the like) installed on the cash handling device (e.g., cash handling device 150).

At step 410, cash handling device 150 may enter an engagement mode. For example, at step 410, in response to receiving the input requesting access to the one or more functions of the cash handling device (e.g., cash handling device 150) provided by the one or more operating applications installed on the cash handling device (e.g., cash handling device 150), cash handling device 150 may switch from the non-engagement mode to an engagement mode. For instance, cash handling device 150 may switch modes to exit the non-engagement application and begin executing one of the operating applications maintained by cash handling device 150, which may cause cash handling device 150 to provide a "main menu" or other menu of functions (e.g., using built-in application functions of cash handling device 150 and/or using functions provided by a modular and/or segmented operating application).

In some embodiments, switching from the non-engagement mode to the engagement mode may include launching a first operating application based on the input requesting access to the one or more functions of the cash handling device provided by the one or more operating applications installed on the cash handling device. For example, in switching from the non-engagement mode to the engagement mode, cash handling device 150 may launch a first operating application based on the input requesting access to the one or more functions of the cash handling device (e.g., cash handling device 150) provided by the one or more operating applications installed on the cash handling device (e.g., cash handling device 150). For instance, cash handling device 150 may launch and/or otherwise begin executing a containerized operating application, such as one of the financial institution-specific applications that may provide specific functionality corresponding to the functions selected and/or requested by the user of cash handling device 150, as discussed above.

At step 411, cash handling device 150 may receive a transaction request. For example, at step 411, after switching from the non-engagement mode to the engagement mode, cash handling device 150 may receive, via the touch-sensitive display screen (e.g., touch-sensitive display screen(s) 153), from the user of the cash handling device (e.g., cash handling device 150), input requesting a first transaction.

At step 412, cash handling device 150 may process the transaction request. For example, at step 412, cash handling device 150 may process the first transaction using the first operating application and a first device provisioning profile generated by a server (e.g., financial institution server 120) associated with the first operating application. For instance, cash handling device 150 may process the first transaction by executing an operating application using a provisioning profile provided by financial institution server 120 or financial institution server 130, as discussed above.

Referring to FIG. 4D, at step 413, cash handling device 150 may re-enter the non-engagement mode (e.g., after completing processing of the transaction request at step 412). At step 414, cash handling device 150 may execute the non-engagement application (e.g., based on re-entering the non-engagement mode).

At step 415, cash handling device 150 may receive updated non-engagement content from cash handling device support server 110. For example, at step 415, after processing the first transaction using the first operating application and the first device provisioning profile generated by the server (e.g., financial institution server 120) associated with the first operating application, cash handling device 150 may receive, via the communication interface (e.g., communication interface 156), from the cash handling device support server (e.g., cash handling device support server 110), updated non-engagement content. For instance, cash handling device 150 may receive from cash handling device support server 110 updated non-engagement content selected by cash handling device support server 110 based on one or more recently completed transactions at cash handling device 150 and/or at other cash handling devices, including one or more other cash handling devices within a predetermined distance of cash handling device 150 (e.g., at the same retail location, in the same shopping mall, and/or the like).

At step 416, cash handling device 150 may present one or more updated non-engagement interfaces (e.g., based on the updated non-engagement content received from cash handling device support server 110). For example, at step 416, cash handling device 150 may present, using the non-engagement application, one or more non-engagement user interfaces associated with the updated non-engagement content.

FIGS. 5A-5E depict another illustrative event sequence for deploying, configuring, and utilizing cash handling devices to provide dynamic and adaptable operating functions in accordance with one or more example embodiments. For example, the example event sequence depicted in FIGS. 5A-5E illustrates how a multi-tenant cash handling device, such as cash handling device 150, may securely communicate transaction details information to one or more servers, including one or more blockchain servers.

Figure 5A:
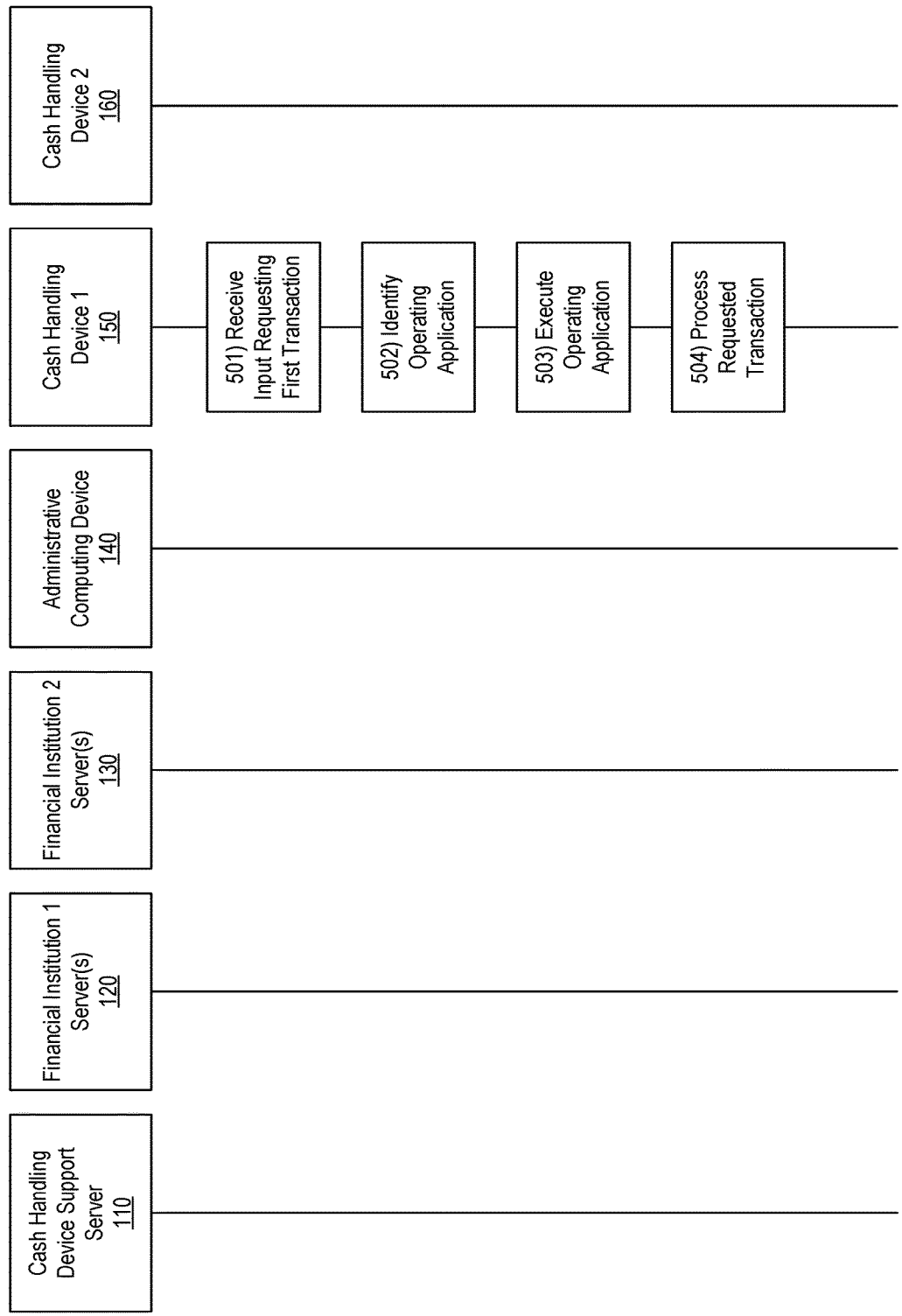

Referring to FIG. 5A, at step 501, cash handling device 150 may receive input requesting a first transaction, such as a deposit transaction. For example, at step 501, cash handling device 150 may receive, via the touch-sensitive display screen (e.g., touch-sensitive display screen(s) 153), from a user of the cash handling device (e.g., cash handling device 150), input requesting a first transaction associated with a deposit of funds to a first account associated with a first financial institution.

At step 502, cash handling device 150 may identify an operating application for processing the first transaction (e.g., an operating application that is able to process the first transaction requested by the user of cash handling device 150). For example, at step 502, based on the input requesting the first transaction associated with the deposit of funds to the first account associated with the first financial institution, cash handling device 150 may identify a first operating application associated with the first financial institution.

At step 503, cash handling device 150 may execute the identified operating application. For example, at step 503, based on identifying the first operating application associated with the first financial institution, cash handling device 150 may launch the first operating application associated with the first financial institution.

At step 504, cash handling device 150 may process the requested transaction. For example, at step 504, cash handling device 150 may process the first transaction by executing the first operating application associated with the first financial institution. In some embodiments, processing the first transaction by executing the first operating application associated with the first financial institution may include: receiving, via the item accepting device, one or more deposit items from the user of the cash handling device; scanning the one or more deposit items received via the item accepting device; and physically storing, in the cash handling device, the one or more deposit items received via the item accepting device. For example, in processing the first transaction by executing the first operating application associated with the first financial institution, cash handling device 150 may receive, via the item accepting device (e.g., item accepting device(s) 154), one or more deposit items from the user of the cash handling device (e.g., cash handling device 150). In addition, cash handling device 150 may scan the one or more deposit items received via the item accepting device (e.g., item accepting device(s) 154). Further, cash handling device 150 may physically store, in the cash handling device (e.g., cash handling device 150), the one or more deposit items received via the item accepting device (e.g., item accepting device(s) 154).

In some embodiments, processing the first transaction by executing the first operating application associated with the first financial institution may include executing the first operating application associated with the first financial institution based on a first device provisioning profile generated for the cash handling device by a first banking server associated with the first financial institution. For example, in processing the first transaction by executing the first operating application associated with the first financial institution, cash handling device 150 may execute the first operating application associated with the first financial institution based on a first device provisioning profile generated for the cash handling device (e.g., cash handling device 150) by a first banking server (e.g., financial institution server 120) associated with the first financial institution, as discussed above. Additionally, in some embodiments, cash handling device 150 may maintain a second operating application associated with a second financial institution different from the first financial institution, as discussed above. In addition, cash handling device 150 may maintain a second device provisioning profile generated for the cash handling device (e.g., cash handling device 150) by a second banking server (e.g., financial institution server 130) associated with the second financial institution, and the second operating application and the second device provisioning profile may enable the cash handling device (e.g., cash handling device 150) to process one or more transactions associated with the second financial institution, as discussed above.

Figure 5B:
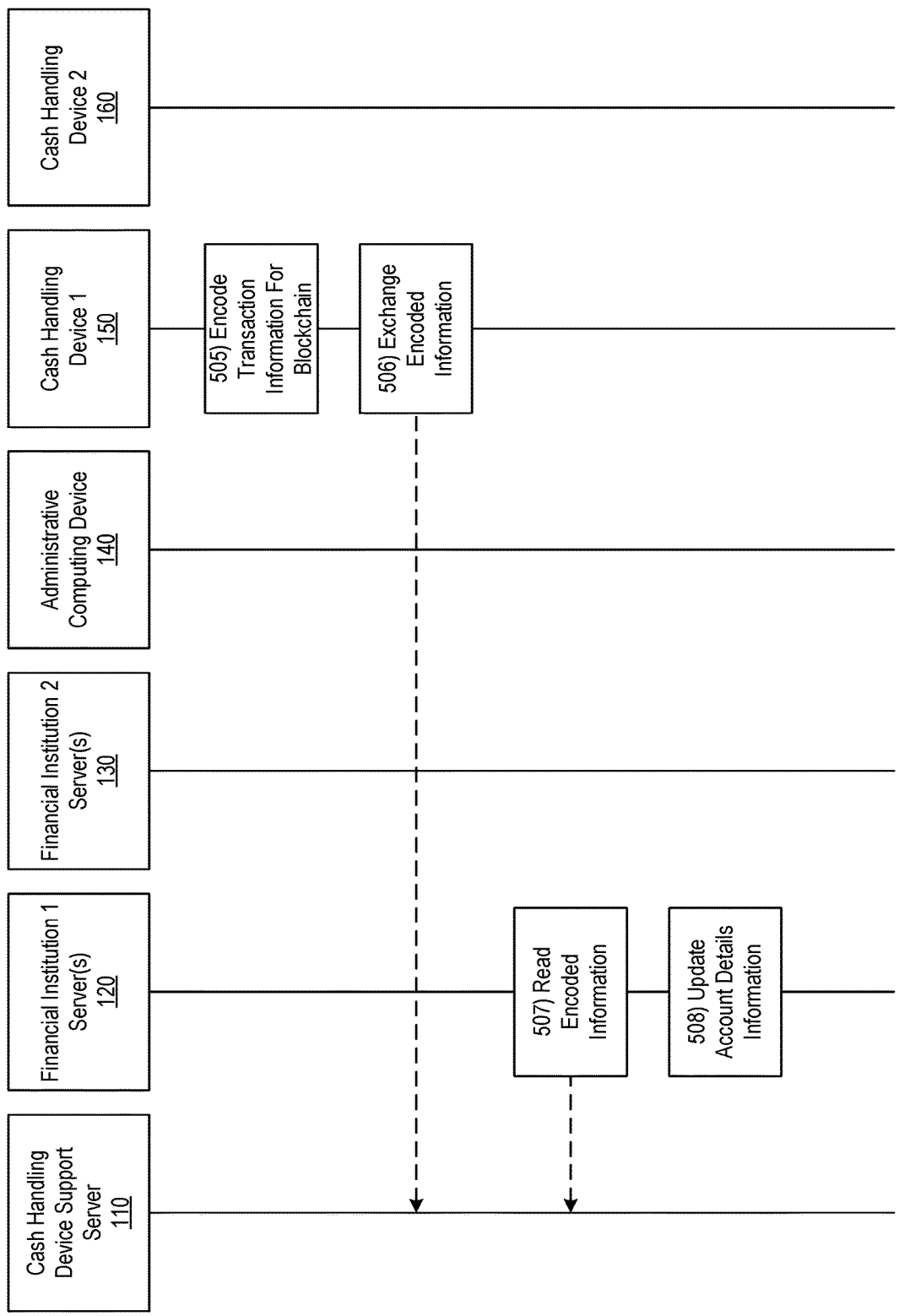

Referring to FIG. 5B, at step 505, cash handling device 150 may securely encode transaction information (e.g., indicating that the first transaction and/or a deposit associated with the first transaction has been completed at cash handling device 150). For example, at step 505, based on processing the first transaction by executing the first operating application associated with the first financial institution, cash handling device 150 may encode first transaction information for a blockchain distributed database.

In some embodiments, encoding the first transaction information for the blockchain distributed database may include generating a data structure comprising information identifying one or more deposit items received from the user of the cash handling device, information identifying a date and time at which the first transaction was processed, information identifying a depositor associated with the first transaction, and information identifying a destination account associated with the first transaction. For example, in encoding the first transaction information for the blockchain distributed database, cash handling device 150 may generate a data structure that includes information identifying one or more deposit items received from the user of cash handling device 150, information identifying a date and time at which the first transaction was processed by cash handling device 150, information identifying a depositor associated with the first transaction (e.g., the person who deposited funds at cash handling device 150), and information identifying a destination account associated with the first transaction. For instance, the destination account may be owned by a payee associated with the first transaction, and by encoding the first transaction information for the blockchain distributed database, cash handling device 150 may enable the payee to withdraw any and/or all of the deposited funds at the same cash handling device (e.g., cash handling device 150) or at a different cash handling device (e.g., cash handling device 160), as illustrated below.

At step 506, cash handling device 150 may exchange the encoded transaction information with cash handling device support server 110 and/or otherwise communicate the encoded transaction information to cash handling device support server 110. For example, at step 506, cash handling device 150 may send, via the communication interface (e.g., communication interface 156), to a cash handling device support server (e.g., cash handling device support server 110), the first transaction information encoded for the blockchain distributed database. In some instances, cash handling device support server 110 may maintain at least a portion of a blockchain and/or may communicate with one or more distributed servers and/or other devices that may maintain any and/or all of the blockchain. In addition, by communicating the encoded transaction information to cash handling device support server 110, cash handling device 150 may cause the transaction information to be written to the blockchain. Additionally or alternatively, by communicating the encoded transaction information to cash handling device support server 110, cash handling device 150 may cause cash handling device 160 to perform one or more of the steps described below (e.g., in connection with withdrawing the funds deposited at cash handling device 150).

In some embodiments, sending the first transaction information encoded for the blockchain distributed database to the cash handling device support server may cause the cash handling device support server to write the first transaction information to the blockchain distributed database. For example, by sending the first transaction information encoded for the blockchain distributed database to the cash handling device support server (e.g., cash handling device support server 110), cash handling device 150 may cause the cash handling device support server (e.g., cash handling device support server 110) to write the first transaction information to the blockchain distributed database.

In some embodiments, sending the first transaction information encoded for the blockchain distributed database to the cash handling device support server may enable a second cash handling device to process a withdrawal of the funds associated with the first transaction based on reading the first transaction information from the blockchain distributed database. For example, by sending the first transaction information encoded for the blockchain distributed database to the cash handling device support server (e.g., cash handling device support server 110), cash handling device 150 may enable a second cash handling device (e.g., cash handling device 160) to process a withdrawal of the funds associated with the first transaction based on reading the first transaction information from the blockchain distributed database, as discussed below.

In some embodiments, sending the first transaction information encoded for the blockchain distributed database to the cash handling device support server may cause the cash handling device support server to identify one or more cash transportation needs of the cash handling device. For example, by sending the first transaction information encoded for the blockchain distributed database to the cash handling device support server (e.g., cash handling device support server 110), cash handling device 150 may cause the cash handling device support server (e.g., cash handling device support server 110) to identify one or more cash transportation needs of the cash handling device (e.g., cash handling device 150). For instance, by sending the first transaction information encoded for the blockchain distributed database to the cash handling device support server (e.g., cash handling device support server 110), cash handling device 150 may cause the cash handling device support server (e.g., cash handling device support server 110) to identify and/or determine that cash handling device 150 requires replenishment of one or more physical resources (e.g., bills, coins, receipt paper, and/or other resources) and/or requires unloading and/or transportation of one or more physical resources (e.g., bills, coins, deposited checks, and/or other resources), as discussed below.

In some embodiments, sending the first transaction information encoded for the blockchain distributed database to the cash handling device support server may cause the cash handling device support server to generate and send one or more alerts based on identifying the one or more cash transportation needs of the cash handling device. For example, by sending the first transaction information encoded for the blockchain distributed database to the cash handling device support server (e.g., cash handling device support server 110), cash handling device 150 may cause the cash handling device support server (e.g., cash handling device support server 110) to generate and send one or more alerts based on identifying the one or more cash transportation needs of the cash handling device (e.g., cash handling device 150), as discussed below.

At step 507, financial institution server 120 may read the encoded transaction information from cash handling device support server 110 and/or from the blockchain distributed database. At step 508, financial institution server 120 may update account details information maintained by financial institution server 120 (e.g., based on the encoded transaction information read from cash handling device support server 110 and/or from the blockchain distributed database). For instance, financial institution server 120 may update account details information and/or other records maintained by financial institution server 120 to reflect the first transaction completed at cash handling device 150.

As illustrated below, multi-tenant cash handling devices implementing one or more aspects of the disclosure, such as cash handling device 150 and/or cash handling device 160, may enable peer-to-peer payment transactions to be completed via blockchain-based communications. For instance, one cash handling device (e.g., cash handling device 160) may read data from a blockchain distributed database and process a withdrawal request by dispensing cash to a particular user, based on another user depositing funds at a different cash handling device (e.g., cash handling device 150) that writes transaction data to the blockchain distributed database after the deposit is completed. In some instances, the different cash handling devices (e.g., cash handling device 150, cash handling device 160) may be located in different countries, and the deposit and withdrawal may be completed in different currencies to facilitate international monetary transfers and/or currency exchange transactions. In addition, in some instances, by using blockchain-based communications, these transactions may be completed by cash handling devices (e.g., cash handling device 150, cash handling device 160) without using financial institution-specific servers.

Referring to FIG. 5C, at step 509, cash handling device 160 may receive input requesting a second transaction, such as a withdrawal transaction corresponding to a withdrawal of the funds deposited at cash handling device 150 during the first transaction. At step 510, cash handling device 160 may identify an operating application associated with the requested transaction to perform the requested transaction. For instance, cash handling device 160 may maintain a plurality of different operating applications associated with different financial institutions (e.g., similar to cash handling device 150), including an operating application received from financial institution server 120 and configured by financial institution server 120 for cash handling device 160, similar to how cash handling device 150 may maintain an operating application received from financial institution server 120 and configured by financial institution server 120 for cash handling device 150, as discussed above. At step 510, cash handling device 160 may, for instance, identify that the operating application received by cash handling device 160 from financial institution server 120 is an appropriate operating application for performing the second transaction.

At step 511, cash handling device 160 may launch and/or otherwise execute the identified operating application. For example, at step 511, cash handling device 160 may launch and/or otherwise execute the operating application received by cash handling device 160 from financial institution server 120. In executing the operating application received by cash handling device 160 from financial institution server 120, cash handling device 160 may, for instance, authenticate the user of cash handling device 160, receive user input (e.g., user input confirming the request to withdraw any and/or all of the funds deposited during the first transaction performed by cash handling device 150), present one or more user interfaces, and/or perform other functions, similar to how cash handling device 150 may execute similar functions when executing an operating application, as discussed above.

At step 512, cash handling device 160 may read the encoded transaction information from cash handling device support server 110 and/or from the blockchain distributed database. For example, cash handling device 160 may read the encoded transaction information associated with the first transaction performed by cash handling device 150 (e.g., to facilitate processing of the request to withdraw at cash handling device 160 any and/or all of the funds deposited during the first transaction performed by cash handling device 150).

Figure 5D:
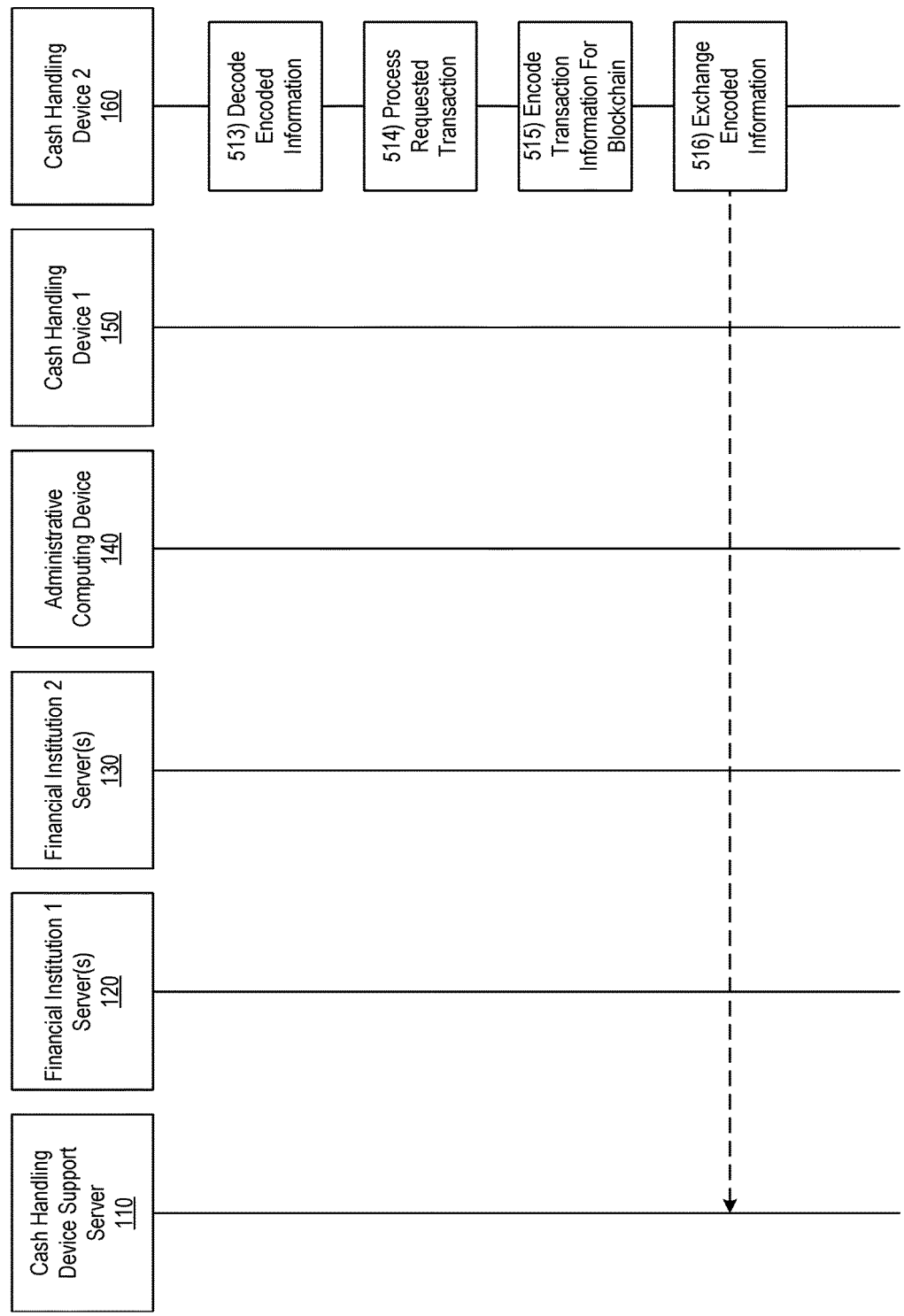

Referring to FIG. 5D, at step 513, cash handling device 160 may decode the encoded transaction information read from cash handling device support server 110 and/or from the blockchain distributed database. For example, in decoding the encoded transaction information read from cash handling device support server 110 and/or from the blockchain distributed database, cash handling device 160 may retrieve, decrypt, and/or verify the encoded transaction information read from cash handling device support server 110 and/or from the blockchain distributed database.

At step 514, cash handling device 160 may process the requested transaction (e.g., based on the encoded transaction information read from cash handling device support server 110 and/or from the blockchain distributed database). For example, based on the encoded transaction information read from cash handling device support server 110 and/or from the blockchain distributed database indicating that a specific amount of funds was deposited at cash handling device 150 and/or is available for withdrawal at cash handling device 160, cash handling device 160 may process the requested transaction by dispensing a requested amount of funds up to the specific amount of funds indicated in the encoded transaction information read from cash handling device support server 110 and/or from the blockchain distributed database.

At step 515, cash handling device 160 may securely encode transaction information for the blockchain (e.g., indicating that a particular amount of funds was dispensed and/or that the withdrawal transaction has been completed, similar to how cash handling device 150 may encode such transaction information, as discussed above). At step 516, cash handling device 160 may exchange the encoded transaction information with cash handling device support server 110 and/or otherwise communicate the encoded transaction information to cash handling device support server 110, similar to how cash handling device 150 may exchange encoded transaction information with cash handling device support server 110, as discussed above.

In some instances, cash handling device support server 110 may monitor blockchain-based transaction information to identify the cash replenishment needs and/or cash transportation needs of various multi-tenant cash handling devices (e.g., cash handling device 150, cash handling device 160). Such monitoring may, for instance, enable cash handling device support server 110 to generate commands causing cash replenishment and/or cash transportation, as well as alerts triggering cash replenishment and/or cash transportation, at various multi-tenant cash handling devices (e.g., cash handling device 150, cash handling device 160), as illustrated below.

Referring to FIG. 5E, at step 517, cash handling device support server 110 may read data from the blockchain distributed database. At step 518, cash handling device support server 110 may identify cash replenishment needs and/or cash transportation needs of one or more cash handling devices (e.g., cash handling device 150, cash handling device 160) based on the data read from the blockchain distributed database. At step 519, cash handling device support server 110 may generate one or more alerts (e.g., based on identifying the cash replenishment needs and/or the cash transportation needs of the one or more cash handling devices). At step 520, cash handling device support server 110 may send the one or more generated alerts. For example, cash handling device support server 110 may generate and/or send one or more commands and/or alerts to financial institution server 120, financial institution server 130, and/or administrative computing device 140 based on identifying the cash replenishment needs and/or the cash transportation needs of the one or more cash handling devices to direct and/or cause cash replenishment and/or cash transportation to be provided to the one or more cash handling devices (e.g., cash handling device 150, cash handling device 160). Additionally or alternatively, cash handling device support server 110 may generate and/or send one or more commands and/or alerts to one or more operator devices associated with the one or more cash handling devices (e.g., cash handling device 150, cash handling device 160), such as one or more computing devices associated with one or more store owners or other responsible parties for the one or more cash handling devices (e.g., cash handling device 150, cash handling device 160). Additionally or alternatively, cash handling device support server 110 may generate and/or send one or more commands and/or alerts to one or more cash transportation entities requesting and/or directing that the one or more cash handling devices (e.g., cash handling device 150, cash handling device 160) be serviced.

In the example sequences discussed above, many steps performed by cash handling device 150 may similarly be performed by cash handling device 160 and/or other cash handling devices that may implement one or more aspects of the disclosure. For example, cash handling device 160 may be deployed at the same location as cash handling device 150 and/or at a different location, and cash handling device 160 may be similarly configured as cash handling device 150 to provide similar functions as cash handling device 150. Thus, cash handling device 160 may perform registration functions, transaction processing functions, containerized operating functions, non-engagement functions, secure communications functions, and/or other functions similar to cash handling device 150. In addition, in some instances, one or more steps of the example event sequences may be repeated, skipped, and/or combined.

Figure 16:
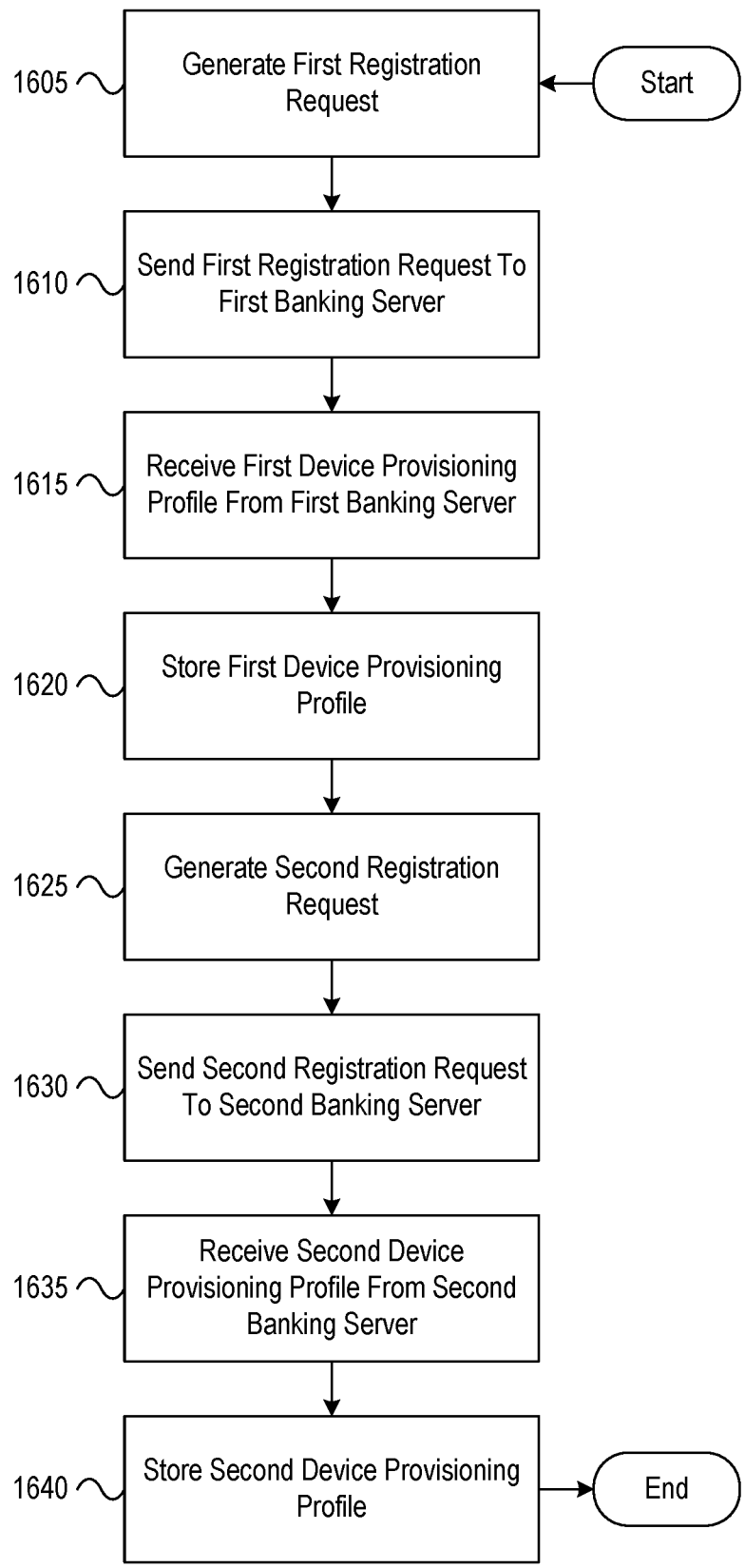
FIGS. 16-19 depict illustrative methods for deploying, configuring, and utilizing cash handling devices to provide dynamic and adaptable operating functions in accordance with one or more example embodiments.

FIG. 16 depicts an illustrative method for deploying, configuring, and utilizing cash handling devices to provide dynamic and adaptable operating functions in accordance with one or more example embodiments. Referring to FIG. 16, at step 1605, a cash handling device having at least one processor, a communication interface, a touch-sensitive display screen, an item accepting device, an item dispensing device, and memory may generate a first registration request for a first banking server associated with a first financial institution. At step 1610, the cash handling device may send, via the communication interface, to the first banking server associated with the first financial institution, the first registration request generated for the first banking server associated with the first financial institution. At step 1615, after sending the first registration request to the first banking server associated with the first financial institution, the cash handling device may receive, via the communication interface, from the first banking server associated with the first financial institution, a first device provisioning profile generated by the first banking server associated with the first financial institution for the cash handling device. At step 1620, the cash handling device may store the first device provisioning profile received from the first banking server associated with the first financial institution, and the first device provisioning profile received from the first banking server associated with the first financial institution may enable the cash handling device to execute a first operating application associated with the first financial institution.

At step 1625, the cash handling device may generate a second registration request for a second banking server associated with a second financial institution. At step 1630, the cash handling device may send, via the communication interface, to the second banking server associated with the second financial institution, the second registration request generated for the second banking server associated with the second financial institution. At step 1635, after sending the second registration request to the second banking server associated with the second financial institution, the cash handling device may receive, via the communication interface, from the second banking server associated with the second financial institution, a second device provisioning profile generated by the second banking server associated with the second financial institution for the cash handling device. At step 1640, the cash handling device may store the second device provisioning profile received from the second banking server associated with the second financial institution, and the second device provisioning profile received from the second banking server associated with the second financial institution may enable the cash handling device to execute a second operating application associated with the second financial institution.

Figure 17:
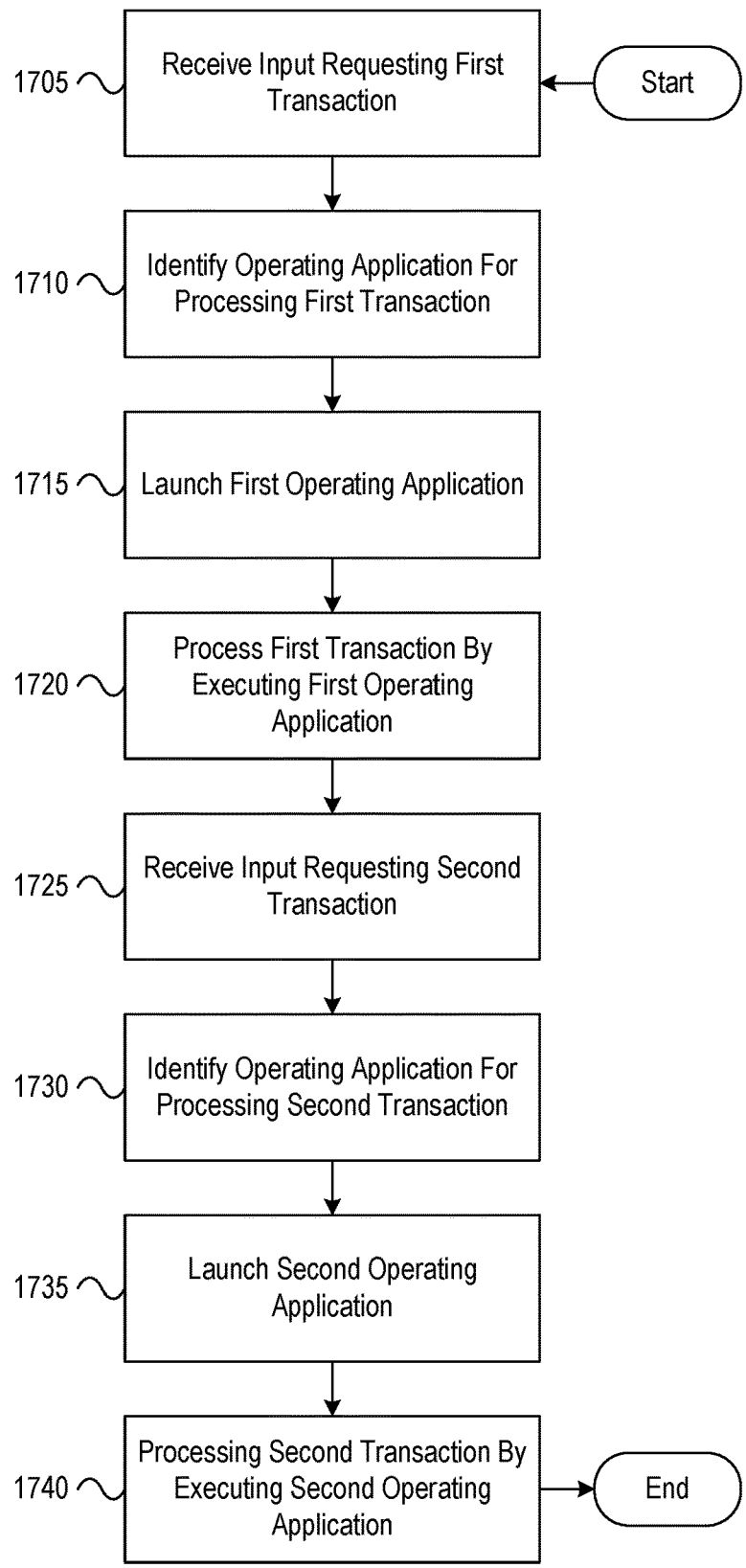

FIG. 17 depicts an illustrative method for deploying, configuring, and utilizing cash handling devices to provide dynamic and adaptable operating functions in accordance with one or more example embodiments. Referring to FIG. 17, at step 1705, a cash handling device having at least one processor, a communication interface, a touch-sensitive display screen, an item accepting device, an item dispensing device, and memory may receive input requesting a first transaction from a first user of the cash handling device. At step 1710, in response to receiving the input requesting the first transaction from the first user of the cash handling device, the cash handling device may identify a first operating application associated with a first financial institution for processing the first transaction. At step 1715, based on identifying the first operating application associated with the first financial institution for processing the first transaction, the cash handling device may launch the first operating application associated with the first financial institution. At step 1720, the cash handling device may process the first transaction by executing the first operating application associated with the first financial institution.

At step 1725, the cash handling device may receive input requesting a second transaction from a second user of the cash handling device. At step 1730, in response to receiving the input requesting the second transaction from the second user of the cash handling device, the cash handling device may identify a second operating application associated with a second financial institution for processing the second transaction. At step 1735, based on identifying the second operating application associated with the second financial institution for processing the second transaction, the cash handling device may launch the second operating application associated with the second financial institution. At step 1740, the cash handling device may process the second transaction by executing the second operating application associated with the second financial institution.

Figure 18:
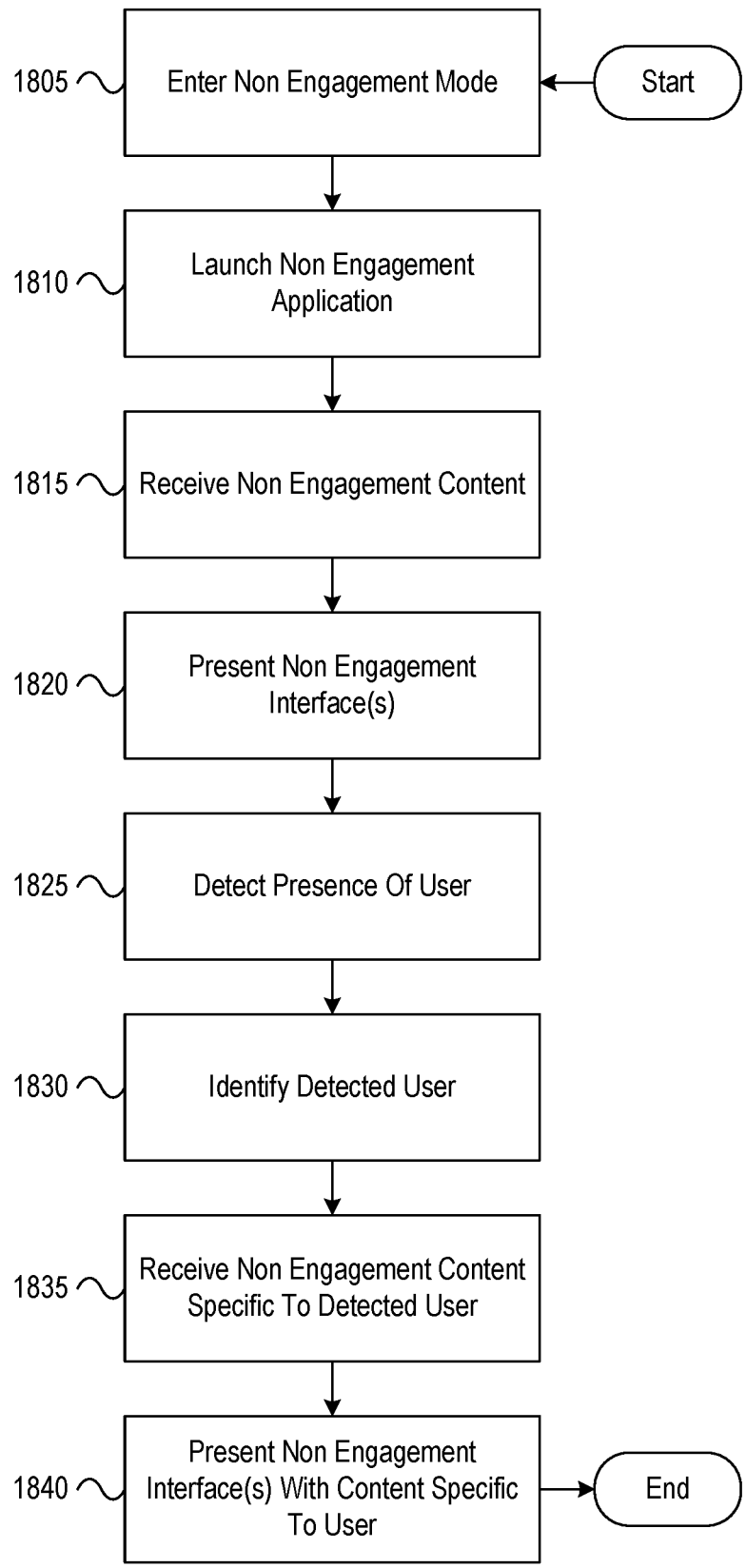

FIG. 18 depicts an illustrative method for deploying, configuring, and utilizing cash handling devices to provide dynamic and adaptable operating functions in accordance with one or more example embodiments. Referring to FIG. 18, at step 1805, a cash handling device having at least one processor, a communication interface, a touch-sensitive display screen, an item accepting device, an item dispensing device, and memory may enter a non-engagement mode. at step 1810, based on entering the non-engagement mode, the cash handling device may launch a non-engagement application. At step 1815, the cash handling device may receive, via the communication interface, from a cash handling device support server, first non-engagement content. At step 1820, the cash handling device may present, using the non-engagement application, one or more non-engagement user interfaces associated with the first non-engagement content received from the cash handling device support server.

At step 1825, the cash handling device may detect a presence of a user of the cash handling device. At step 1830, in response to detecting the presence of the user of the cash handling device, the cash handling device may identify the user of the cash handling device. At step 1835, after identifying the user of the cash handling device, the cash handling device may receive, via the communication interface, from the cash handling device support server, second non-engagement content specific to the user of the cash handling device. At step 1840, the cash handling device may present, using the non-engagement application, one or more non-engagement user interfaces associated with the second non-engagement content specific to the user of the cash handling device.

Figure 19:
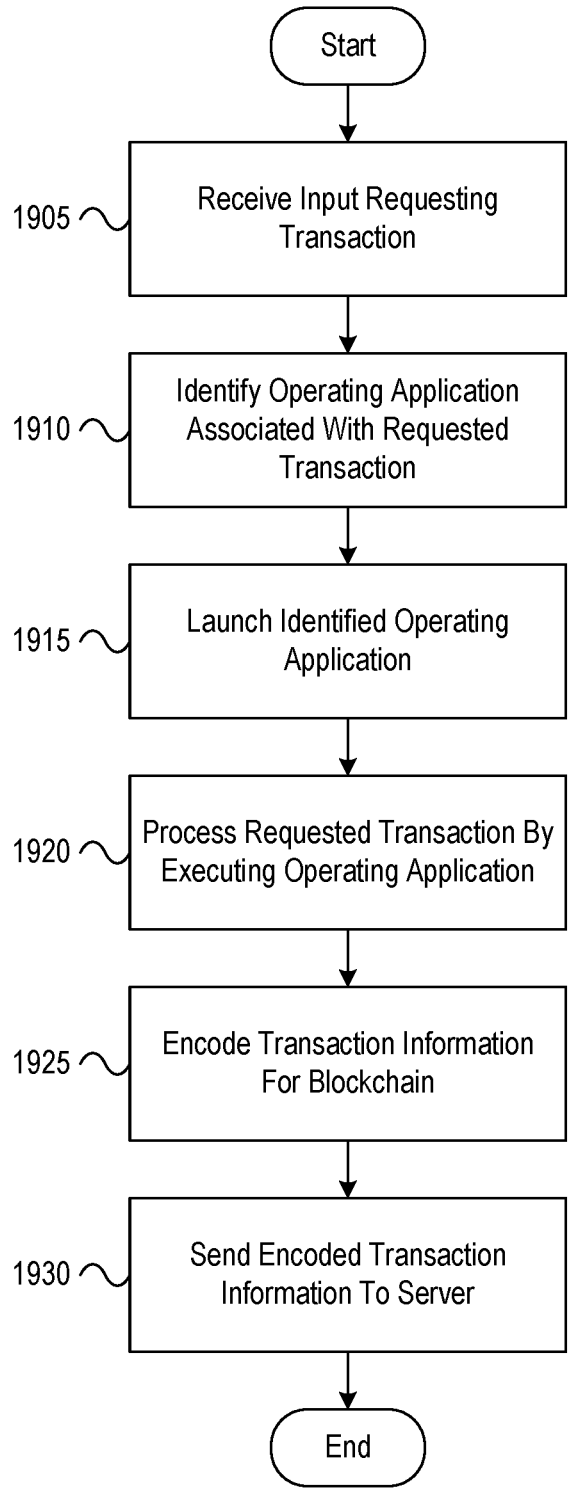

FIG. 19 depicts an illustrative method for deploying, configuring, and utilizing cash handling devices to provide dynamic and adaptable operating functions in accordance with one or more example embodiments. Referring to FIG. 19, at step 1905, a cash handling device having at least one processor, a communication interface, a touch-sensitive display screen, an item accepting device, an item dispensing device, and memory may receive, via the touch-sensitive display screen, from a user of the cash handling device, input requesting a first transaction associated with a deposit of funds to a first account associated with a first financial institution. At step 1910, based on the input requesting the first transaction associated with the deposit of funds to the first account associated with the first financial institution, the cash handling device may identify a first operating application associated with the first financial institution. At step 1915, based on identifying the first operating application associated with the first financial institution, the cash handling device may launch the first operating application associated with the first financial institution. At step 1920, the cash handling device may process the first transaction by executing the first operating application associated with the first financial institution. At step 1925, based on processing the first transaction by executing the first operating application associated with the first financial institution, the cash handling device may encode first transaction information for a blockchain distributed database. At step 1930, the cash handling device may send, via the communication interface, to a cash handling device support server, the first transaction information encoded for the blockchain distributed database.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A cash handling device comprising:
   at least one processor;
   a communication interface;
   a touch-sensitive display screen;
   an item accepting device;
   an item dispensing device; and
   memory storing executable instructions that, when executed by the at least one processor, cause the cash handling device to:
      receive input requesting a first transaction from a first user of the cash handling device;
      in response to receiving the input requesting the first transaction from the first user of the cash handling device, identify a first operating application associated with a first financial institution for processing the first transaction;
      based on identifying the first operating application associated with the first financial institution for processing the first transaction, launch the first operating application associated with the first financial institution;
      process the first transaction by executing the first operating application associated with the first financial institution;
      receive input requesting a second transaction from a second user of the cash handling device;
      in response to receiving the input requesting the second transaction from the second user of the cash handling device, identify a second operating application associated with a second financial institution for processing the second transaction;
      based on identifying the second operating application associated with the second financial institution for processing the second transaction, launch the second operating application associated with the second financial institution; and
      process the second transaction by executing the second operating application associated with the second financial institution,
      wherein receiving the input requesting the first transaction from the first user of the cash handling device comprises receiving, via the touch-sensitive display screen, input selecting the first financial institution from a listing of financial institutions linked to the cash handling device included in a first user interface presented by the cash handling device on the touch-sensitive display screen,
      wherein receiving the input requesting the second transaction from the second user of the cash handling device comprises receiving, via the touch-sensitive display screen, input selecting the second financial institution from a listing of financial institutions linked to the cash handling device included in a second user interface presented by the cash handling device on the touch-sensitive display screen, and
      wherein the first operating application associated with the first financial institution and the second operating application associated with the second financial institution are containerized applications executed in sandboxes provided by an operating system of the cash handling device.

2. The cash handling device of claim 1, wherein the memory stores additional executable instructions that, when executed by the at least one processor, cause the cash handling device to:
   based on processing the first transaction, communicate, via the communication interface, to a first banking server associated with the first financial institution, transaction details information associated with the first transaction using a first device provisioning profile generated by the first banking server associated with the first financial institution for the cash handling device and stored in a device keychain maintained by the cash handling device.

3. The cash handling device of claim 2, wherein the memory stores additional executable instructions that, when executed by the at least one processor, cause the cash handling device to:

based on processing the second transaction, communicate, via the communication interface, to a second banking server associated with the second financial institution, transaction details information associated with the second transaction using a second device provisioning profile generated by the second banking server associated with the second financial institution for the cash handling device and stored in the device keychain maintained by the cash handling device.

4. The cash handling device of claim 1, wherein receiving the input requesting the first transaction from the first user of the cash handling device comprises receiving a physical token associated with the first financial institution.

5. The cash handling device of claim 1, wherein processing the first transaction comprises authenticating the first user of the cash handling device to at least one financial account maintained by the first financial institution, receiving one or more deposit items associated with the first transaction via the item accepting device, and dispensing one or more withdrawal items associated with the first transaction via the item dispensing device.

6. The cash handling device of claim 5, wherein processing the second transaction comprises authenticating the second user of the cash handling device to at least one financial account maintained by the second financial institution, receiving one or more deposit items associated with the second transaction via the item accepting device, and dispensing one or more withdrawal items associated with the second transaction via the item dispensing device.

7. The cash handling device of claim 1, wherein the memory stores additional executable instructions that, when executed by the at least one processor, cause the cash handling device to:
prior to receiving the input requesting the first transaction from the first user of the cash handling device:
identify one or more operating applications to download based on a device profile generated for the cash handling device by a cash handling device support server;
based on identifying the one or more operating applications to download, generate a first operating application request for the first operating application associated with the first financial institution;
send, via the communication interface, to a first banking server associated with the first financial institution, the first operating application request; and
receive, via the communication interface, from the first banking server associated with the first financial institution, the first operating application associated with the first financial institution.

8. The cash handling device of claim 7, wherein the memory stores additional executable instructions that, when executed by the at least one processor, cause the cash handling device to:
based on identifying the one or more operating applications to download, generate a second operating application request for the second operating application associated with the second financial institution;
send, via the communication interface, to a second banking server associated with the second financial institution, the second operating application request; and
receive, via the communication interface, from the second banking server associated with the second financial institution, the second operating application associated with the second financial institution.

9. The cash handling device of claim 8, wherein the memory stores additional executable instructions that, when executed by the at least one processor, cause the cash handling device to:
after processing the first transaction by executing the first operating application associated with the first financial institution:
receive, via the communication interface, from the first banking server associated with the first financial institution, a first application update for the first operating application associated with the first financial institution; and
in response to receiving the first application update for the first operating application associated with the first financial institution, update the first operating application associated with the first financial institution by installing the first application update on the cash handling device.

10. The cash handling device of claim 9, wherein the memory stores additional executable instructions that, when executed by the at least one processor, cause the cash handling device to:
after processing the second transaction by executing the second operating application associated with the second financial institution:
receive, via the communication interface, from the second banking server associated with the second financial institution, a second application update for the second operating application associated with the second financial institution; and
in response to receiving the second application update for the second operating application associated with the second financial institution, update the second operating application associated with the second financial institution by installing the second application update on the cash handling device.

11. The cash handling device of claim 1, wherein the memory stores additional executable instructions that, when executed by the at least one processor, cause the cash handling device to:
switch from a first engagement mode to a non-engagement mode after processing the first transaction by executing the first operating application associated with the first financial institution.

12. The cash handling device of claim 11, wherein the memory stores additional executable instructions that, when executed by the at least one processor, cause the cash handling device to:
switch from a second engagement mode to the non-engagement mode after processing the second transaction by executing the second operating application associated with the second financial institution.

13. A method comprising:
at a cash handling device comprising at least one processor, a communication interface, a touch-sensitive display screen, an item accepting device, an item dispensing device, and memory:
receiving, by the at least one processor, input requesting a first transaction from a first user of the cash handling device;
in response to receiving the input requesting the first transaction from the first user of the cash handling device, identifying, by the at least one processor, a first operating application associated with a first financial institution for processing the first transaction;

based on identifying the first operating application associated with the first financial institution for processing the first transaction, launching, by the at least one processor, the first operating application associated with the first financial institution;

processing, by the at least one processor, the first transaction by executing the first operating application associated with the first financial institution;

receiving, by the at least one processor, input requesting a second transaction from a second user of the cash handling device;

in response to receiving the input requesting the second transaction from the second user of the cash handling device, identifying, by the at least one processor, a second operating application associated with a second financial institution for processing the second transaction;

based on identifying the second operating application associated with the second financial institution for processing the second transaction, launching, by the at least one processor, the second operating application associated with the second financial institution; and processing, by the at least one processor, the second transaction by executing the second operating application associated with the second financial institution, wherein receiving the input requesting the first transaction from the first user of the cash handling device comprises receiving, via the touch-sensitive display screen, input selecting the first financial institution from a listing of financial institutions linked to the cash handling device included in a first user interface presented by the cash handling device on the touch-sensitive display screen, wherein receiving the input requesting the second transaction from the second user of the cash handling device comprises receiving, via the touch-sensitive display screen, input selecting the second financial institution from a listing of financial institutions linked to the cash handling device included in a second user interface presented by the cash handling device on the touch-sensitive display screen, and wherein the first operating application associated with the first financial institution and the second operating application associated with the second financial institution are containerized applications executed in sandboxes provided by an operating system of the cash handling device.

14. The method of claim 13, comprising:
based on processing the first transaction, communicating, by the at least one processor, via the communication interface, to a first banking server associated with the first financial institution, transaction details information associated with the first transaction using a first device provisioning profile generated by the first banking server associated with the first financial institution for the cash handling device and stored in a device keychain maintained by the cash handling device.

15. The method of claim 14, comprising:
based on processing the second transaction, communicating, by the at least one processor, via the communication interface, to a second banking server associated with the second financial institution, transaction details information associated with the second transaction using a second device provisioning profile generated by the second banking server associated with the second financial institution for the cash handling device and stored in the device keychain maintained by the cash handling device.

16. The method of claim 13, wherein receiving the input requesting the first transaction from the first user of the cash handling device comprises receiving a physical token associated with the first financial institution.

17. One or more non-transitory computer-readable media storing instructions that, when executed by a cash handling device comprising at least one processor, a communication interface, a touch-sensitive display screen, an item accepting device, an item dispensing device, and memory, cause the cash handling device to:

receive input requesting a first transaction from a first user of the cash handling device;

in response to receiving the input requesting the first transaction from the first user of the cash handling device, identify a first operating application associated with a first financial institution for processing the first transaction;

based on identifying the first operating application associated with the first financial institution for processing the first transaction, launch the first operating application associated with the first financial institution;

process the first transaction by executing the first operating application associated with the first financial institution;

receive input requesting a second transaction from a second user of the cash handling device;

in response to receiving the input requesting the second transaction from the second user of the cash handling device, identify a second operating application associated with a second financial institution for processing the second transaction;

based on identifying the second operating application associated with the second financial institution for processing the second transaction, launch the second operating application associated with the second financial institution; and process the second transaction by executing the second operating application associated with the second financial institution, wherein receiving the input requesting the first transaction from the first user of the cash handling device comprises receiving, via the touch-sensitive display screen, input selecting the first financial institution from a listing of financial institutions linked to the cash handling device included in a first user interface presented by the cash handling device on the touch-sensitive display screen, wherein receiving the input requesting the second transaction from the second user of the cash handling device comprises receiving, via the touch-sensitive display screen, input selecting the second financial institution from a listing of financial institutions linked to the cash handling device included in a second user interface presented by the cash handling device on the touch-sensitive display screen, and wherein the first operating application associated with the first financial institution and the second operating application associated with the second financial institution are containerized applications executed in sandboxes provided by an operating system of the cash handling device.

* * * * *